(12) United States Patent
Morotomi

(10) Patent No.: US 8,108,462 B2
(45) Date of Patent: Jan. 31, 2012

(54) INFORMATION PROCESSING APPARATUS, INFORMATION PROCESSING METHOD, INFORMATION PROCESSING PROGRAM AND RECORDING MEDIUM FOR STORING THE PROGRAM

(75) Inventor: Shiro Morotomi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1443 days.

(21) Appl. No.: 11/640,377

(22) Filed: Dec. 18, 2006

(65) Prior Publication Data

US 2007/0168425 A1  Jul. 19, 2007

(30) Foreign Application Priority Data

Dec. 28, 2005 (JP) ................................ 2005-377373

(51) Int. Cl.
*G06F 15/16* (2006.01)
(52) U.S. Cl. .............. 709/204; 379/100.06; 379/100.13; 379/100.15
(58) Field of Classification Search ............. 379/100.06, 379/100.13, 100.15, 100.16, 142.17, 221.15, 379/428.03; 709/204, 209, 228, 230
See application file for complete search history.

(56) References Cited

U.S. PATENT DOCUMENTS 7,119,915 B2 * 10/2006 Tonegawa .................... 358/1.15
7,460,838 B2 * 12/2008 Hasegawa .................... 455/90.2

FOREIGN PATENT DOCUMENTS

| JP | 2003-219046 | * | 7/2003 |
| JP | 2003-281068 | | 10/2003 |
| JP | 2004-192297 | | 7/2004 |
| WO | WO 2005/117469 | | 4/2005 |

* cited by examiner

*Primary Examiner* — Melur Ramakrishnaiah
*Assistant Examiner* — Yosef K Laekemariam
(74) *Attorney, Agent, or Firm* — Finnegan, Henderson, Farabow, Garrett & Dunner, L.L.P.

(57) ABSTRACT

Disclosed herein is an information processing apparatus capable of exchanging information with another apparatus. The apparatus includes: a unit for carrying out a communication with the other apparatus; a unit for acquiring information on a state of a communication with the other apparatus carried out by the communication unit; and a unit for determining image information for a user owning the other apparatus based on the information acquired by the communication-state information acquisition unit and determining an array including the image information. The apparatus further includes: a unit for generating a display image including the image information based on the array; and a unit for displaying the display image.

16 Claims, 59 Drawing Sheets

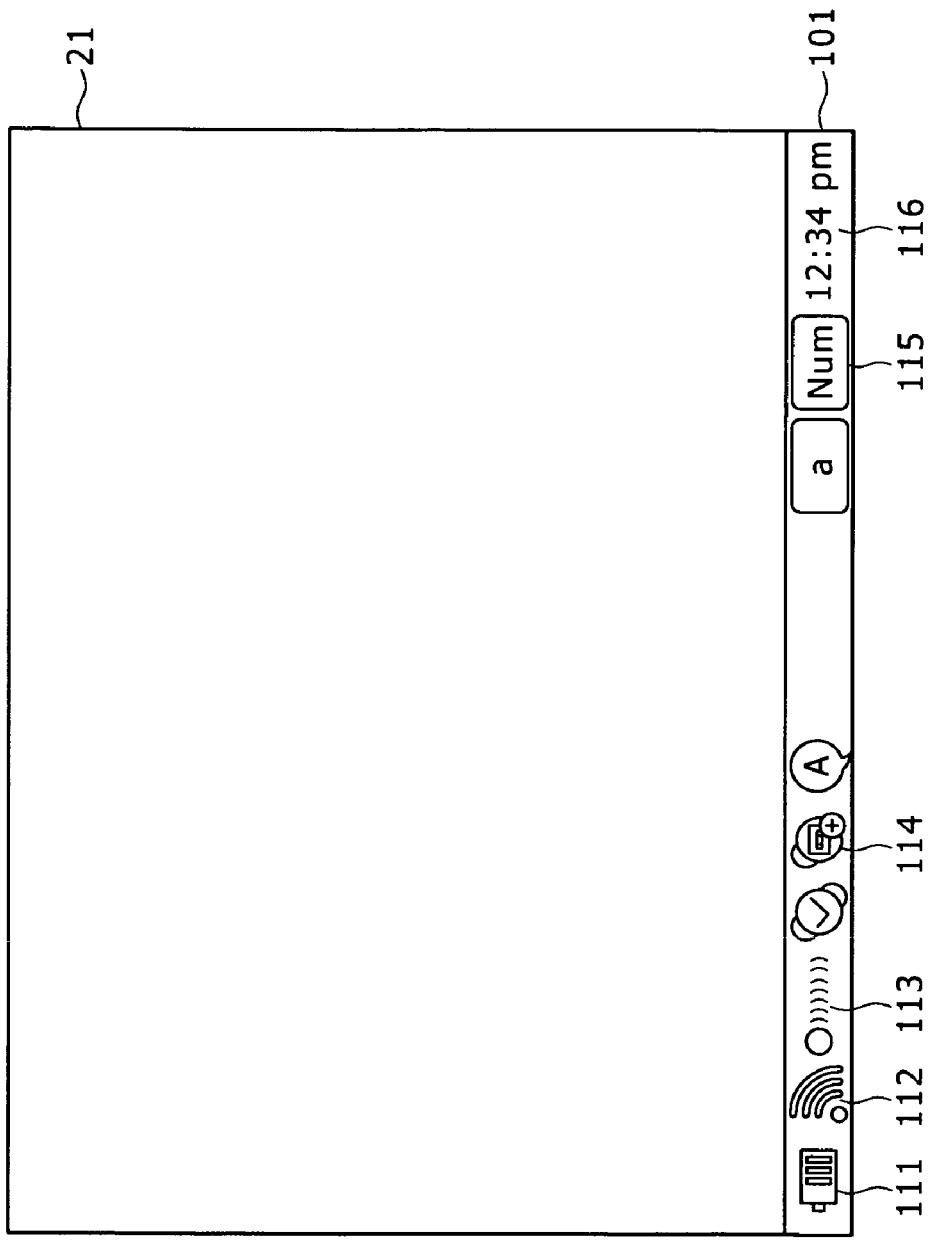

FIG.10

| ITEM | DESCRIPTION |
|---|---|
| BATTERY RESIDUAL CHARGE DISPLAY | SHOWS THE AMOUNT OF CHARGE REMAINING IN THE BATTERY. TYPICAL DISPLAYS ARE 0%, 25%, 50%, 75% AND 100%. WHEN THE BATTERY IS BEING CHARGED, AN ANIMATION INDICATING A BATTERY STATE OF BEING ELECTRICALLY CHARGED IS DISPLAYED. |
| WLAN STRENGTH DISPLAY | SHOWS THE STRENGTH OF THE WLAN. FOR EXAMPLE, THIS DISPLAY SHOWS THE STRENGTH OF THE WLAN AT 4 STAGES, i. e., 0, 1, 2 AND 3. |
| WLAN STATE DISPLAY | SHOWS THE MODE AND CONNECTION STATE OF THE WLAN. TYPICAL MODES OF THE WLAN INCLUDE AN OFF MODE, AN INFRASTRUCTURE MODE AND AN AD-HOC MODE WHEREAS THE CONNECTION STATE OF THE WLAN CAN BE A CONNECTED STATE OR AN OFFLINE STATE. |
| IP TELEPHONE STATE DISPLAY (IN THE WLAN INFRASTRUCTURE MODE) | SHOWS THE STATE OF AN IP TELEPHONE APPLICATION. |
| INSTANT MESSENGER STATE DISPLAY (IN THE WLAN INFRASTRUCTURE MODE) | SHOWS THE STATE OF AN INSTANT MESSENGER APPLICATION. |
| AD-HOC APPLICATION STATE DISPLAY (IN THE WLAN INFRASTRUCTURE MODE) | SHOWS INFORMATION ON THE CONNECTION OF AN APPLICATION UTILIZING AN AD-HOC CONNECTION. |
| KEYBOARD INPUT MODE DISPLAY | SHOWS THE MODE OF A SPECIAL KEY ON THE KEYBOARD. THE SPECIAL KEYS CAN BE ALT, NUM, SHIFT OR Fn. IN THE CASE OF HOLD, A HOLD MARK IS DISPLAYED. |
| CLOCK DISPLAY | SHOWS A CLOCK. |

FIG. 22

Text Editor.Album Comments — 571

Love her or loathe her, uber-diva Jennifer
Lopez knows how to deliver on record.
She understands how to make the most
of her limited vocal range, choosing to
surround herself with able producers
Rodney Jerkins, Timbaland, Big Boi and
Cory Rooney, who oversaw Lopez's first about | as | ask | book — 591

| ITEM | DESCRIPTION |
|---|---|
| UNIQUE IP ADDRESS/PORT OF THIS STATION | IP ADDRESS AND PORT NUMBER |
| UNIQUE ID OF THIS STATION | UNIQUE ID OF THE APPARATUS |
| USER ID | ID OF THE USER WITH A SET PROFILE |
| CONNECTION/DISCONNECTION INFORMATION | BUSY, READY OR THE LIKE |
| INFORMATION ON MUSIC BEING REPRODUCED | MUSIC TITLE AND ARTIST NAME |
| SEQUENCE NUMBER AND OBJECT HANDLE OF MUSIC BEING REPRODUCED | INFORMATION REQUIRED IN STREAMING REPRODUCTION OF MUSICAL DATA WITH A PROTECTED COPYRIGHT |
| OTHER INFORMATION ON A REPRODUCTION STATE OR THE LIKE | |
| USER TEXT MEMO | TEXT MEMO ENTERED BY THE USER |

FIG. 26

| ITEM | DESCRIPTION |
|---|---|
| APPARATUS ID | APPARATUS UNIQUE ID |
| USER ID | ID OF A USER WITH A SET PROFILE |
| TEXT MEMO | TEXT DATA ENTERED BY THE USER FOR REGISTERING |
| FACE ICON | 96×96 BITMAP |
| USER-COLOR INFORMATION | COLOR SET BY THE USER AS A COLOR OF THE USER (36 COLORS) |
| COMMUNICATION APPLICATION ID | ID OF A COMMUNICATION APPLICATION |
| IM ID | ID OF AN INSTANT MESSENGER |

User ID:

Password:

☐ Remember my ID & Password

☐ Sign in as invisible

Login

12:34 pm — 101

Num a

INFORMATION PROCESSING APPARATUS, INFORMATION PROCESSING METHOD, INFORMATION PROCESSING PROGRAM AND RECORDING MEDIUM FOR STORING THE PROGRAM

CROSS REFERENCES TO RELATED APPLICATIONS

The present invention contains subject matter related to Japanese Patent Application JP 2005-377373, filed in the Japanese Patent Office on Dec. 28, 2005, the entire contents of which being incorporated herein by reference.

BACKGROUND OF THE INVENTION

1. Field of the Invention

The present invention relates to an information processing apparatus, an information processing method adopted by the apparatus, an information processing program implementing the method and a recording medium for storing the program. More particularly, the present invention relates to an information processing apparatus suitable for cases in which information can be communicated among a plurality of apparatus and relates to an information processing method adopted by the apparatus, an information processing program implementing the method as well as a recording medium for storing the program.

2. Description of the Related Art

In the past, the user of an information processing apparatus selects typically a telephone or an email as means for contacting a desired partner. For example, the user makes a phone call to a desired partner by making use of dialer software or the IP telephone but fails because the partner is busy. In this case, the user ends the dialer software or the IP telephone. Instead, the user can invoke an email application in order to contact the desired partner. In this case, however, the user must invoke the email application manually.

On the other hand, Japanese Patent Laid-open No. 2003-219046 (hereinafter, referred to as Patent Document 1) discloses a technology whereby, if the user of an information processing apparatus enters the phone number of a desired partner by making use of the dialer software or the IP telephone in an attempt to contact the partner but fails because the partner is busy or if the user sends an email to the desired partner but the email is returned to the user, for example, the phone number or the address of the destination of the returned email is used as a key in a process to search applications for another application including the contact address of the partner with a registered connection and the other application including the contact address of the partner is automatically invoked.

SUMMARY OF THE INVENTION

In general, communication including a case of making use of no communication apparatus, in order to contact a partner, first of all, it is necessary to think of a method of contacting the partner. Then, an attempt is made to contact a person, who can be contacted with ease, in some cases. An example of such a person who can be contacted with ease is a nearby person. That is to say, in the original and natural state of communication between persons, a partner is selected prior to selection of a communication tool.

In accordance with the technology disclosed in Patent Document 1 as described above, however, first of all, an application is selected and then a process of a communication with a desired partner is carried out by making use of the selected application. If the communication cannot be carried out, another application, which used to be selected manually in the past by the user, is automatically activated. That is to say, a tool is selected first. In addition, in accordance with the technology disclosed in Patent Document 1 as described above, the user selects a communication partner with ease but fails in an attempt to contact the selected partner.

Addressing the problems described above, inventors of the present invention have devised an information communication terminal allowing the user to determine a communication partner more naturally.

In accordance with a first embodiment of the present invention, there is provided an information processing apparatus capable of exchanging information with another apparatus. The information processing apparatus includes:

a communication section configured to carry out a communication with the other apparatus;

a communication-state information acquisition section configured to acquire information on a state of a communication with the other apparatus carried out by the communication section;

an information/array determination section configured to determine image information for a user owning the other apparatus on the basis of the information acquired by the communication-state information acquisition section and determine an array including the image information;

an image generation section configured to generate a display image including the image information on the basis of the array; and display section configured to display the display image generated by the image generation section.

It is possible to provide the information processing apparatus with a configuration in which:

the information processing apparatus has a plurality of communication modes in which the communication section carries out communications with other apparatus; and the information/array determination section changes the icon to be displayed in accordance with a communication mode selected among the communication modes.

It is possible to provide the information processing apparatus with a configuration further including:

an operation-input acquisition section configured to acquire an operation input selecting and determining a piece of image information among pieces of image information included in the display image displayed by the display section; and an application extraction section configured to extract applications each capable of transmitting information to the other apparatus owned by a user associated with the image information selected and determined on the basis of an operation input acquired by the operation-input acquisition section, wherein the image generation section further generates an application-list screen showing a list of the applications extracted by the application extraction section, and the display section further displays the application-list screen generated by the image generation section.

It is possible to provide the information processing apparatus with a configuration in which:

the information processing apparatus has a plurality of communication modes in which the communication section carries out communications;

the communication section implements each of the communication modes for a predetermined period; and the communication-state information acquisition section acquires the information in each of the communication modes.

It is possible to provide the information processing apparatus with a configuration further including a storage section configured to store information on users registered for each of predetermined communication modes, wherein:

the communication-state information acquisition section further has a registered-user information acquisition section configured to acquire registered-user information which is information on states of the users registered for each of predetermined modes from the storage section; and the information/array determination section determines the array of icons on the basis of the registered-user information.

It is possible to provide the information processing apparatus with a configuration, wherein:

the communication-state information acquisition section further has a transmitted-information acquisition section configured to acquire transmitted information which is information transmitted by the other apparatus in a communication mode for carrying out a direct radio communication between apparatus; and the information/array determination section determines the array of image information on the basis of the transmitted information.

It is possible to provide the information processing apparatus with a configuration in which:

the communication-state information acquisition section further has an online-state determination section configured to produce a result of determination as to whether or not another apparatus owned by a registered user capable of communicating through a predetermined access point in a communication mode for carrying out communications through access points including the predetermined access point is in an online state for a predetermined application; and the information/array determination section determines the array of icons on the basis of the determination result produced by the online-state determination section.

In accordance with a second embodiment of the present invention, there is provided an information processing method adopted in an information processing apparatus capable of exchanging information with another apparatus. The information processing method includes the steps of:

acquiring communication-state information for acquiring information on a state of a communication with the other apparatus;

determining image information for a user owning the other apparatus on the basis of the information acquired at the communication-state information acquisition step and determining an array including the image information;

generating a display image including the image information on the basis of the array; and displaying the display image generated at the image generation step.

In accordance with a third embodiment of the present invention, there is provided a computer-readable program to be executed by a computer to carry out processing, including the steps of:

acquiring communication-state information for acquiring information on a state of a communication with the other apparatus;

determining image information for a user owning the other apparatus on the basis of the information acquired at the communication-state information acquisition step and determining an array including the image information;

generating a display image including the image information on the basis of the array also determined at the information/array determination step as the array including the image information; and displaying the display image generated at the image generation step.

In the information processing apparatus according to the first embodiment of the present invention, the communication-state information acquisition section acquires information on a state of a communication with the other apparatus. Then, the information/array determination section determines an icon for a user owning the other apparatus on the basis of information acquired by the communication-state information acquisition section as the information on a state of a communication with the other apparatus and determines an array including the icon. Subsequently, the image generation section generates a display image including the icon determined by the information/array determination section on the basis of an array also determined by the information/array determination section as the array including the icon. Finally, the display section displays the display image generated by the image generation section.

At least, two apparatus are connected to a network to form a mechanism allowing any one of the apparatus to transmit information to any others of the apparatus. A communication through the network can be a communication carried out between apparatus independent of each other or between blocks composing the same apparatus.

A communication is of course a radio or wire communication. As an alternative, a communication is a mixed communication, which is a combination of radio and wire communications. To be more specific, the mixed communication is carried out as a radio communication in a region but as a wire communication in another region. In addition, a communication from a specific apparatus to another apparatus can be carried out as a wire communication while a communication from the other apparatus to the specific apparatus can be carried out as a wire communication.

As described above, in accordance with the embodiments of the present invention, an icon representing a user owning an apparatus serving as a communication partner can be displayed in the information processing apparatus. In particular, on the basis of states of communications between the information processing apparatus and other apparatus each serving as a communication partner of the information processing apparatus, an array of such icons can be set in the information processing apparatus. Thus, the user owning the information processing apparatus is capable of easily selecting a communication partner, with which the information processing apparatus is capable of carrying out a communication with ease.

BRIEF DESCRIPTION OF THE DRAWINGS

FIG. 9 is an explanatory diagram showing a continuous display panel;

FIG. 10 explains pieces of information shown on the continuous display panel;

FIG. 22 is an explanatory diagram referred to in description of a character predictive conversion function;

FIG. 24 is an explanatory diagram referred to in description of pieces of typical information transmitted by an information communication terminal in an ad-hoc mode by adoption of a broadcasting transmission technique;

FIG. 26 is an explanatory diagram referred to in description of typical user information exchanged in a mutual registration process;

FIG. 34 is an explanatory diagram showing a login screen;

FIG. 38 is an explanatory diagram showing a message display screen;

DETAILED DESCRIPTION OF THE PREFERRED EMBODIMENTS

Before preferred embodiments of the present invention are explained, relations between disclosed inventions and the embodiments are explained in the following comparative description. This description is intended to ensure that the embodiments according to the present invention conform to the specification and drawings therein. It is to be noted that, even if there is an embodiment described in this specification but not included in the following comparative description as an embodiment corresponding to an invention, such an embodiment is not to be interpreted as an embodiment not corresponding to an invention. Conversely speaking, an embodiment included in the following comparative description as an embodiment corresponding to a specific invention is not to be interpreted as an embodiment not corresponding to an invention other than the specific invention.

In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification or added in the future.

Figure 41:
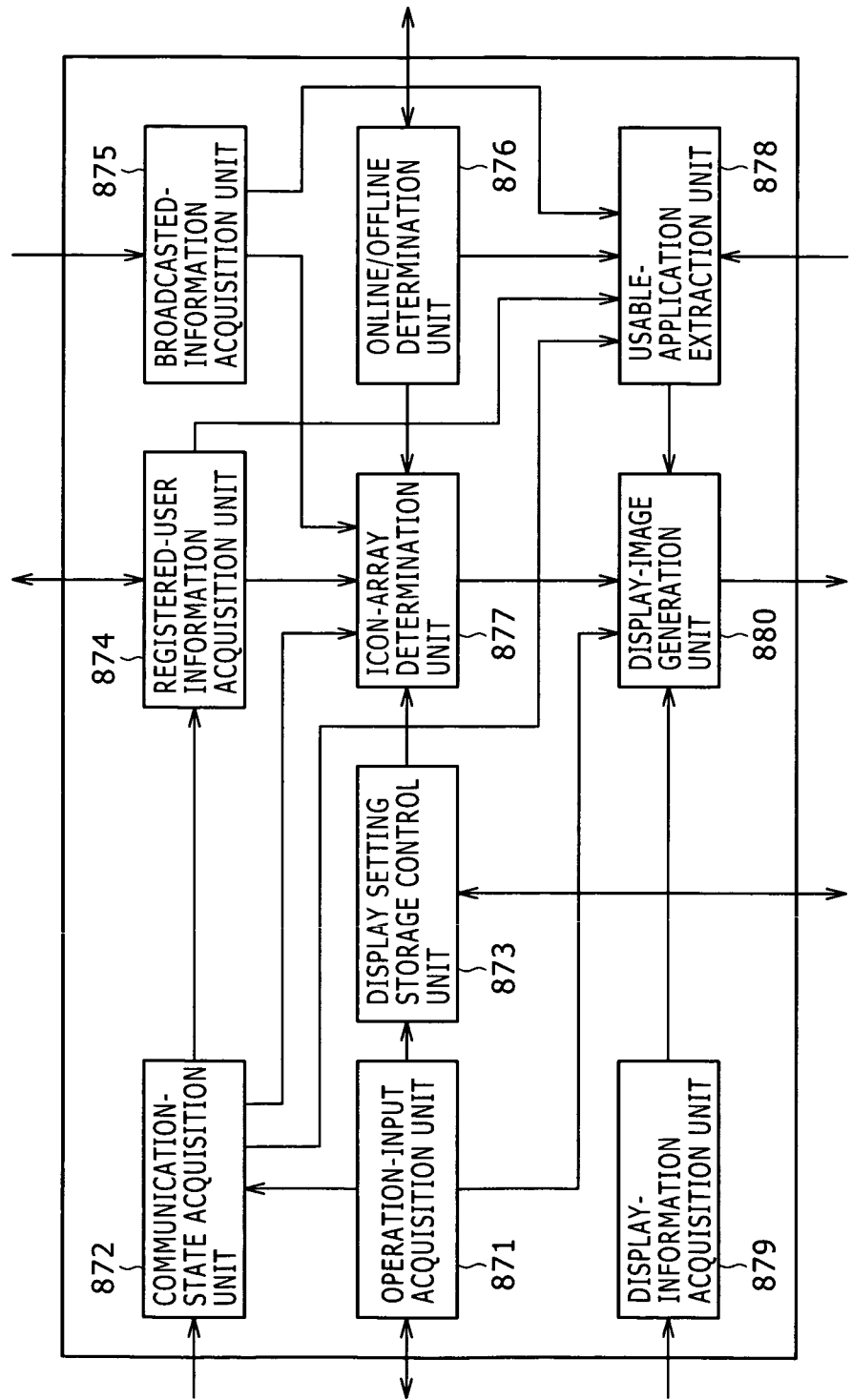
FIG. 41 is a functional block diagram showing functions used by a menu display tool.

In accordance with a first embodiment of the present invention, there is provided an information processing apparatus (such as an information communication terminal 1 shown in FIG. 1) capable of exchanging information with another apparatus. The information processing apparatus includes:

a communication section (such as a radio communication module 148 shown in FIG. 11) configured to carry out a communication with the other apparatus serving as a communication partner;

a communication-state information acquisition section (such as a registered-user information acquisition unit 874, broadcasted-information acquisition unit 875 and online/offline determination unit 876 shown in FIG. 41) configured to acquire information on a state of a communication with the other apparatus carried out by the communication section;

an information/array determination section (such as an icon-array determination unit 877 shown in FIG. 41) configured to determine an icon for a user owning the other apparatus on the basis of the information acquired by the communication-state information acquisition section and determine an array including the icon;

an image generation section (such as a display-image generation unit 880 shown in FIG. 41) configured to generate a display image including the icon on the basis of the array; and a display section (such as a display unit 21 shown in FIG. 2) configured to display the display image generated by the image generation section.

It is possible to provide the information processing apparatus with a configuration in which:

the information processing apparatus has a plurality of communication modes (such as a WLAN ad-hoc mode and a WLAN infrastructure mode) in which the communication section carries out communications with other apparatus; and the information/array determination section changes the icon to be displayed in accordance with a communication mode selected among the communication modes.

It is possible to provide the information processing apparatus with a configuration further including:

an operation-input acquisition section (such as an operation-input acquisition unit 871 shown in FIG. 41) configured to acquire an operation input selecting and determining a piece of icon among pieces of icon included in the display image displayed by the display section; and an application extraction section (such as an usable-application extraction unit 878 shown in FIG. 41) configured to extract applications each capable of transmitting information to the other apparatus owned by a user associated with the icon selected and determined on the basis of an operation input acquired by the operation-input acquisition section, wherein the image generation section further generates an application-list screen showing a list of the applications extracted by the application extraction section, and the display section further displays the application-list screen generated by the image generation section.

It is possible to provide the information processing apparatus with a configuration in which:

the information processing apparatus has a plurality of communication modes (such as the WLAN ad-hoc mode and the WLAN infrastructure mode) in which the communication section carries out communications;

the communication section implements each of the communication modes for a predetermined period; and the communication-state information acquisition section acquires the information in each of the communication modes.

It is possible to provide the information processing apparatus with a configuration further including a storage section (such as a large-capacity flash memory 154 shown in FIG. 11) configured to store information on users registered for each of predetermined communication modes, wherein:

the communication-state information acquisition section further has registered-user information acquisition section (such as the registered-user information acquisition unit 874 shown in FIG. 41) configured to acquire registered-user information which is information on states of the users registered for each of predetermined modes from the storage section; and the information/array determination section determines the array of icons on the basis of the registered-user information.

It is possible to provide the information processing apparatus with a configuration in which:

the communication-state information acquisition section further has transmitted-information acquisition section (such as the broadcasted-information acquisition unit 875 shown in FIG. 41) configured to acquire transmitted information which is information transmitted by the other apparatus in a communication mode (such as the WLAN ad-hoc mode) for carrying out a direct (through no access point) radio communication between apparatus; and the information/array determination section determines the array of icons on the basis of the transmitted information.

It is possible to provide the information processing apparatus with a configuration in which:

the communication-state information acquisition section further has an online-state determination section (such as the online/offline determination unit 876 shown in FIG. 41) configured to produce a result of determination as to whether or not another apparatus owned by a registered user capable of communicating through a predetermined access point in a communication mode (such as the WLAN infrastructure mode) for carrying out communications through access points including the predetermined access point is in an online state for a predetermined application; and the information/array determination section determines the array of icons on the basis of the determination result produced by the online-state determination section.

Figure 52:
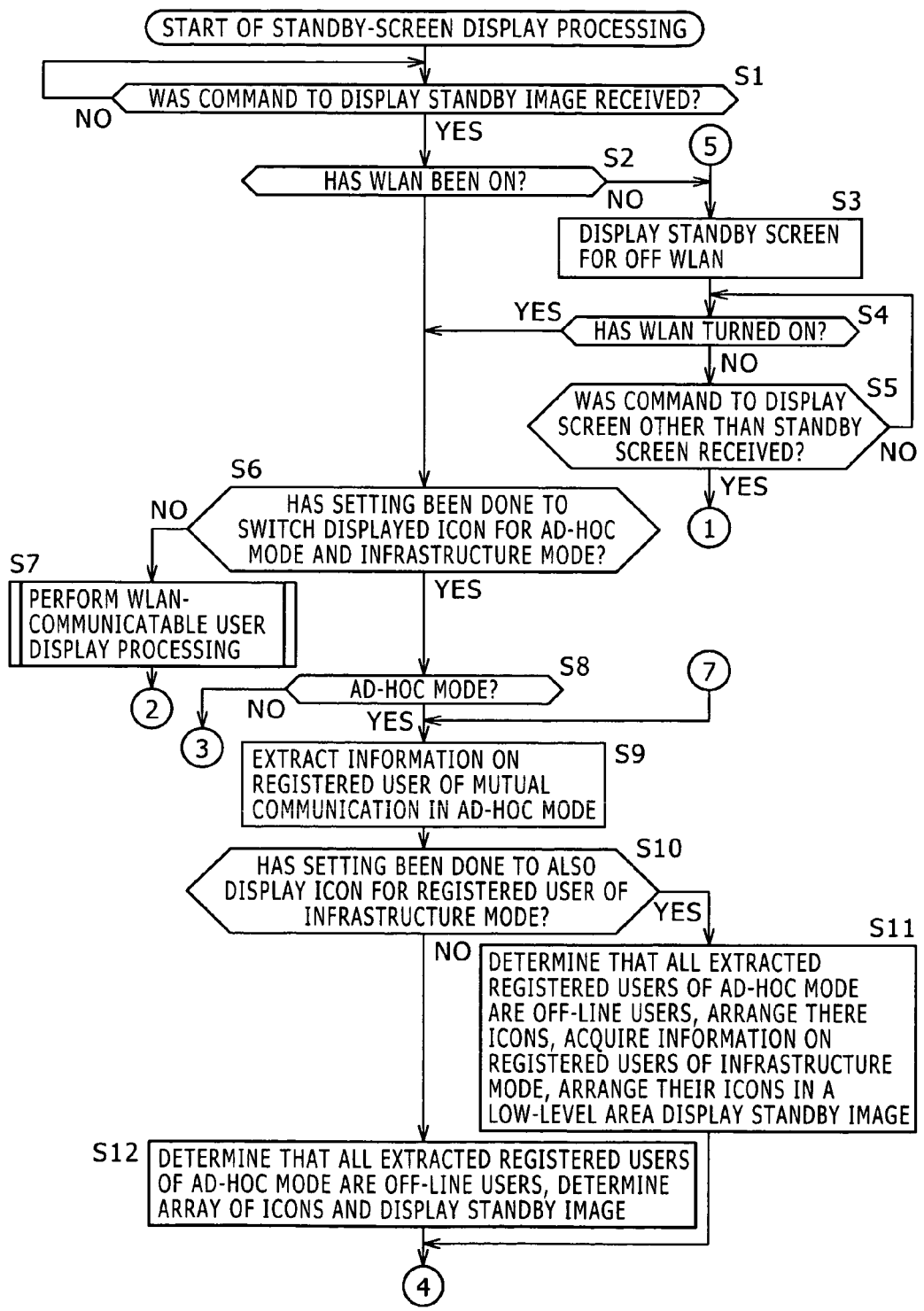
FIG. 52 shows a flowchart referred to in explanation of standby-screen display processing.
Figure 53:
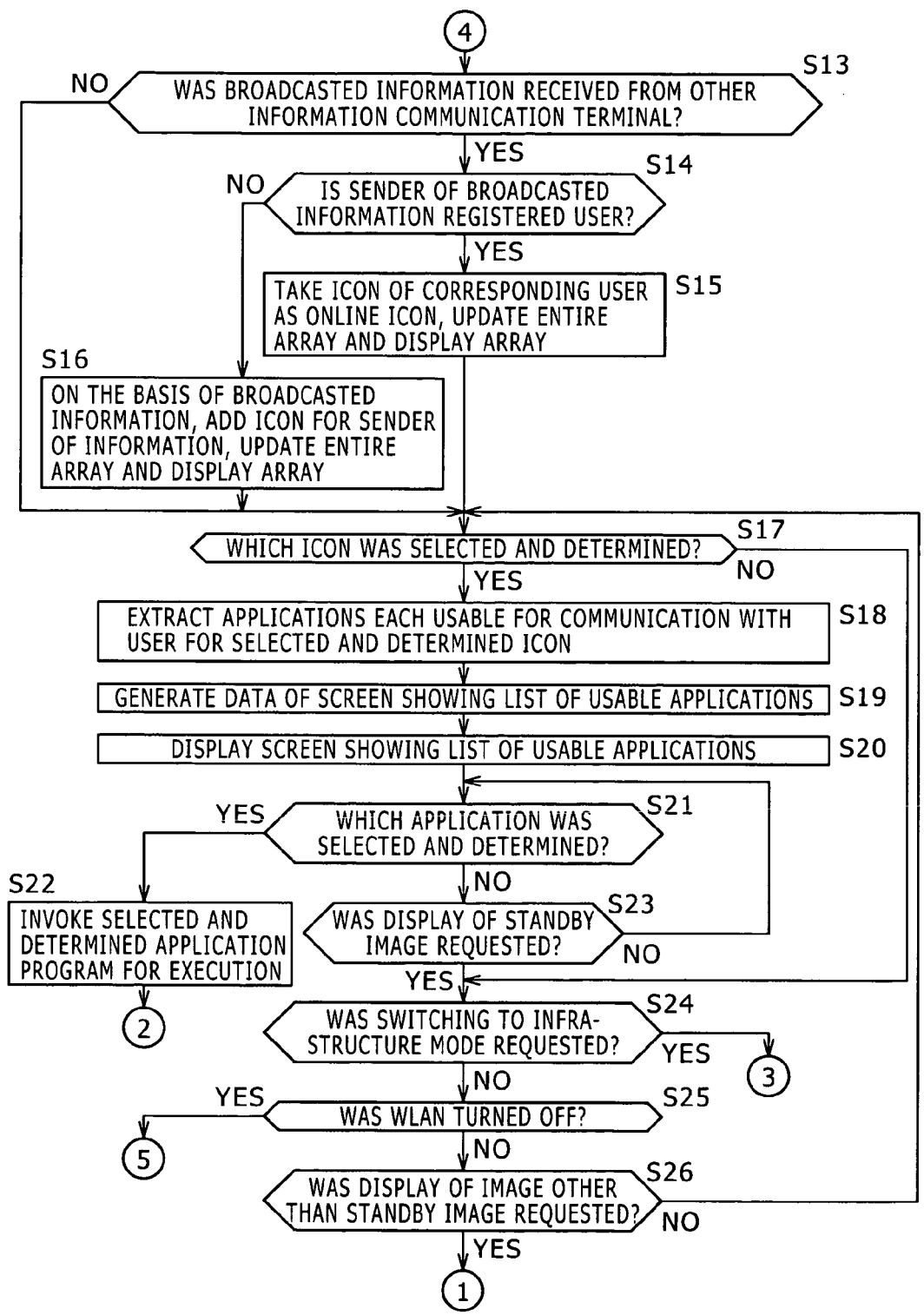
FIG. 53 shows a flowchart referred to in explanation of standby-screen display processing.
Figure 54:
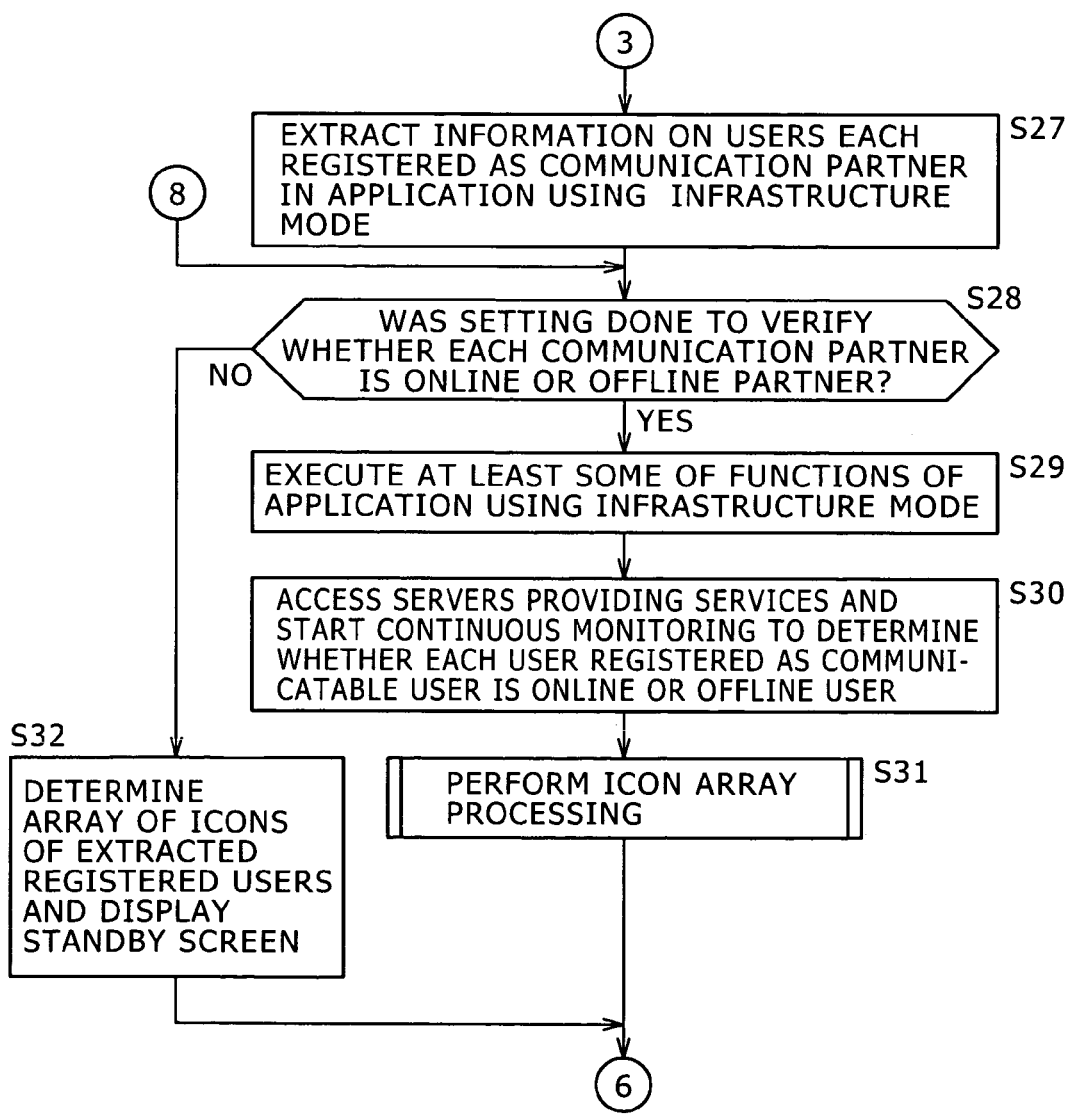
FIG. 54 shows a flowchart referred to in explanation of standby-screen display processing.
Figure 55:
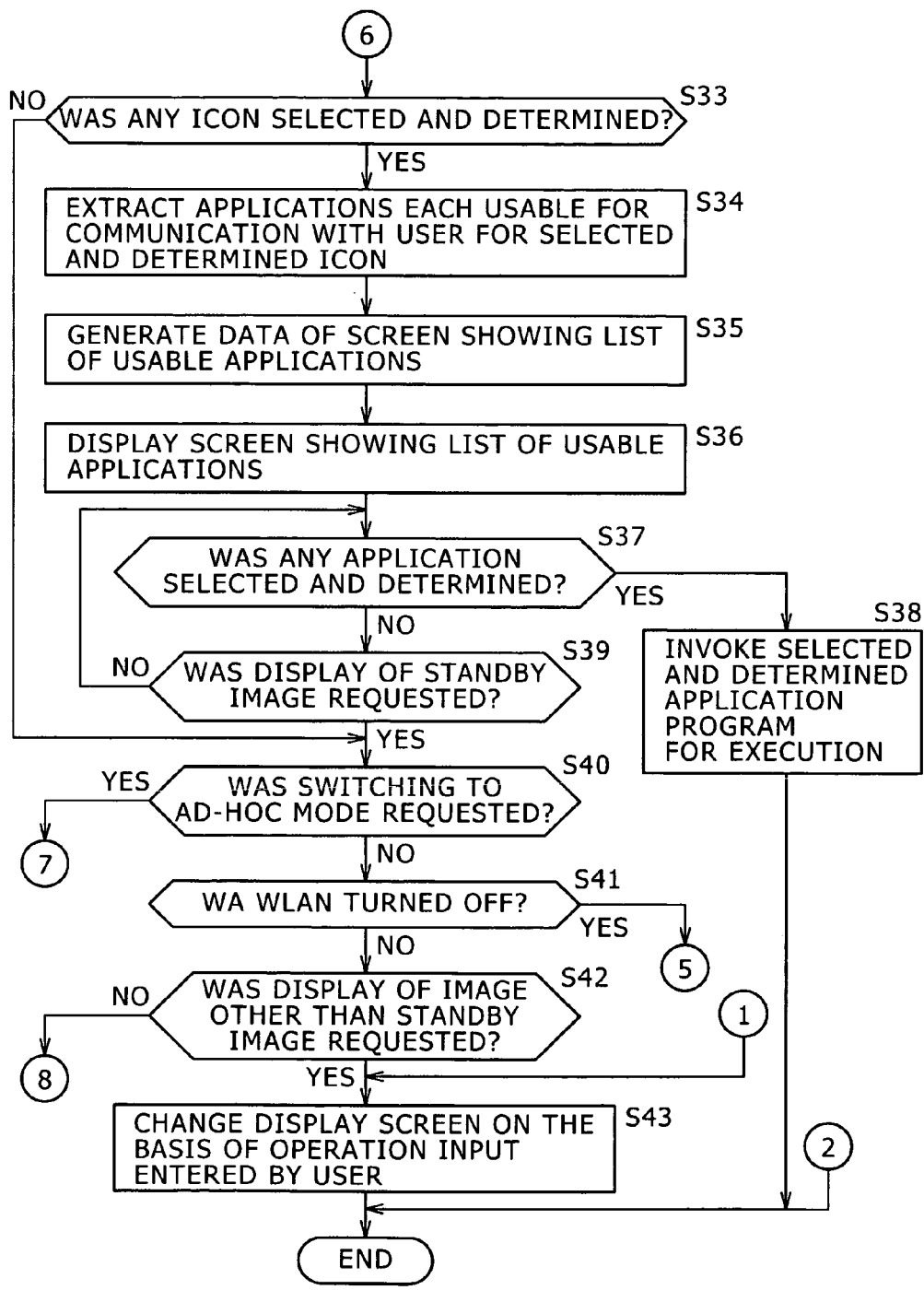
FIG. 55 shows a flowchart referred to in explanation of standby-screen display processing.

In accordance with a second embodiment of the present invention, there is provided an information processing method adopted in an information processing apparatus (such as the information communication terminal 1 shown in FIG. 1) capable of exchanging information with another apparatus. The information processing method includes:

a communication-state information acquisition step (such as steps S2, S4, S8 and S9 of a flowchart shown in FIG. 52, a step S13 of a flowchart shown in FIG. 53 and steps S27 and S30 of a flowchart shown in FIG. 54) of acquiring information on a state of a communication with the other apparatus as well as the following steps (such as steps S7, S11 and S12 of the flowchart shown in FIG. 52, steps S15 and S16 of the flowchart shown in FIG. 53 and steps S31 and S32 of the flowchart shown in FIG. 54);

an information/array determination step of determining an icon for a user owning the other apparatus on the basis of information acquired at the communication-state information acquisition step as the information on a state of a communication with the other apparatus and determining an array including the icon;

an image generation step of generating a display image including the icon determined at the information/array determination step on the basis of an array also determined at the information/array determination step as the array including the icon; and an image display step of displaying the display image generated at the image generation step.

In accordance with a third embodiment of the present invention, there is provided a computer-readable program to be executed by a computer to carry out processing includes:

a communication-state information acquisition step (such as the steps S2, S4, S8 and S9 of the flowchart shown in FIG. 52, the step S13 of the flowchart shown in FIG. 53 and the steps S27 and S30 of the flowchart shown in FIG. 54) of acquiring information on a state of a communication with the other apparatus as well as the following steps (such as the steps S7, S11 and S12 of the flowchart shown in FIG. 52, the steps S15 and S16 of the flowchart shown in FIG. 53 and the steps S31 and S32 of the flowchart shown in FIG. 54);

an information/array determination step of determining an icon for a user owning the other apparatus on the basis of information acquired at the communication-state information acquisition step as the information on a state of a communication with the other apparatus and determining an array including the icon;

an image generation step of generating a display image including the icon determined at the information/array determination step on the basis of an array also determined at the information/array determination step as the array including the icon; and an image display step of displaying the display image generated at the image generation step.

The embodiments of the present invention are explained by referring to diagrams as follows.

Figure 1:
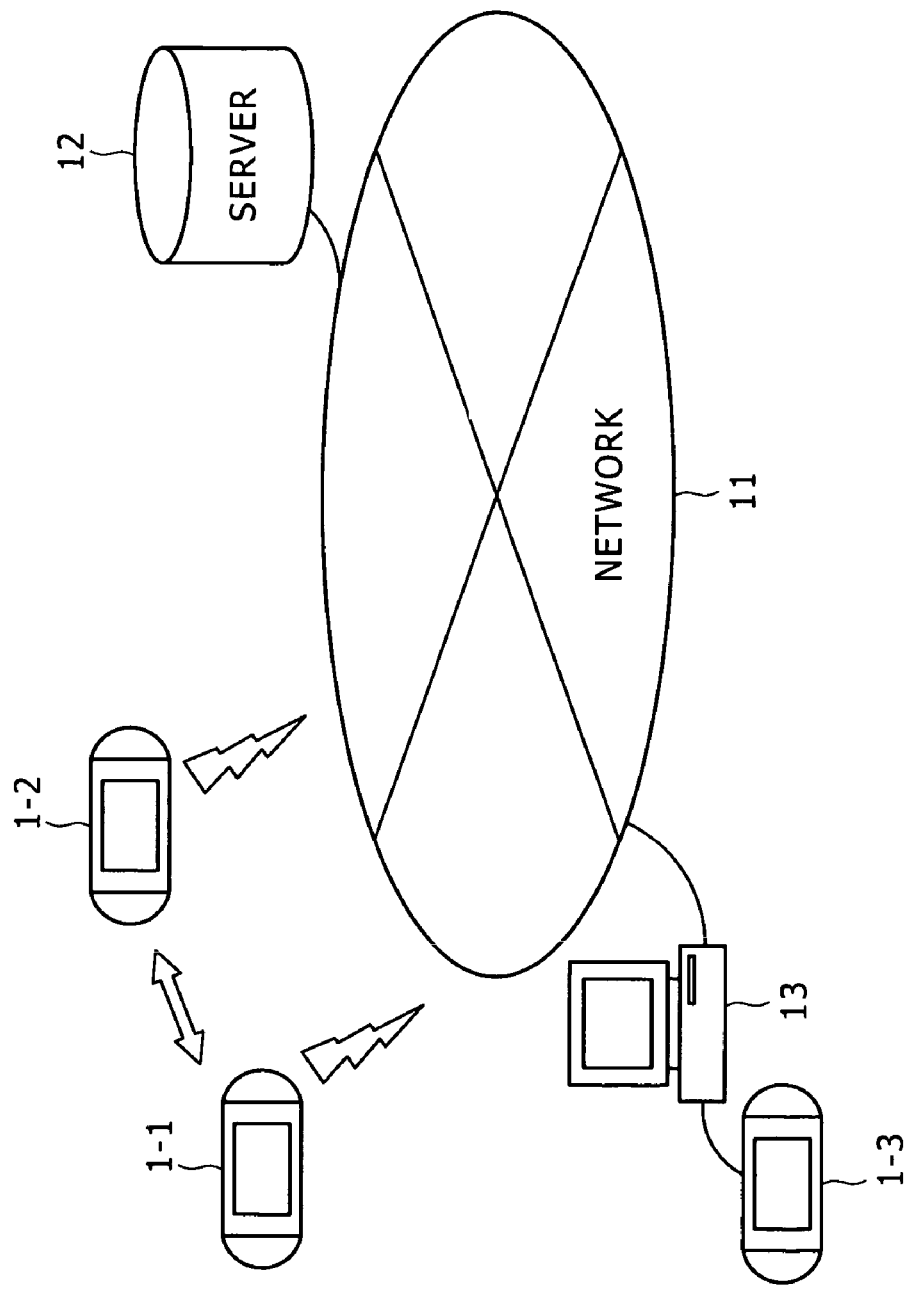
FIG. 1 is an explanatory diagram showing an information communication system including information communication terminals each provided by the present invention.

By referring to FIG. 1, the following description explains an information communication system including information-communication terminals 1-1 to 1-3 each provided by the present invention. It is to be noted that the information communication terminals 1-1 to 1-3 shown in FIG. 1 have the same functions.

Typically, the information communication terminals 1-1 to 1-3 each execute a variety of programs in order to carry out a variety of functions such as a function to communicate information through radio or wired communication, a function to record various kinds of information, a function to reproduce audio and video data, a function to display various kinds of information such as recorded information, reproduced video information an GUI (Graphic User Interface) information serving as an aid helping the user enter an operation input via a variety of input devices and a function to receive an operation input entered by the user. In the following description, the information communication terminals 1-1 to 1-3 are each referred to simply as an information communication terminal 1, which is a generic name representing the information communication terminals 1-1 to 1-3, in case there is no need to distinguish the information communication terminals 1-1 to 1-3 from each other.

To put it concretely, the information communication terminal 1 has a WLAN (Wireless Local Area Network meaning a radio LAN) function conforming to typically a 802.11b standard as a function allowing the information communication terminal 1 to be connected to other apparatus and making the information communication terminal 1 capable of exchanging information with the other apparatus. The information communication terminal 1 is capable of selecting either an infrastructure mode or an ad-hoc mode. The WLAN infrastructure mode is a mode in which the information communication terminal 1 carries out a communication with another information communication terminal through an access point in the WLAN. On the other hand, the WLAN ad-hoc mode is a mode in which the information communication terminal 1 carries out a communication with another information communication terminal without using an access point in the WLAN. The information communication terminal 1 can also be connected to another apparatus by using a cable conforming to typically a USB (Universal Serial Bus) 2.0 standard so that the information communication terminal 1 is capable of exchanging information with the other apparatus. It is to be noted that the USB connection of the information communication terminal 1 may be implemented in accordance with either of an MSC (Mass Storage Class) mode and an MTP (Media Transfer Protocol) mode, either of which can be selected as a USB mode.

That is to say, if the information communication terminal 1 is an apparatus subscribing a predetermined service or an apparatus having a predetermined application program installed therein in order to implement predetermined setting, the information communication terminal 1 is capable of exchanging information with or without a predetermined access point with not only another information communication terminal, but also any other apparatus through a radio or wire communication.

Typically, the information communication terminal 1 includes a flash memory having a typical storage capacity of about 1 GB besides an ordinary volatile memory. In addition, if necessary, the information communication terminal 1 may be typically further provided with a large-capacity storage unit such as a hard disk. On top of that, the information communication terminal 1 has an LCD (Liquid Crystal Display) unit serving as a display device and also has a keyboard used as an input device. If necessary, the information communication terminal 1 may also be provided with other connected input devices such as a mouse and/or a joystick. The information communication terminal 1 may also be provided with a touch panel in addition to the LCD unit if required.

In addition, the information communication terminal 1 is capable of recording audio data supplied thereto and reproducing recorded audio data in accordance with an audio coding method such as an ATRAC3 (Advanced Transform Acoustic Coding 3) method, an MP3 (MPEG Audio Layer-3) method or a WMA (Windows (a registered trademark) Media Audio) method. Furthermore, the information communication terminal 1 also has the so-called photo viewer function for storing video data and reproducing as well as displaying the recorded video data. Moreover, the information communication terminal 1 is capable of avoiding operations such as distribution and exchanging of illegal data without a consent given by its copyright holder in accordance with various kinds of DRM (Digital Rights Management) such as OpenMG management or WMT10 (Janus) management.

On top of that, the information communication terminal 1 may have a variety of application programs installed therein as programs to be executed to carry out various kinds of processing. The application programs include an IP telephone program, an instant messenger, an email program, a web browser and a text editor.

Furthermore, the information communication terminal 1 has such a size that the information communication terminal 1 can be grasped by a hand of the user, providing desirable convenience such as portability to the user.

In addition, the information communication terminal 1 can be connected to a network 11 such as the Internet directly by a radio communication so that the information communication terminal 1 is capable of exchanging information with a variety of servers 12, a variety of personal computers 13 and other information communication terminals 1 through the network 11. The other information communication terminals 1 are any of the information communication terminals 1-1 to 1-3 shown in the figure.

Moreover, the information communication terminal 1 is also capable of exchanging information directly with other information communication terminals 1 by a radio communication. The other information communication terminals 1 are any of the information communication terminals 1-1 to 1-3 shown in the figure.

On top of that, the information communication terminal 1 can be connected to the personal computer so that the information communication terminal 1 is capable of exchanging information with the personal computer 13 as well as a variety of servers and other information communication terminals through the network 11 (such as the Internet) connected to the personal computer 13. In the example shown in the figure, the information communication terminal 1-3 is connected to the personal computer 13.

In addition, it is needless to say that the network 11 employed in the information communication system can be connected to more information communication terminals 1, more servers 12 and more personal computers 13.

Figure 2:
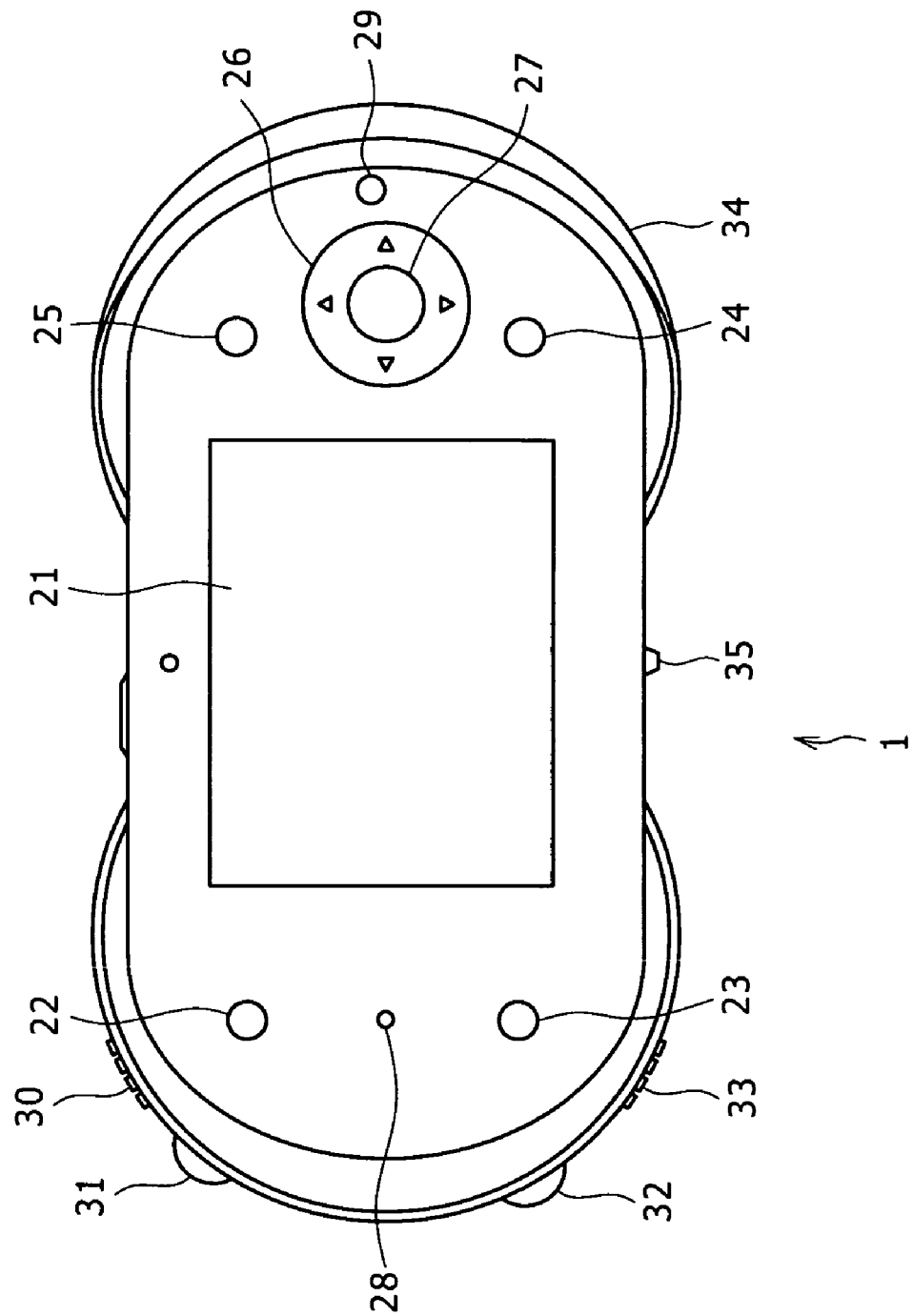
FIG. 2 is a diagram showing the front view of the external appearance of the information communication terminal.

Next, the external appearance of the information communication terminal 1 is explained by referring to FIGS. 2 to 8. FIG. 2 is a diagram showing the front view of the external appearance of the information communication terminal 1.

As shown in the figure, the front face of the information communication terminal 1 has a display unit 21, a WLAN-mode switching button 22, a home button 23, a back button 24, an option button 25, 4-direction keys 26, an enter button 27, a speaker 28 and a mike 29. The left-side face of the information communication terminal 1 includes a WLAN on/off switch 30, a WLAN-state notification light emitting unit 31, a power-supply-state notification light emitting unit 32 and a power-supply switch 33. The left-side face is a face located on the left side when seen from a position facing the display unit 21. The right-side face of the information communication terminal 1 has a communication-state notification light emitting unit 34. The right-side face is a face located on the right side when seen from the position facing the display unit 21. The bottom of the information communication terminal 1 has a music key 35. The bottom is a face located on the lower side when seen from the position facing the display unit 21.

The display unit 21 is typically a flat display unit such as an LCD unit capable of displaying various kinds of information. The information displayed on the display unit 21 includes information on the state of the information communication terminal 1. Displays of the information on the state of the information communication terminal 1 are explained by referring to FIGS. 8 and 9. Other information displayed on the display unit 21 in various kinds of processing carried out by the information communication terminal 1 will also be properly described later.

The WLAN-mode switching button 22 is a button to be operated by the user to enter an operation input for switching the radio LAN on and off.

The home button 23 is a button to be operated by the user to enter an operation input for displaying a home menu on the display unit 21 without regard to the type of information currently displayed on the display unit 21. The home menu will be described later by referring to FIG. 14.

The back button 24 is a button to be operated by the user to enter an operation input for restoring the display screen displayed immediately before the current display screen.

The option button 25 is a button to be operated by the user to enter an operation input for showing a display screen used for displaying a variety of optional tools.

The 4-direction keys 26 are each a key to be operated by the user to enter an operation input for moving typically a cursor over a screen of information displayed on the display unit 21 in one of four directions, changing typically a selected button or a selected icon or carrying out another operation.

The enter button 27 is a button to be operated by the user to enter an operation input for making a final decision to determine a selected menu, a selected button, a selected icon or another selected item.

The speaker 28 is a speaker for outputting voices of a phone conversation such as in an IP telephone call and sounds reproduced by a predetermined application. The sounds reproduced by a predetermined application are audio data recorded in advance in the information communication terminal 1.

The mike 29 is an input component for inputting voices of a phone conversation in an IP telephone call and sounds acquired by a predetermined application.

The WLAN on/off switch 30 is a switch to be operated by the user to switch a radio communication function of the information communication terminal 1 from an enabled state to a disabled state and vice versa.

The WLAN-state notification light emitting unit 31 is typically a light emitting device and a light guide tube or a plurality of light emitting devices and a plurality of light guide tubes. An example of the light emitting device is an LED (light emitting diode). The WLAN-state notification light emitting unit 31 is a component for notifying the user of an enabled state or a disabled state of the radio communication function included in the information communication terminal 1. For example, if the radio communication function included in the information communication terminal 1 is in the enabled state, the WLAN-state notification light emitting unit 31 is turned on to emit light. If the radio communication function included in the information communication terminal 1 is in the disabled state, on the other hand, the WLAN-state notification light emitting unit 31 is turned off to cease transmission of light. In order to turn on the WLAN-state notification light emitting unit 31 or put the WLAN-state notification light emitting unit 31 in a blinking state, the communication-state notification light emitting unit 34 drives the LEDs to emit light through the light guide tubes.

The power-supply-state notification light emitting unit 32 is typically a light emitting device having an LED (light emitting diode) or a plurality of LEDs. The power-supply-state notification light emitting unit 32 is a component for notifying the user of information such as information on whether or not the power supply of the information communication terminal 1 has been turned on and whether the power supply is being electrically charged or the process to electrically charge the power supply has been completed. For example, the power-supply-state notification light emitting unit 32 is put in an on state when the power supply is turned on. When the power supply is turned off, on the other hand, the power-supply-state notification light emitting unit 32 is also put in an off state as well. In addition, when the power supply is being electrically charged, the power-supply-state notification light emitting unit 32 is put in an on state showing a color different from a color, which is shown when the power supply is turned on.

The power-supply switch 33 is a switch for turning the power supply of the information communication terminal 1 on or off.

The communication-state notification light emitting unit 34 is typically a light emitting device having an LED (light emitting diode) or a plurality of LEDs. The communication-state notification light emitting unit 34 is a component for notifying the user of the communication state of the information communication terminal 1. For example, in a WLAN infrastructure mode, the communication-state notification light emitting unit 34 is put in an on state showing a color different from a color, which is shown in a WLAN ad-hoc mode. When an IP telephone call arrives, the communication-state notification light emitting unit 34 is put in either of an on state and a blinking state, which show another color. That is to say, the communication-state notification light emitting unit 34 is put in an off state or either of the on and blinking states showing different colors depending on the radio communication state of the information communication terminal 1.

The WLAN infrastructure mode is a mode adopting a method of communication through a radio LAN access point. On the other hand, the WLAN ad-hoc mode adopting a method to directly exchange data among apparatus without making use of a radio LAN access point.

The music key 35 is a key used for entering an input making a request for an operation such as an operation to start a reproduction process, an operation to end a reproduction operation, a fast-forward operation, a rewind operation, a temporary stop, a reversed-direction AMS (Auto Music Scan) for the beginning of a piece of music or another operation.

Figure 3:
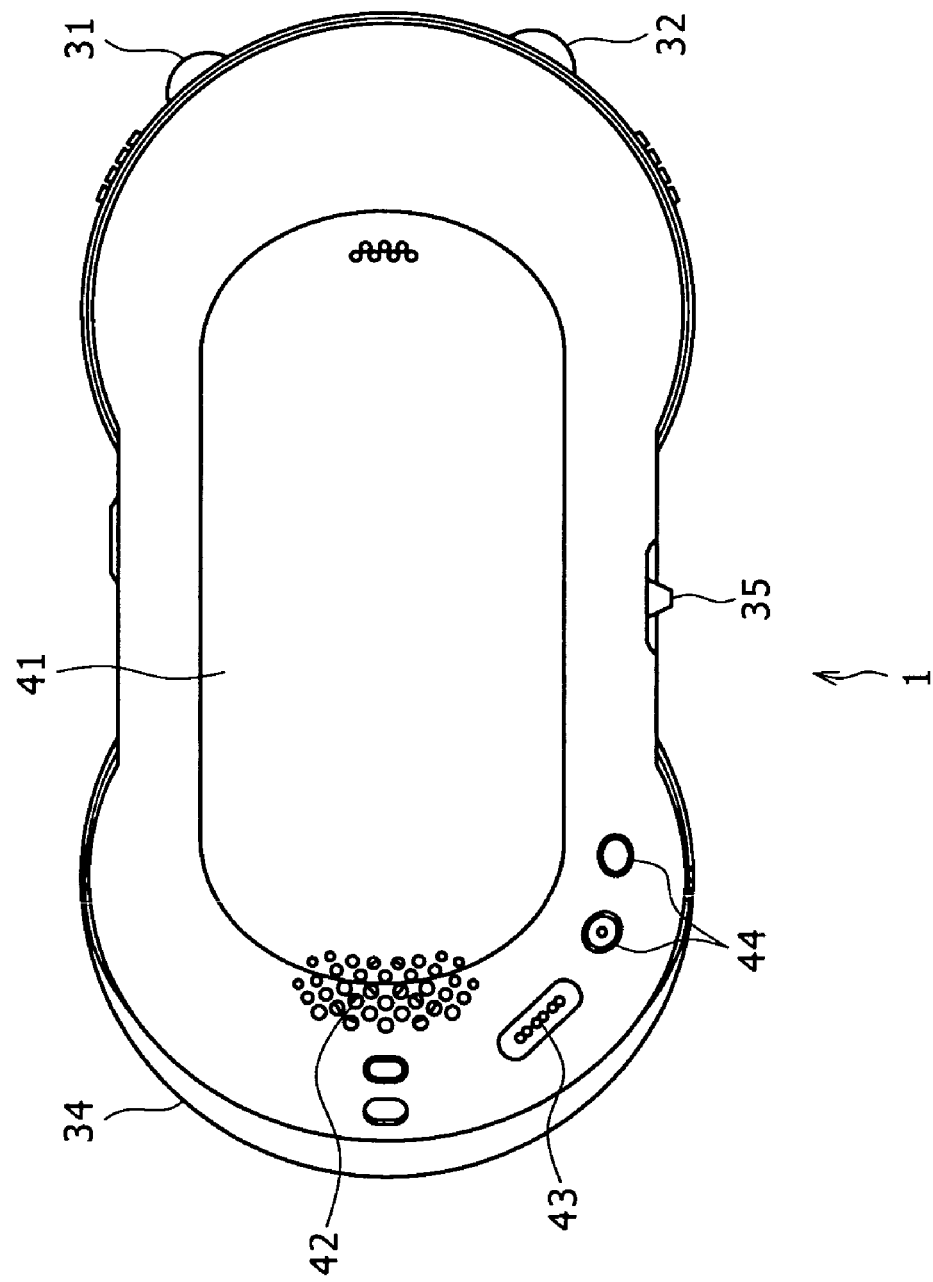
FIG. 3 is a diagram showing the rear view (opposite side to the face on which the display unit is visible) of the external appearance of the information communication terminal.

FIG. 3 is a diagram showing the rear view of the external appearance of the information communication terminal 1. The rear face is the face on the opposite side of the display unit 21.

As shown in the figure, the rear face of the information communication terminal 1 includes a battery cover 41 in addition to a ringer speaker 42, a hold switch 43 and a volume button 44, which are provided on a side in close proximity to the communication-state notification light emitting unit 34.

The battery cover 41 covers a battery mounting portion and a battery for supplying power to a variety of components employed in the information communication terminal 1.

The ringer speaker 42 is a speaker used mainly for outputting musical data stored on and reproduced from the information communication terminal 1 or outputting musical data streamed from another information communication terminal 1. The ringer speaker 42 is also a speaker for outputting, for example, a calling sound in the event of an arriving IP phone call.

The hold switch 43 is a switch to be operated by the user to invalidate inputs entered via all buttons and all switches in order to prevent an operation unintended by the user from being carried out due to an inadvertent operation performed on any of the buttons and switches typically when the information communication terminal 1 is kept in a pocket or a bag.

The volume button 44 is a button to be operated by the user to adjust the volume of a sound output by the ringer speaker 42.

Figure 4:
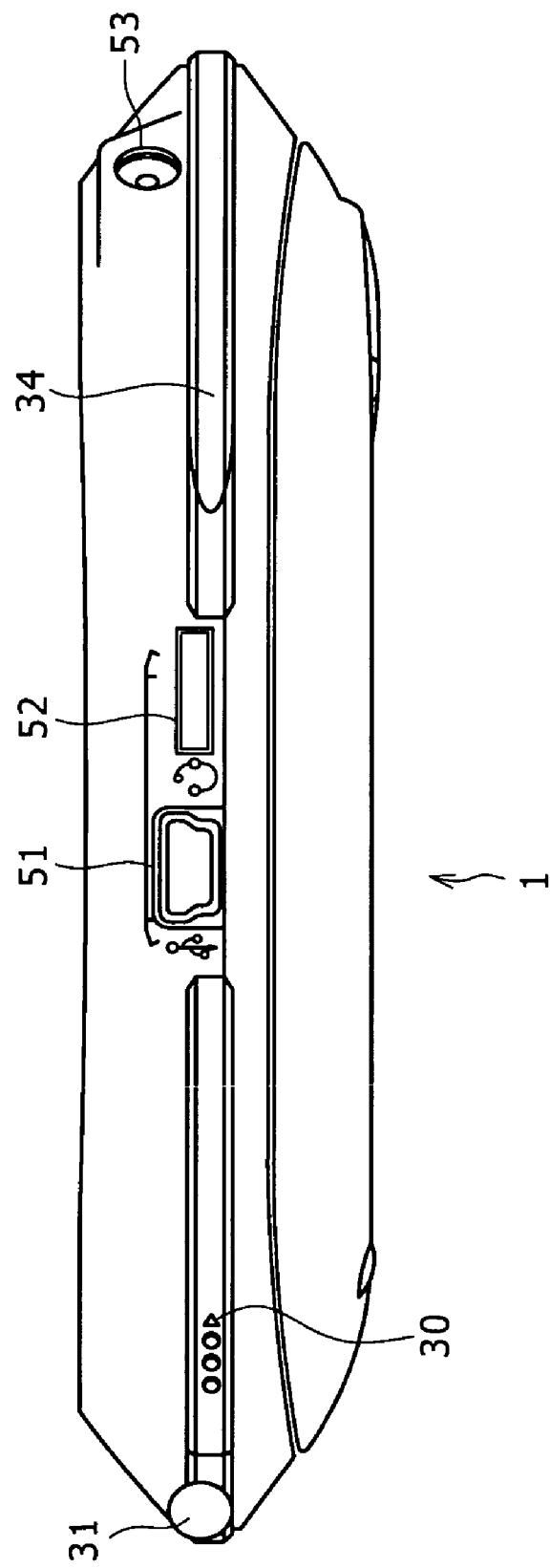
FIG. 4 is a diagram showing the top view of the external appearance of the information communication terminal where the top is defined as the side having a WLAN on/off switch.

FIG. 4 is a diagram showing the top view of the external appearance of the information communication terminal. In this case, the top is defined as the side having the WLAN on/off switch 30.

As shown in the figure, the top of the information communication terminal 1 includes a USB connector 51, a connector jack 52 and a DC jack 53.

A USB cable is connected to the USB connector 51, allowing the information communication terminal 1 to exchange information with another apparatus. As the USB connector 51, it is demanded to provide at least a downstream-side connector, and an upstream-side connector may be provided. The downstream-side connector is the so-called series-B or series-mini-B connector for connecting the information communication terminal 1 to the personal computer 13. On the other hand, the upstream-side connector is the so-called series-A connector for connecting the information communication terminal 1 to a peripheral apparatus. In addition, the information communication terminal 1 can receive a power supply via a USB connection.

The connector jack 52 is typically a 10-pin flat connector for connecting the information communication terminal 1 to an audio input/output device such as a headphone or a mike.

The DC jack 53 is used for receiving power of a DC power supply. In general, the DC jack 53 is connected to an AC/DC converter for converting the 100V AC power generated by the home power supply into a DC power supplied to the information communication terminal 1.

Figure 5:
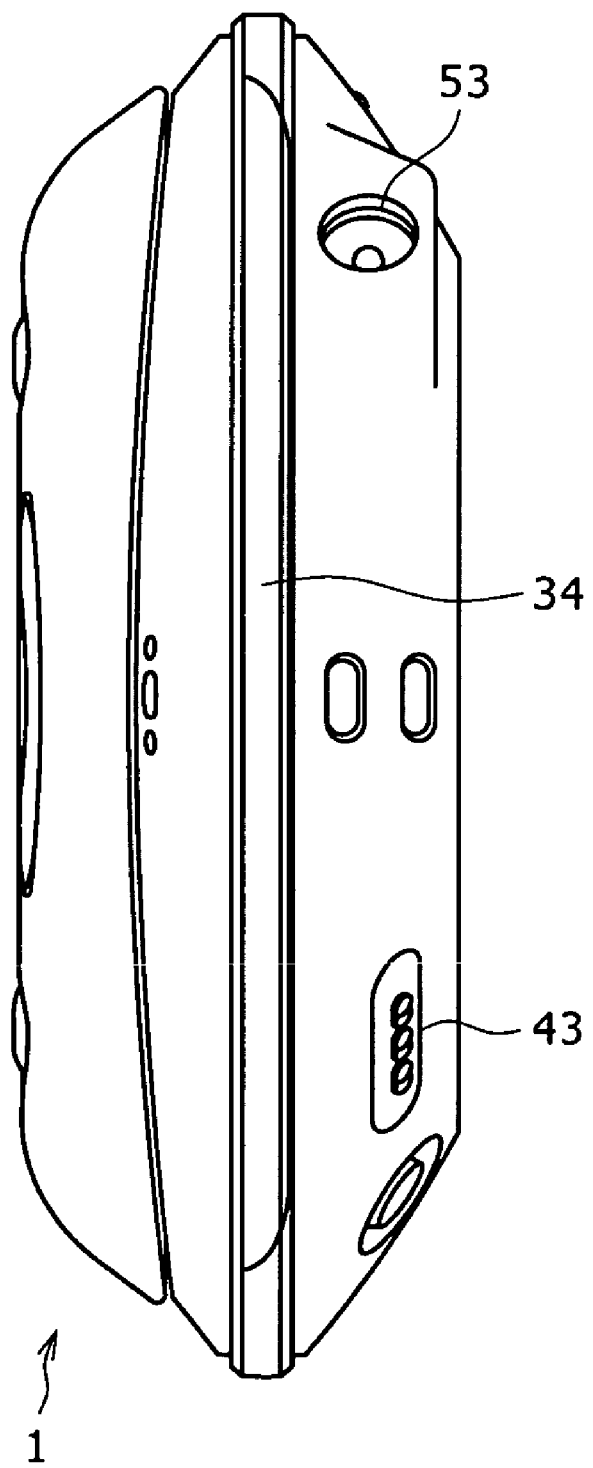
FIG. 5 is a diagram showing the right-side view of the external appearance of the information communication terminal where the right side is defined as the side located in the right when seen from a position at which a display unit of the information communication terminal is visible or, in other words, the right side is defined as the side having a communication-state notification light emitting unit.

FIG. 5 is a diagram showing the right-side view of the external appearance of the information communication terminal 1. In this case, the right side is defined as the side located in the right when seen from a position at which the display unit 21 of the information communication terminal 1 is visible or, in other words, the right side is defined as the side having a communication-state notification light emitting unit 34.

As shown in FIG. 5, the right-side face of the information communication terminal 1 also includes the hold switch 43 and the DC jack 53 in addition to the communication-state notification light emitting unit 34.

Figure 6:
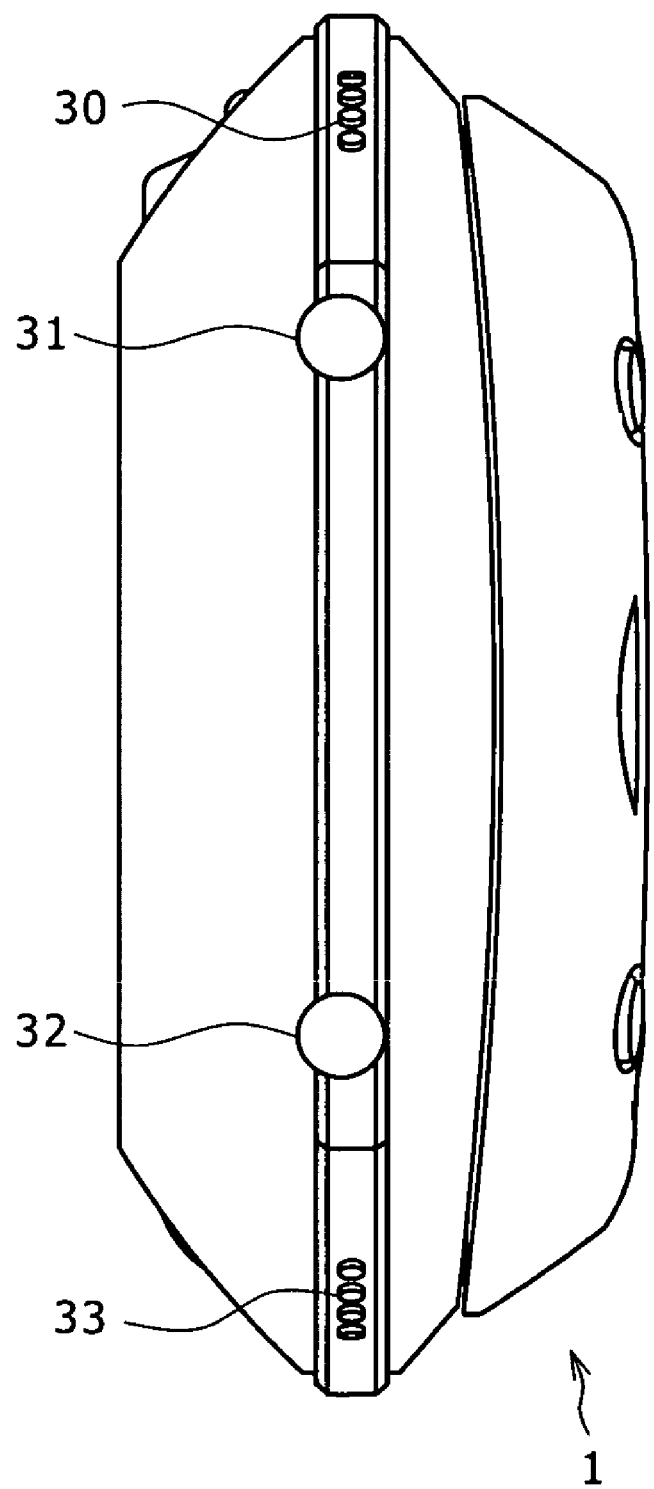
FIG. 6 is a diagram showing the left-side view of the external appearance of the information communication terminal where the left side is defined as the side located in the left when seen from a position at which the display unit of the information communication terminal is visible or, in other words, the left side is defined as the side having the WLAN on/off switch and a power-supply switch.

FIG. 6 is a diagram showing the left-side view of the external appearance of the information communication terminal 1. In this case, the left side is defined as the side located in the left when seen from a position at which a display unit 21 of the information communication terminal 1 is visible or, in other words, the right side is defined as the side having the WLAN on/off switch 30 and the power-supply switch 33.

As shown in FIG. 6, the left-side face of the information communication terminal 1 also includes the WLAN-state notification light emitting unit 31 and the power-supply-state notification light emitting unit 32 in addition to the WLAN on/off switch 30 and the power-supply switch 33.

Figure 7:
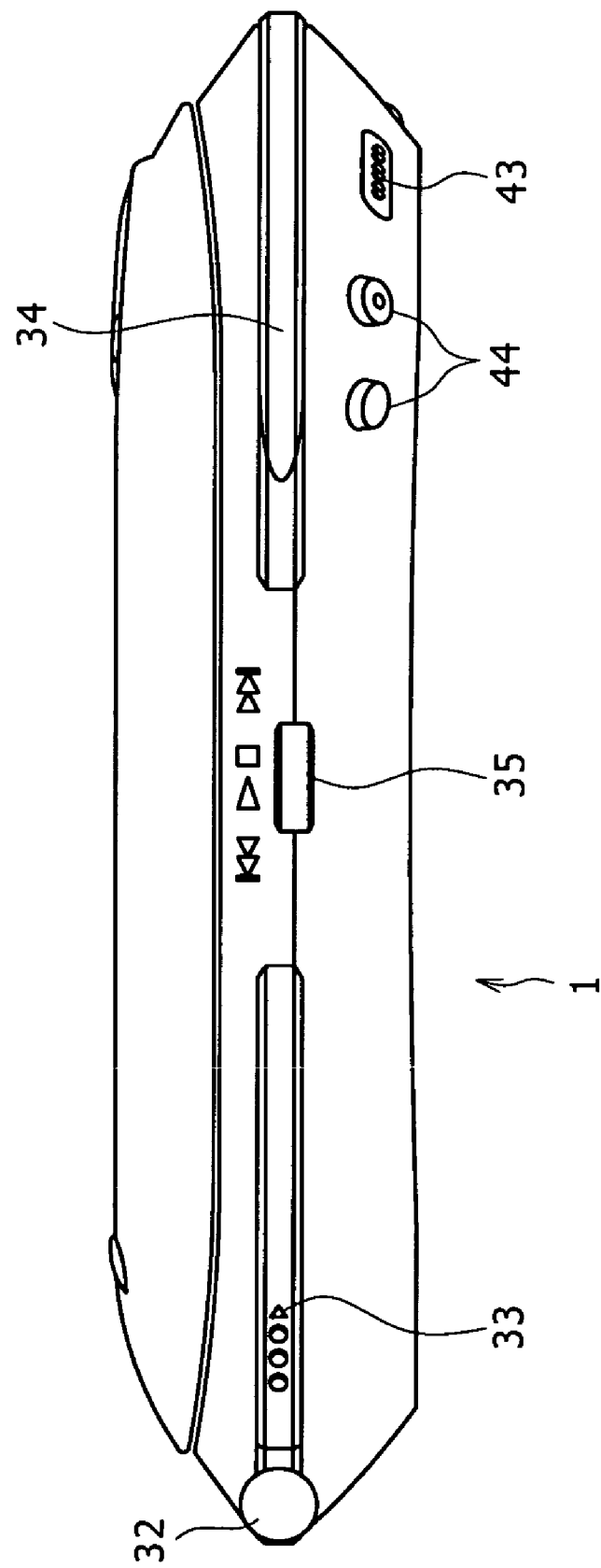
FIG. 7 is a diagram showing the bottom view of the external appearance of the information communication terminal where the bottom is defined as the side having the power-supply switch and a music key.

FIG. 7 is a diagram showing the bottom view of the external appearance of the information communication terminal 1. In this case, the bottom is defined as the side having the power-supply switch 33 and the music key 35.

As shown in FIG. 7, the bottom of the information communication terminal 1 also includes the power-supply-state notification light emitting unit 32, the communication-state notification light emitting unit 34, the hold switch 43 and the volume button 44 in addition to the power-supply switch 33 and the music key 35.

Figure 8:
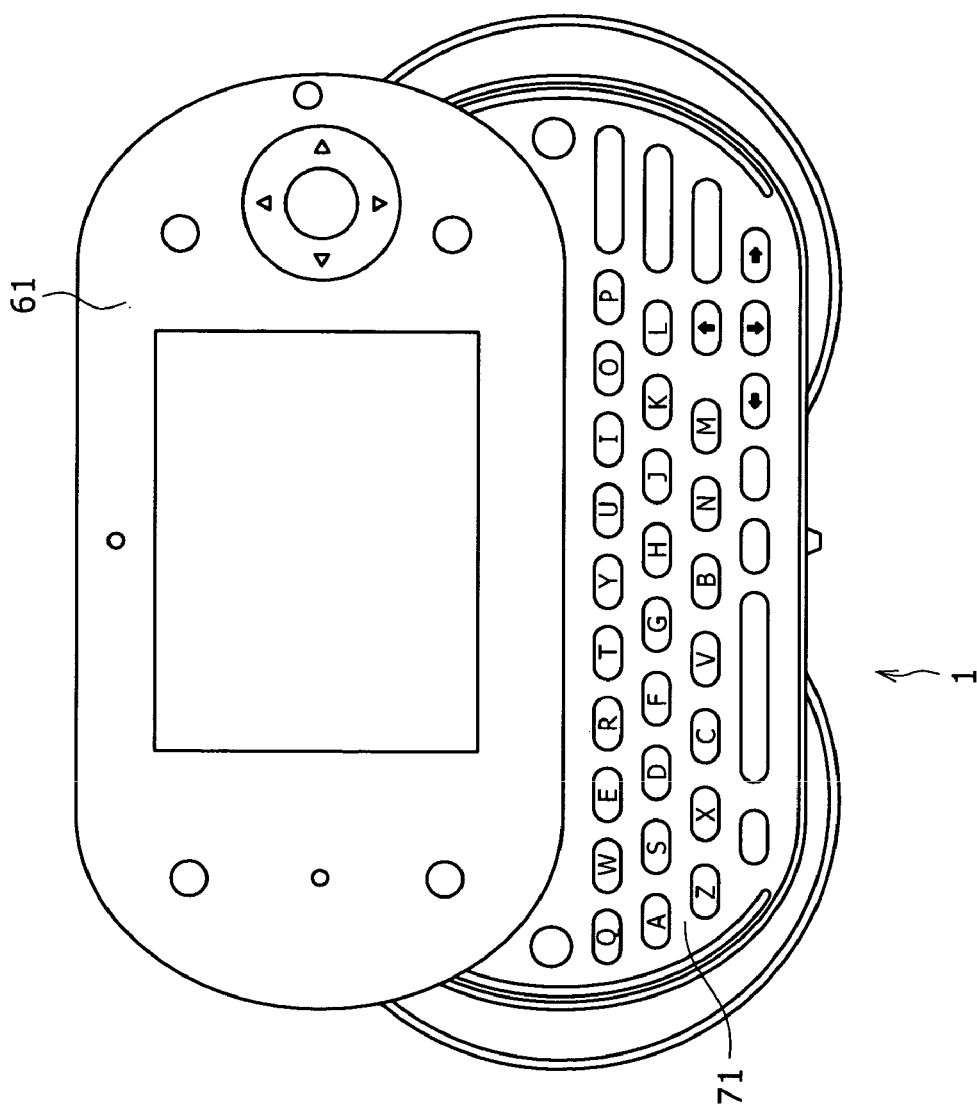
FIG. 8 is a diagram showing the front view of the external appearance of the information communication terminal with its cover slid upward.

The information communication terminal 1 is configured to allow the cover 61 of the front face to be slid in the upward direction. As described earlier, the cover 61 has the display unit 21, the WLAN-mode switching button 22, the home button 23, the back button 24, the option button 25, the 4-direction keys 26, the enter button 27, the speaker 28 and the mike 29. The upward direction is an upward direction seen at a position in front of the display unit 21. With the cover 61 sled upward, a keyboard 71 is exposed to the user. FIG. 8 is a diagram showing the front view of the external appearance of the information communication terminal 1 with its front cover 61 slid upward.

The following description explains operation inputs related to the power supply and the WLAN as well as the states of the light emitting units explained above by referring to FIGS. 2 to 7.

First of all, with the power supply of the information communication terminal 1 put in an off state, the light emitting units including the power-supply-state notification light emitting unit 32 do not emit light either. Then, let us assume that the power-supply switch 33 is turned on in order to change the state of the power supply from the off state to an on state. In this case, the power-supply-state notification light emitting unit 32 emits light having a predetermined color indicating that the power supply has been put in the on state. In this state, the information communication terminal 1 is capable of accepting a normal operation input entered by the user.

With the power supply of the information communication terminal 1 put in an on state, that is, with the power-supply-state notification light emitting unit 32 put in a state of emitting light having a predetermined color indicating that the power supply has been put in the on state, the WLAN is still in an off state indicated by the WLAN-state notification light emitting unit 31 also being in an off state as well. In order to change the state of the WLAN from the off state to an on state, the user needs to operate the WLAN on/off switch 30. Typically, the WLAN on/off switch 30 is a slide-type switch to be slid in order to put the WLAN in an on or off state. In this case, the user can slide the WLAN on/off switch 30 in a predetermined direction in order to change the state of the WLAN from the off state to an on state. When the user slides the WLAN on/off switch 30 in the predetermined direction in order to change the state of the WLAN from the off state to the on state, the information communication terminal 1 is put in a state of being capable of carrying out a radio communication through the WLAN. In this state, the WLAN-state notification light emitting unit 31 is emitting light.

When the WLAN on/off switch 30 is operated in order to start a radio communication as described above, the information communication terminal 1 gets into a communication mode, which can be a WLAN infrastructure mode or a WLAN ad-hoc mode. Either the WLAN infrastructure mode or the WLAN ad-hoc mode is selected as the communication mode in accordance with setting. As an alternative, the information communication terminal 1 gets into the WLAN infrastructure mode or the WLAN ad-hoc mode, which was selected last as the communication mode.

The communication-state notification light emitting unit 34 is emitting light having a color determined on the basis of whether the present communication mode of the information communication terminal 1 is the WLAN infrastructure mode or the WLAN ad-hoc mode. In addition, the communication-state notification light emitting unit 34 emits light after the WLAN-state notification light emitting unit 31 emits light without regard to the state of the connection of the information communication terminal 1 to the WLAN. As an alternative, the communication-state notification light emitting unit 34 emits light only after such a connection has been established. On top of that, the communication-state notification light emitting unit 34 may emit light with an intensity determined by the strength of an electric wave received by the information communication terminal 1.

With the power supply of the information communication terminal 1 put in an on state, that is, with the power-supply-state notification light emitting unit 32 put in a state of emitting light having a predetermined color indicating that the power supply has been put in the on state and with the WLAN infrastructure mode selected as the communication mode, whereas the communication-state notification light emitting unit 34 put in a state of emitting light having a predetermined color indicating that the WLAN infrastructure mode has been selected as the communication mode, the user may want to change the communication mode from the WLAN infrastructure mode to the WLAN ad-hoc mode. In this case, the user needs to operate the WLAN-mode switching button 22. For example, the user presses the WLAN-mode switching button 22 downward in order to change the communication mode from the WLAN infrastructure mode to the WLAN ad-hoc mode. As a result, the communication mode is changed from the WLAN infrastructure mode to the WLAN ad-hoc mode indicated by the communication-state notification light emitting unit 34 emitting light with its color changed from the color indicating that the WLAN infrastructure mode has been selected as the communication mode to a predetermined color indicating that the WLAN ad-hoc mode has been selected as the communication mode.

With the WLAN ad-hoc mode selected as the communication mode of the information communication terminal 1, that is, with the WLAN-state notification light emitting unit 31 emitting light and the communication-state notification light emitting unit 34 emitting light having a predetermined color indicating the WLAN ad-hoc mode has been selected as the communication mode of the information communication terminal 1, let us assume that the user wants to switch the communication mode from the WLAN ad-hoc mode to the WLAN infrastructure mode. In this case the user needs to operate the WLAN-mode switching button 22. When the user operates the WLAN-mode switching button 22, the communication mode of the information communication terminal 1 is switched from the WLAN ad-hoc mode to the WLAN infrastructure mode as evidenced by the communication-state notification light emitting unit 34 emitting light with its color changed from the color indicating that the WLAN ad-hoc mode has been selected as the communication mode to a predetermined color indicating that the WLAN infrastructure mode has been selected as the communication mode.

With the power supply of the information communication terminal 1 put in an on state, that is, with the power-supply-state notification light emitting unit 32 put in a state of emitting light having a predetermined color indicating that the power supply has been put in the on state, let us assume that the user wants to turn of the WLAN off. In this case, the user needs to operate the WLAN on/off switch 30. Typically, the WLAN on/off switch 30 is a slide-type switch to be slid in order to put the WLAN in an on or off state. In this case, the user can slide the WLAN on/off switch 30 in a predetermined direction in order to change the state of the WLAN from the on state to an off state. When the user slides the WLAN on/off switch 30 in the predetermined direction in order to change the state of the WLAN from the on state to the off state, the information communication terminal 1 is put in a state of being no longer capable of carrying out a radio communication through the WLAN. In this state, the WLAN-state notification light emitting unit 31 is not emitting light anymore.

If the communication-state notification light emitting unit 34 emits light after the WLAN-state notification light emitting unit 31 emits light without regard to the state of the connection of the information communication terminal 1 to the WLAN, the communication-state notification light emitting unit 34 stops emitting light after the WLAN-state notification light emitting unit 31 ceases to emit light. If the communication-state notification light emitting unit 34 emits light after the connection of the information communication terminal 1 to the WLAN has been established, on the other hand, the communication-state notification light emitting unit 34 stops emitting light after the connection is cut off even if the WLAN is still an on state. The communication-state notification light emitting unit 34 also stops emitting light as the WLAN-state notification light emitting unit 31 ceases to emit light when the WLAN is turned off with the connection of the information communication terminal 1 to the WLAN established.

The power supply can be in one of two different off states. One of the two off state is referred to as a first power-supply off state or a user off state. The power supply is put in the first power-supply off state when the user turns off the power supply and no operation input is entered by the user within three days after the user turns off the power supply. In the first power-supply off state, however, power is supplied to a processor to be described later so that, when the user turns on the power supply with the power supply put in the first power-supply off state, the information communication terminal 1 can be activated immediately.

The other off state is referred to as a second power-supply off state or a deep off state. The power supply is put in the second power-supply off state when the user turns off the power supply and no operation input is entered by the user even after the lapse of three consecutive days since the user turns off the power supply. In the second power-supply off state, no power is supplied to the processor to be described later so that, when the user turns on the power supply with the power supply put in the second power-supply off state, it takes time of a predetermined length such as 30 seconds to put the information communication terminal 1 in a state of being ready for activation.

The information communication terminal 1 can be electrically charged by putting the information communication terminal 1 in a USB-connected state by making use of the USB connector 51 or by supplying DC power to the information communication terminal 1 by way of the DC jack 53. In general, the DC jack 53 is connected to an AC/DC converter for converting the 100V AC power generated by the home power supply into a DC power supplied to the information communication terminal 1. While the information communication terminal 1 is being electrically charged, the power-supply-state notification light emitting unit 32 is emitting light having a predetermined color indicating that the information communication terminal 1 is being electrically charged.

The following description explains the continuous display panel 101, which is basically displayed on the display unit 21 all the time.

As shown in FIG. 9, the continuous display panel 101 appears typically in a predetermined area stretched along the bottom line of the display unit 21. Basically, the continuous display panel 101 appears all the time. The continuous display panel 101 shows various kinds of information such as ones described in FIG. 10 as information on the state of the information communication terminal 1.

For example, the continuous display panel 101 includes a battery residual charge amount display area 111, a WLAN wave-strength display area 112, a WLAN state display area 113, a communication utilization application state display area 114, a keyboard input mode display area 115 and a clock display area 116.

The battery residual charge amount display area 111 is an area for showing information on the amount of electrical charge left in a battery. Typical displays in the battery residual charge amount display area 111 are 0%, 25%, 50%, 75% and 100%. When the battery is being charged, an animation indicating a battery state of being electrically charged is displayed.

The WLAN wave-strength display area 112 is an area for showing information on the strength of the WLAN. To put it concretely, this display typically shows the strength of the WLAN at four stages, i.e., 0, 1, 2 and 3.

The WLAN state display area 113 is an area for showing information on the mode and connection state of the WLAN. To put it concretely, the WLAN state display area 113 typically displays a WLAN mode such as an off mode, the WLAN infrastructure mode and the WLAN ad-hoc mode as well as a WLAN connection state such as a connected state (or a state of being connected) or an offline state.

The communication utilization application state display area 114 is an area for showing information on the state of execution of an Application carrying out a communication in either the WLAN infrastructure mode or the WLAN ad-hoc mode. Specifically, for example, in the WLAN infrastructure mode, if an IP telephone application is executed in order to carrying out a communication, the state of execution of the IP telephone application is shown in the communication utilization application state display area 114. If an instant messenger application is executed in order to carry out a communication in the WLAN infrastructure mode, the communication utilization application state display area 114 shows the state of execution of the instant messenger application. If an application making use of ad-hoc connection is executed in the WLAN ad-hoc mode, on the other hand, the communication utilization application state display area 114 shows connection information of the WLAN ad-hoc mode. An example of the connection information of the WLAN ad-hoc mode is information on whether or not a one-to-one communication is going on.

The keyboard input mode display area 115 is an area for showing information on the input mode of a special key on the keyboard. The special keys include Alt, Num, Shift and Fn. In the case of Hold, a Hold mark is displayed in the keyboard input mode display area 115.

The clock display area 116 is an area for showing information generated by a clock.

Let us keep in mind that it is needless to say that the continuous display panel 101 may also display various kinds of information on the states of the information communication terminal 1 other than the pieces of information described above.

Figure 11:
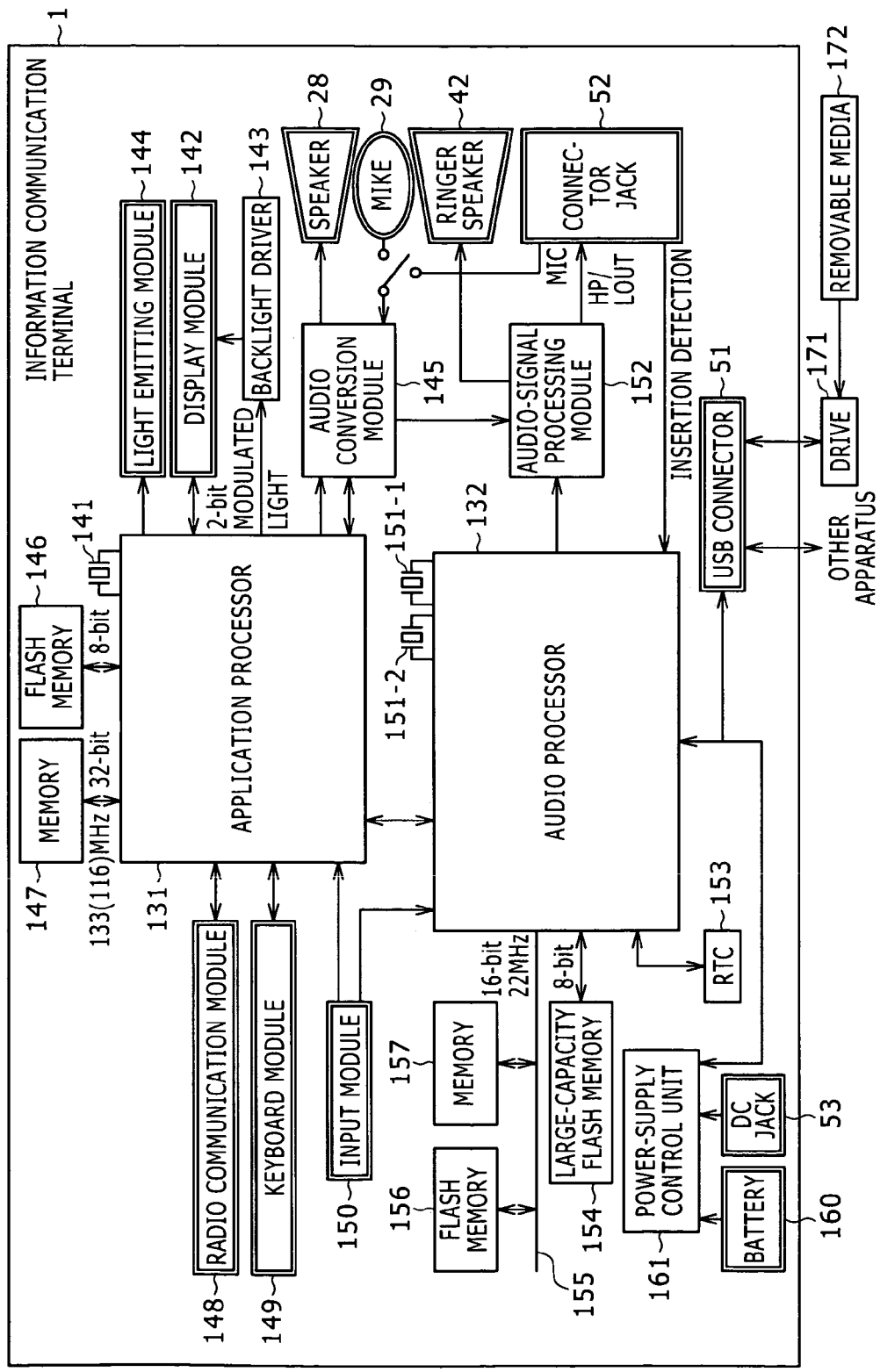
FIG. 11 is a block diagram showing the internal configuration of the information communication terminal.

FIG. 11 is a block diagram showing the internal configuration of the information communication terminal 1.

The information communication terminal 1 includes an application processor 131 and an audio processor 132. The application processor 131 is a processor used mainly for executing an application program. On the other hand, the audio processor 132 is a processor for executing functions such as management of audio data, coding and decoding of audio data and management of copyrights. The application processor 131 and the audio processor 132 are connected to each other typically by making use of one serial interface or one parallel interface or a plurality of serial or parallel interfaces so that the application processor 131 and the audio processor 132 are capable of exchanging control signals and data with each other.

The application processor 131 carries out various kinds of processing on the basis of a clock signal generated by a clock generation unit 141. Details of functions carried out by the application processor 131 will be described later by referring to FIG. 12.

The application processor 131 is connected to a display module 142, a backlight driver 143, a light emitting module 144, an audio conversion module 145, a flash memory 146, a memory 147, a radio communication module 148, a keyboard module 149 and an input module 150. The input module 150 is also connected to the audio processor 132.

The display module 142 is configured to include the display unit 21. If an LCD unit is employed as the display unit 21, the display module 142 is configured to also include an LCD driver, an LCD backlight and, if necessary, components such as a light guide tube required in an operation to display information on the display unit 21. The display module 142 displays various kinds of information on the display unit 21 in accordance with control executed by the application processor 131.

The backlight driver 143 is a driver for the backlight of the display unit 21.

The light emitting module 144 includes the WLAN-state notification light emitting unit 31, the power-supply-state notification light emitting unit 32, the communication-state notification light emitting unit 34 and drivers for driving light emitting devices employed in the WLAN-state notification light emitting unit 31, the power-supply-state notification light emitting unit 32 and the communication-state notification light emitting unit 34. The light emitting module 144 puts the WLAN-state notification light emitting unit 31, the power-supply-state notification light emitting unit 32 and the communication-state notification light emitting unit 34 in an on, blinking or off state in accordance with control executed by the application processor 131. In the on and blinking states, the WLAN-state notification light emitting unit 31, the power-supply-state notification light emitting unit 32 and the communication-state notification light emitting unit 34 each emit light having a predetermined color.

The audio conversion module 145 includes embedded components such as a PLL circuit, an A/D converter, a D/A converter and a DSP core. The DSP core is capable of carrying out filter processing and equalizer processing. The filter processing includes processing of a high-pass filter and a notch filter. To be more specific, in accordance with control executed by the application processor 131, the audio conversion module 145 carries out an A/D conversion process on a sound input by the mike 29 or a mike connected to the connector jack 52, and carries out predetermined processing such as filtering on the result of the process. Then, the audio conversion module 145 supplies the result of the predetermined processing to the application processor 131. On the other hand, the audio conversion module 145 carries out a D/A conversion process on audio data received from the application processor 131 and outputs the result of the D/A conversion process to the speaker 28 as a reproduced sound, or outputs audio data obtained as a result of the D/A conversion process to typically a headphone connected to the connector jack 52 as a reproduced sound by way of the connector jack 52.

The flash memory 146 is a memory having a typical storage capacity of about 64 MB. The flash memory 146 is used for storing programs to be executed by the application processor 131 and information that remains stored in the flash memory 146 even after the power supply is put in an off state. The information stored in the flash memory 146 includes data and a variety of register variables. The data and the register variables are information required in the execution of the programs.

The memory 147 is typically an SDRAM (Synchronous Dynamic Random Access Memory) having a typical storage capacity of about 64 MB. The memory 147 is used for storing information required in processing carried out by the application processor 131.

The radio communication module 148 is a unit for implementing a WLAN function conforming to the 802.11b standard. In accordance with control executed by the application processor 131, the radio communication module 148 carries out a radio communication in order to exchange information with another apparatus directly or through an access point and a network.

The keyboard module 149 is configured to include the keyboard 71 for receiving an operation input entered by the user and supplying a signal representing the operation to the application processor 131.

The input module 150 is configured to include the WLAN-mode switching button 22, the home button 23, the back button 24, the option button 25, the 4-direction keys 26, the enter button 27, the WLAN on/off switch 30, the power-supply switch 33, the music key 35, the hold switch 43 and the volume button 44. The input module 150 is a module for receiving an operation input entered by the user and supplying a signal representing the operation to the application processor 131 or the audio processor 132.

The audio processor 132 carries out various kinds of processing on the basis of a clock signal generated by a clock generation unit 151-1 or a clock generation unit 151-2. Since the audio processor 132 is a processor for handing mainly audio data, it is proper for the audio processor 132 to use two different clock signals. One of the clock signals is a basic clock signal used for processes such as processing to code and decode audio data. The other clock signal is a basic clock signal used for other signal processing. Functions carried out by the audio processor 132 will be described in detail by referring to FIG. 13.

The audio processor 132 is connected to the input module 150 described above, an audio-signal processing module 152, the USB connector 51, a real-time clock (RTC) 153, a large-capacity flash memory 154 and a memory bus 155. The memory bus 155 is connected to a flash memory 156 and a memory 157. The audio processor 132 also receives a signal indicating whether a device such as a headphone has been inserted into the connector jack 52 or pull out from the connector jack 52.

The audio-signal processing module 152 includes embedded components such as a D/A converter, a digital filter and an audio output amplifier for the headphone or the speaker. The audio-signal processing module 152 carries out a D/A conversion process on audio data received from the audio processor 132 or the audio conversion module 145, carries out a filtering process on the result of the D/A conversion process if necessary, amplifies the result of the filtering process and supplies the output of the amplifier to the ringer speaker 42 or the connector jack 52 as a reproduced signal. In addition, the audio-signal processing module 152 also receives a command from the audio processor 132 as a command to output not only an audio signal, but also the so-called beep sound or a calling sound of typically an arriving IP telephone call. The audio-signal processing module 152 outputs the beep sound or the calling sound of an arriving IP telephone call to the ringer speaker 42 or the connector jack 52.

The real-time clock (RTC) 153 is a clock for finding the present time by counting the number of pulses output by a pulse generator and supplying the present time to the audio-signal processing module 152.

The large-capacity flash memory 154 is a flash memory having a typical large storage capacity in the range 1 to several GB. The large-capacity flash memory 154 is used for storing information received from the audio processor 132. It is to be noted that the large-capacity flash memory 154 is also used for storing information generated by or acquired from a process carried out by the application processor 131 and supplied by the application processor 131 to the large-capacity flash memory 154 by way of the audio processor 132.

In addition, the large-capacity flash memory 154 is also used for storing information on other registered users. The information on another registered user is used in a process to exchange information with the other user by making use of an exchange tool such as an instant messenger, an IP phone, chatting or an email. The information exchanged with the other user typically includes a content such as musical data reproducible in a process carried out by the audio processor 132 and data generated as a result of executing a variety of application programs. On top of that, the large-capacity flash memory 154 is also used for storing information on registration of the user itself, who owns the information communication terminal 1, or information on registration of the information communication terminal 1. This registration information is transmitted to the apparatus owned by the other user serving as a partner of the information exchange process. The information on registration of the user itself, who owns the information communication terminal 1, or the information on registration of the information communication terminal 1 is stored in the large-capacity flash memory 154 in such a way that the user is capable of properly modifying the stored information.

The flash memory 156 is typically a memory having a typical storage capacity of about 64 MB. The flash memory 156 is used for storing a program to be executed by the audio processor 132 and information that remains stored in the flash memory 156 even after the power supply is put in an off state. The information stored in the flash memory 156 includes data and a variety of register variables. The data and the register variables are information required in the execution of the program.

The memory 157 is typically an SDRAM (Synchronous Dynamic Random Access Memory) having a typical storage capacity of about 64 MB. The memory 157 is used for storing information required in processing carried out by the audio processor 132.

The USB connector 51 is connected to an external apparatus by making use of a USB cable. An example of the external apparatus is the personal computer 13 explained before by referring to FIG. 1. If necessary, the USB connector 51 is also connected to a drive 171 on which a removable medium 172 is mounted. Examples of the removable medium 172 are a magnetic disk, an optical disk, a magneto-optical disk and a semiconductor memory. If necessary, a computer program read out from the removable medium 172 is installed in the flash memory 146 or the flash memory 156 in an executable state.

A signal received from an external apparatus such as the personal computer 13 through the USB connector 51 is supplied to the audio processor 132 and, if necessary, supplied to the application processor 131. On the other hand, the audio processor 132 outputs a predetermined signal to the external apparatus such as the personal computer 13 by way of the USB connector 51.

DC power supplied through the USB connection, DC power supplied through the DC jack 53 or DC power supplied from a battery 160 mounted on the information communication terminal 1 is distributed to components composing the information communication terminal 1 by a power-supply control unit 161.

Figure 12:
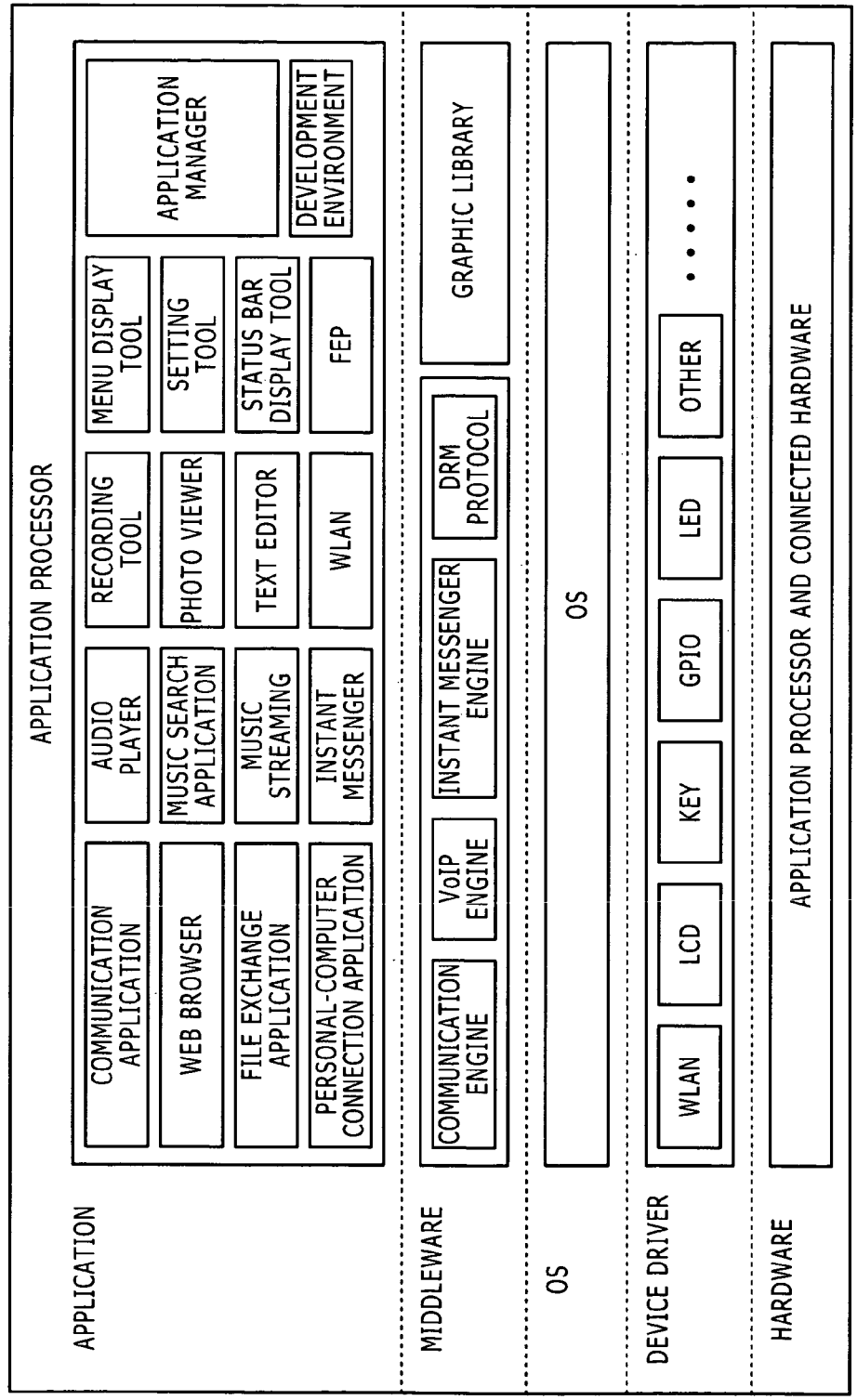
FIG. 12 is a software-stack diagram showing the configuration of software executed by an application processor.

FIG. 12 is a software-stack diagram showing the configuration of software executed by the application processor 131.

As shown in FIG. 12, the configuration of the software to be executed by the application processor 131 includes the following layers: a hardware layer at the bottom of the configuration, a device-driver layer above the hardware layer, an OS layer above the device-driver layer, a middleware layer above the OS layer and an application layer on the top of the configuration.

The device-driver layer is dedicated software for driving the application processor 131 and hardware connected to the application processor 131. To put it concretely, the device-driver layer includes a WLAN device driver WLAN for driving the radio communication module 148, an LCD driver for driving LCDs employed in the display module 142 for displaying an image on the display unit 21, a KEY keyboard driver for driving the keyboard module 149, a GPIO device driver for driving general-purpose ports of the application processor 131 and an LED driver for driving light emitting diodes employed in the WLAN-state notification light emitting unit 31, the power-supply-state notification light emitting unit 32 and the communication-state notification light emitting unit 34, which are included in the light emitting module 144.

In addition, the device-driver layer also properly includes other required device drivers such as a device driver for driving the backlight driver 143, a variety of memory drivers, a device driver for driving the audio conversion module 145, a mouse driver for driving a mouse if a mouse is employed in the information communication terminal 1 as an input device, a hard-disk driver for driving an embedded hard disk used for storing information if the hard disk is embedded in the information communication terminal 1 and a printer driver for driving an external printer connected to the information communication terminal 1 as an output device to which the information communication terminal 1 outputs information to be printed.

The OS layer is an OS (operating system) for controlling basic operations of the application processor 131. The OS is a basic program for managing a variety of resources driven by the device drivers. The OS manages the entire system by providing basic functions common to a number of application programs on the middleware and application layers to be described later as functions available to middleware and the application programs. For example, when any of the application programs executes an instruction, a device driver associated with the instruction is activated to carry out an operation requested by the instruction. Examples of the operation carried out by the device driver are an operation to input or output data from or to the flash memory 146, the memory 147 or the audio processor 132 and an operation to execute management of input/output functions such as a function to input data from the keyboard and a function to output an image to a screen. The OS can be Windows (a registered trademark) 95 (a trademark), Windows (a registered trademark) 98 (a trademark), Windows (a registered trademark) NT (a trademark), LINUX or OS/2 (a trademark). In addition, the OS also manages some software resources included typically in a context of execution of an application program on the application layer to be described later. The context of execution of an application program includes a set of registers, a main-memory image and a file handler.

Executed on the OS, the middleware on the middleware layer provides application programs with functions more sophisticated and more practical than the functions offered by the OS.

The middleware thus has an intermediate characteristic between the OS and application programs. If a function common to a number of application programs is developed individually for each of the application programs, the software development will become inefficient. In order to solve this problem, such a common function to be used by the application programs is developed as a function of the middleware. Thus, the middleware is a collection of such common functions, which are each generally a basic function in many cases.

To put it concretely, the middleware includes software elements such as a communication engine, a VoIP (Voice over IP) engine, an instant-messenger engine, a DRM (Digital Rights Management) protocol and a graphic library. The communication engine is software for providing basic functions of communication applications such as the IP phone. The VoIP engine is software for providing basic functions of a technology for exchanging audio data by making use of a TCP/IP network such as the Internet or an intranet. The instant-messenger engine is software for providing basic functions of an instant messenger. The DRM protocol is software for realizing a function for implementing processes such as a process to encrypt digital data in order to protect the copyright of the digital data. The graphic library is a collection of GUI components to be displayed on the display unit 21 to accompany execution of a variety of application programs.

To be more specific, the graphic library is a collection of general-purpose functions and general-purpose data, which are to be used in image processing carried out by a variety of application programs executed on the application layer. To put it more concretely, the graphic library is used for collecting some general-purpose functions to be used in the image processing in the same way as a book room is used for collecting books. That is to say, functions necessary for execution of application programs are made sharable by the programs as an independent file referred to as a graphic library. In general, the graphic library is loaded at an execution time separately from an application program and distinguished from subroutines of an application program.

On the application layer at the top of the software configuration, a variety of application programs are executed. In case of the information communication terminal 1, the application programs include application software, utilities, an application manager and a development environment. The application software includes individual applications such as a communication application, a web browser, a file exchange application, a personal-computer connection application, an audio player, a music search application, a music streaming application, an instant messenger, a recording tool, a photo viewer and a text editor. The utilities include a WLAN interface, a menu display tool, a setting tool, a status-bar display tool and an FEP (Front End Processor). The application manager is a program for managing the application software.

The communication application is an application program making use of the communication engine and the VoIP engine to allow the user to communicate with (a user utilizing) another apparatus through the so-called IP telephone function or a voice chatting function.

The web browser is an application used for viewing a web page through a network. To put it concretely, the web browser implements functions to download a file such as an HTML file, an image file or a musical file from a web server through the network and analyze the layout of the page in order to display/reproduce the file. The web browser also implements a function of allowing the user to transmit data to the web server by making use of a displayed form. In addition, the web browser also implements a function to execute application software written in a language such as Java (a trademark) Script, Flash or Java (a trademark).

The file exchange application is an application program having a file transfer function to exchange a data file with another apparatus connected to the information communication terminal 1 through a network or directly. The personal-computer connection application is an application program having a function to connect the information communication terminal 1 to the personal computer 13 in order to allow the information communication terminal 1 to exchange information with the personal computer 13.

The audio player is an application program having a function to reproduce musical data. The music search application is an application program having a function to store audio data in an internal database and allow the user to search the database for desired musical data. The music streaming application is an application program having a function to transmit multimedia data such as video and audio data to another apparatus through a network and reproduce multimedia data in a streaming reproduction process while receiving the data from another apparatus through the network.

The instant-messenger application is an application program having a function to produce a result of determination as to whether or not a peer connected to the network such as the Internet or a LAN as a peer making use of the same software is in an online state. The instant-messenger application also has a function to allow chatting with the peer or a transfer of a file to/from the peer if the result of the determination indicates that the peer is in an online state.

The recording tool is an application program having a function to record audio data input by the mike 29 in a way similar to the so-called voice memo and reproduce the recorded audio data. The photo viewer is an application program having a function to manage image data (or photo data) recorded internally in the information communication terminal 1 and control a process to reproduce and display the recorded image data by making use of a variety of display methods such as a method to display image data as a list of thumbnail images and a slideshow display method. The text editor is an application program having a function to create text data on the basis of operation inputs entered by the user via an input device such as the keyboard 71.

Individual application programs other than those mentioned and described above include table-calculation software, database creation software, an email application and a variety of game applications. These other application programs can also be properly installed in the information communication terminal 1 as well.

The WLAN interface is a utility for implementing a WLAN function conforming typically to the 802.11b standard. The menu display tool is a utility for controlling a display appearing on the display unit 21 as a display showing information such as a menu or a standby image. The setting tool is a utility for setting a variety of functions of the information communication terminal 1 on the basis of operation inputs entered by the user. The status-bar display tool is a utility for displaying various kinds of information on the continuous display panel 101 explained earlier by referring to FIGS. 9 and 10. The FEP is a utility serving as kanji conversion software used for handing inputs entered in the Japanese language.

Figure 13:
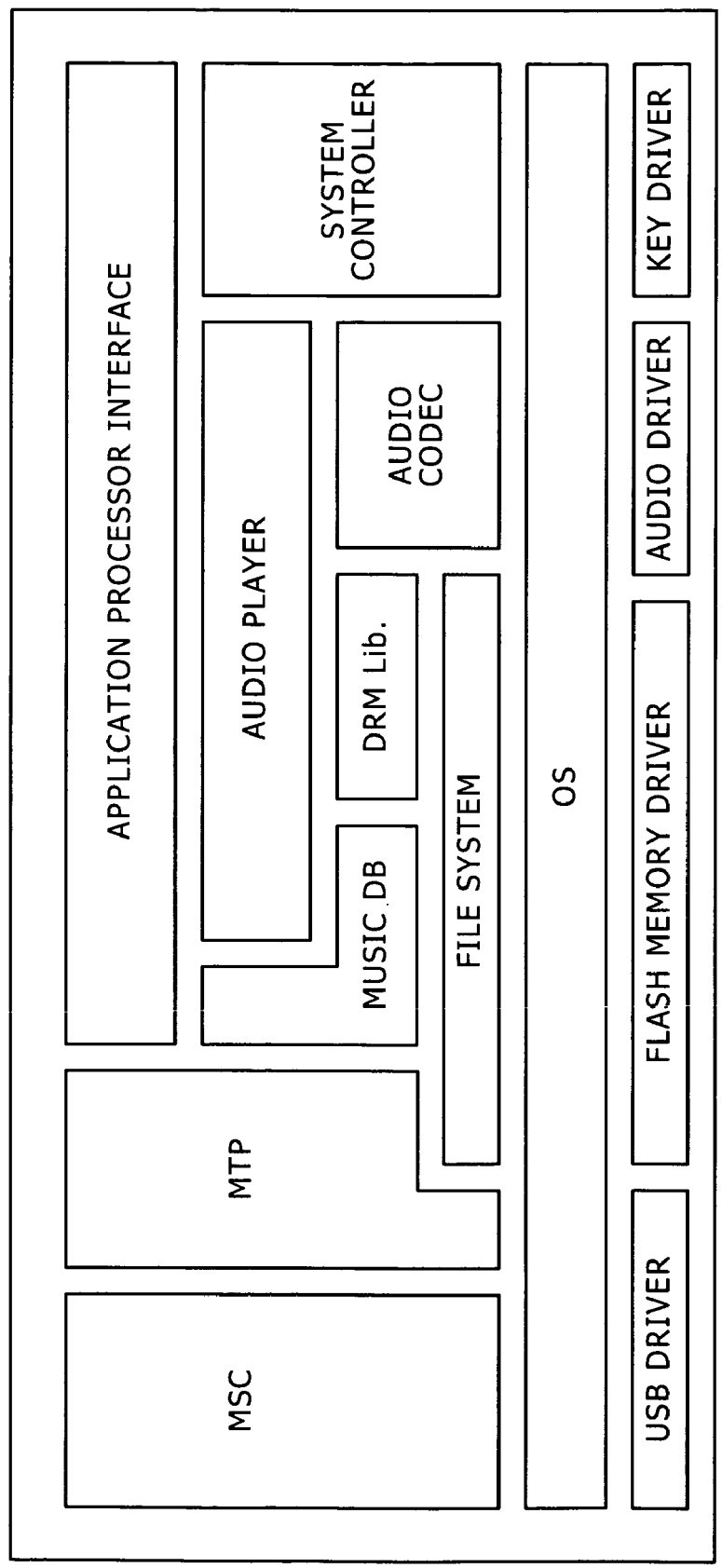
FIG. 13 is a software-stack diagram showing the configuration of software executed by an audio processor.

FIG. 13 is a software-stack diagram showing the configuration of software executed by the audio processor 132.

The device-driver layer at the bottom of the configuration is dedicated software for driving the audio processor 132 and hardware connected to the audio processor 132. To put it concretely, the device-driver layer includes a USB driver, a flash-memory driver, an audio driver and a key driver. The USB driver is a device driver for implementing USB-connection and USB-streaming functions. The flash-memory driver is a device driver for driving the large-capacity flash memory 154 connected to the audio processor 132. The audio driver is a device driver for driving the audio-signal processing module 152. The key driver is a device driver for driving an input device employed in the input module 150. An example of the input device is a music key 35 for inputting an operation input concerning a process to be carried out by the audio processor 132.

The device-driver layer may also properly include other required device drivers such as a memory driver for driving a memory other than the large-capacity flash memory 154 and a GPIO device driver for driving a general-purpose port of the application processor 131.

The OS is a basic program for controlling basic operations carried out by the audio processor 132. As the OS of the audio processor 132, it is desirable to employ a real-time OS designed for an embedded system. An example of the real-time OS designed for an embedded system is uITRON.

A variety of application programs are executed on the OS.

In implementing USB connection, the information communication terminal 1 is capable of switching a USB mode from an MSC (Mass Storage Class) mode, which is one of two USB modes, to an MTP (Media Transfer Protocol) mode serving as the other USB mode and vice versa.

The MSC (Mass Storage Class) mode is a USB mode providing the host apparatus with a function to recognize and control a connected USB apparatus as a storage apparatus. In this case, the USB apparatus is the information communication terminal 1 connected to the personal computer 13. That is to say, having a MSC (mass storage class) interface, the information communication terminal 1 is recognized as a driver by an OS running on the personal computer 13. Thus, an application executed in the personal computer 13 is capable of reading out data stored internally in the information communication terminal 1. The data stored internally in the information communication terminal 1 includes image data and musical data. The application executed in the personal computer 13 to read out data stored internally in the information communication terminal 1 is not limited to a special application, but may also be an explorer or the like.

The MTP (Media Transfer Protocol) mode is a USB mode providing a protocol for connecting the information communication terminal 1 and the personal computer 13 to each other and exchanging musical data, moving-picture data and still-picture data between the information communication terminal 1 and the personal computer 13. MTP software for the MTP mode is executed on a layer of communication with any storage device including the USB MSC (mass storage class) storage apparatus, allowing a content having a copyright protection flag to be transferred with a high degree of safety.

A file system is software for managing files stored in a memory (such as the large-capacity flash memory 154) connected to the audio processor 132. Some of the files managed by the file system are stored in a database. To be more specific, musical-data files managed by the file system are stored in a musical DB (database). The copyrights of the musical-data files are protected in a DRM (Data Rights Management) library.

The DRM library is a collection of general-purpose functions and general-purpose data, which are used by a variety of application programs to encrypt digital data such as musical data, moving-picture data and still-picture data in order to implement a function of avoiding illegal data copies and illegal transfers of data to other apparatus.

Musical data stored in a memory (such as the large-capacity flash memory 154) connected to the audio processor 132 is data compressed by an audio coding/decoding unit in a compression format such as an MP3 (MPEG Audio layer-3) format, an ATRAC3 (Adaptive TRansform Acoustic Coding-3) format, a WMA (Windows (a trademark) Media Audio) format or an ASF (Advanced Streaming Format). Thus, the audio coding/decoding unit is also capable of decompressing the compressed musical data by adoption of a decompression method for the compression format.

An audio player is software for controlling a process to decompress compressed audio data in the audio coding/decoding unit by adoption of a predetermined decompression method and output the audio data as reproduced data. The compressed audio data to be decompressed is supplied to the audio processor 132 by way of an application processor interface. The compressed audio data is audio data subjected to copyright protection based on the DRM library and managed by making use of the musical DB in accordance with control signals output by various kinds of software executed by the application processor 131.

A system controller is software for controlling a variety of functions implemented by the audio processor 132.

An application processor interface is software for providing a function to control exchanges of various kinds of information and control signals between the application processor 131 and the audio processor 132.

By referring to display screens appearing on the display unit 21, the following description explains typical and concrete executions of a variety of application programs in the information communication terminal 1.

A variety of application programs executed by the information communication terminal 1 can be classified into a category not making use of processing of communications with another apparatus and a category making use of processing of communications with another apparatus through a network. The category not making use of processing of communications with another apparatus includes the audio player, the recording tool (or the so-called voice memo tool), the photo viewer and the text editor. As described earlier, the audio player is an application program for reproducing audio data. On the other hand, the category making use of processing of communications with another apparatus includes the file exchange application, the music streaming application, the communication application, the instant messenger and the web browser. As described before, the file exchange application is an application program having a file transfer function to exchange a data file with another apparatus connected to the information communication terminal 1 through a network or directly. Also as explained earlier, the music streaming application is an application program having a function to transmit multimedia data such as video and audio data to another apparatus through a network and reproduce multimedia data while receiving the data from another apparatus through the network in a streaming reproduction process. Also as described earlier, the communication application is an application program making use of the communication engine and the VoIP engine in order to allow the user to communicate with (a user utilizing) another apparatus through the so-called IP telephone function or a voice chatting function through a network. Also as explained before, the instant-messenger application is an application program having a function to allow chatting or a transfer of a file through a network. Also as explained earlier, the web browser is an application program used for viewing a web page through a network.

There are also application programs each having a plurality of functions. There are also application programs each having a plurality of functions making use of and not making use of processing of communications with another apparatus through a network. The functions not making use of processing of communications with another apparatus include a function to record audio data (such as mainly musical data), a still picture and a moving picture and a function to organize stored data into a database. On the other hand, the functions making use of processing of communications with another apparatus through a network include a function to exchange data with another apparatus and a function to reproduce data while receiving the data from another apparatus in a streaming reproduction process.

Figure 14:
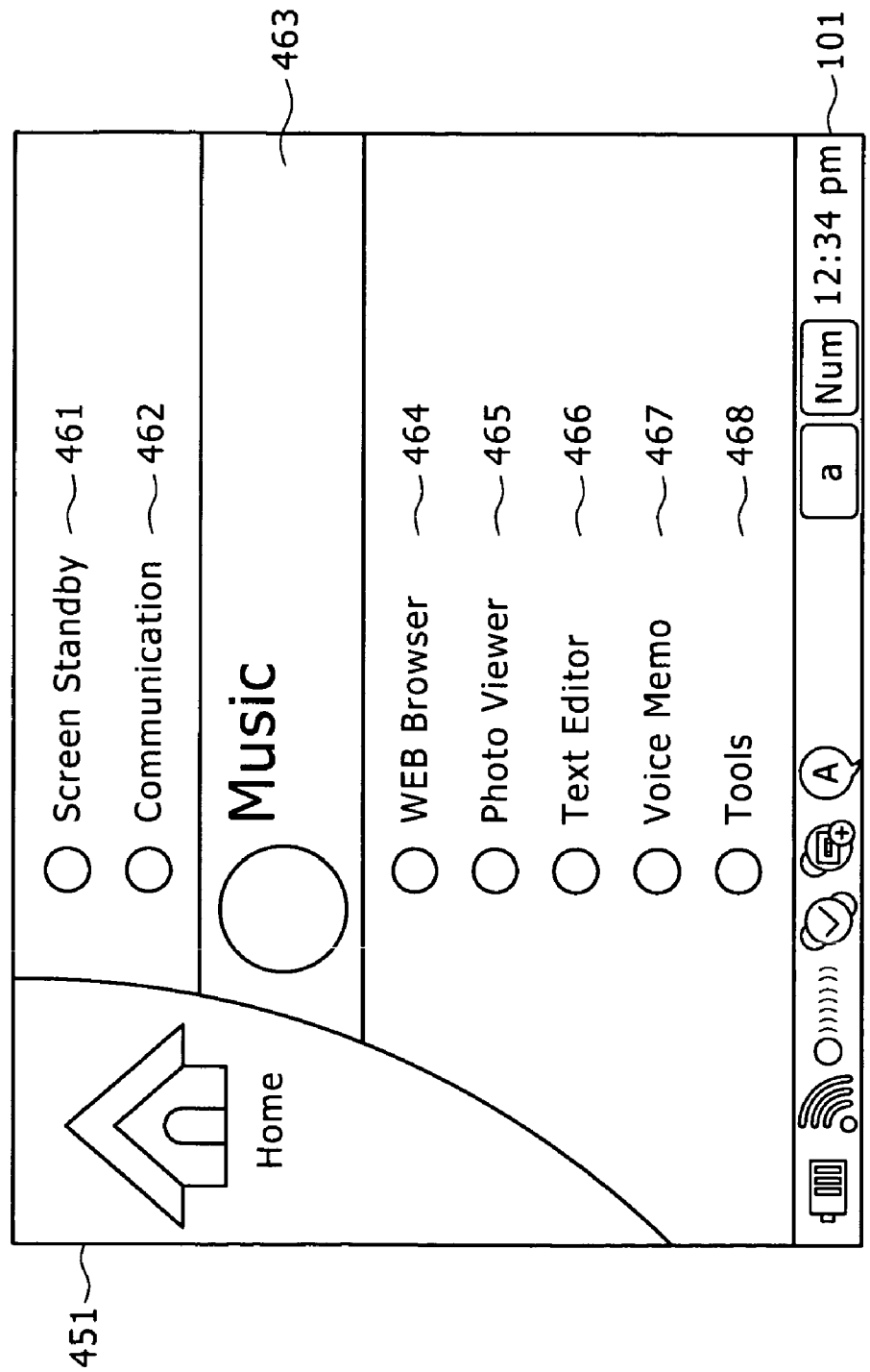
FIG. 14 is a diagram showing a typical display of a home screen.

FIG. 14 is a diagram showing a typical display of a home screen 451, which immediately appears on the display unit 21 employed in the information communication terminal 1 typically when the power supply is turned on or when the home button 23 is pressed. The home screen 451 shows a menu as a list of application programs that can be executed in the information communication terminal 1. As an alternative, the displayed menu can also be a list of items each including a plurality of such application programs. In the case of the home screen 451 shown in FIG. 14, the displayed menu shows a standby screen 461, a communication application 462, a music tool 463, a web browser 464, a photo viewer 465, a text editor 466, a voice memo tool 467 and a variety of tools 468 in a state of being selectable. If application programs executable in the information communication terminal 1 cannot all be displayed on one page of the home screen 451, the user may operate an up or down key of the 4-direction keys 26 in order to scroll the displayed list of the menu in the upward or downward direction respectively. In this way, the user is capable of viewing all the application programs included on the list. The user is allowed to select an application program from the displayed menu of the home screen 451 appearing on the display unit 21 and activate the selected program.

It is to be noted that, in accordance with a typical method adopted by the user to select and determine an application program from the menu, for example, the user operates the down or up key of the 4-direction keys 26 to change the selected item in the menu. The selected item in the menu is an item pointed to by a cursor. The menu is scrolled in the upward direction when the user presses the up key of the 4-direction keys 26 with the menu top item pointed by the cursor and scrolled in the downward direction when the user presses the down key of the 4-direction keys 26 with the menu bottom item pointed by the cursor. Then, after placing the cursor at a position to point to a desired item in the menu by operating the down or up key, the user presses the enter button 27 in order to confirm the selection of the desired menu item pointed to by the cursor as a selected application program. When the user confirms the selection of the desired menu item pointed to by the cursor as the selected application program by pressing the enter button 27, the program is activated. In accordance with another typical method adopted by the user to select an application program and confirm the selection of the application program from the menu, for example, with the third item in the menu assumed to be an always selected menu item, the user operates the down or up key of the 4-direction keys 26 in order to scroll the entire menu in the downward or upward direction respectively. In this way, different programs occupy the position of the third item serving as the always selected menu item. The user continues scrolling the menu till the desired application program occupies the position of the third item serving as the always selected menu item. As the desired application program occupies the position of the third item serving as the always selected menu item, the user presses the enter button 27 in order to confirm the selection of the third menu item as a selected application program. When the user confirms the selection of the third menu item as the selected application program by pressing the enter button 27, the program is activated.

First of all, by referring to FIGS. 14 to 18, the following description explains typical processing when the voice memo tool 467 is selected from the menu shown on the home screen 451 and the recording and reproduction tool (or the so-called voice memo) represented by the voice memo tool 467 is executed. As described above, the home screen 451 of FIG. 14 shows a menu as a list of application programs that can be executed in the information communication terminal 1 or, as an alternative, the displayed menu can also be a list of items each including a plurality of such application programs.

Figure 15:
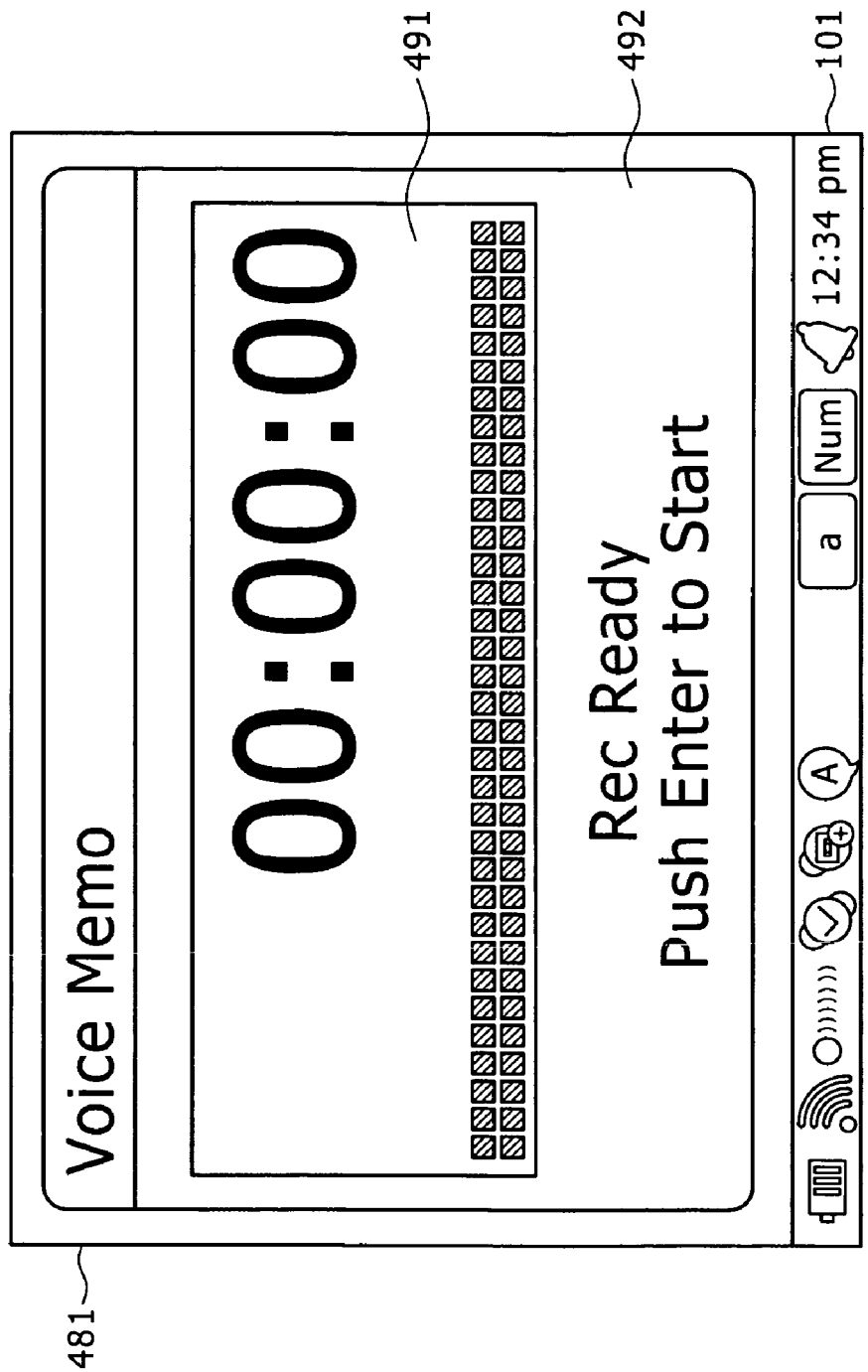
FIG. 15 is a diagram showing a typical display of the screen in a recording wait state.

FIG. 15 is a diagram showing a typical display of a screen 481 appearing initially in a recording wait state when the recording and reproduction tool is activated.

The display screen 481 of the recording and reproduction tool includes a recording-duration display area 491 for showing a recording length and a message display area 492 for showing a message to the user. The recording-duration display area 491 not only shows a recording or a reproduction length but may also show other information such as the volume of recorded or reproduced audio data and the present reproduction position (or the reproduction-stop position) of recorded audio data in a reproduction process.

As shown in FIG. 15, in the recording wait state, the recording length shown in the recording-duration display area 491 is 0 and the message display area 492 shows a message saying: "Rec Ready. Push Enter to Start."

When the user presses the enter button 27, that is, when a signal representing an operation input entered by the user is received from the input module 150, the application processor 131 drives the mike 29 or a mike connected to the connector jack 52 to input voices, receives audio data completing an A/D conversion process in the audio conversion module 145 and supplies the data to the audio processor 132. The audio processor 132 encodes the data and stores the encoded data in the large-capacity flash memory 154.

Figure 16:
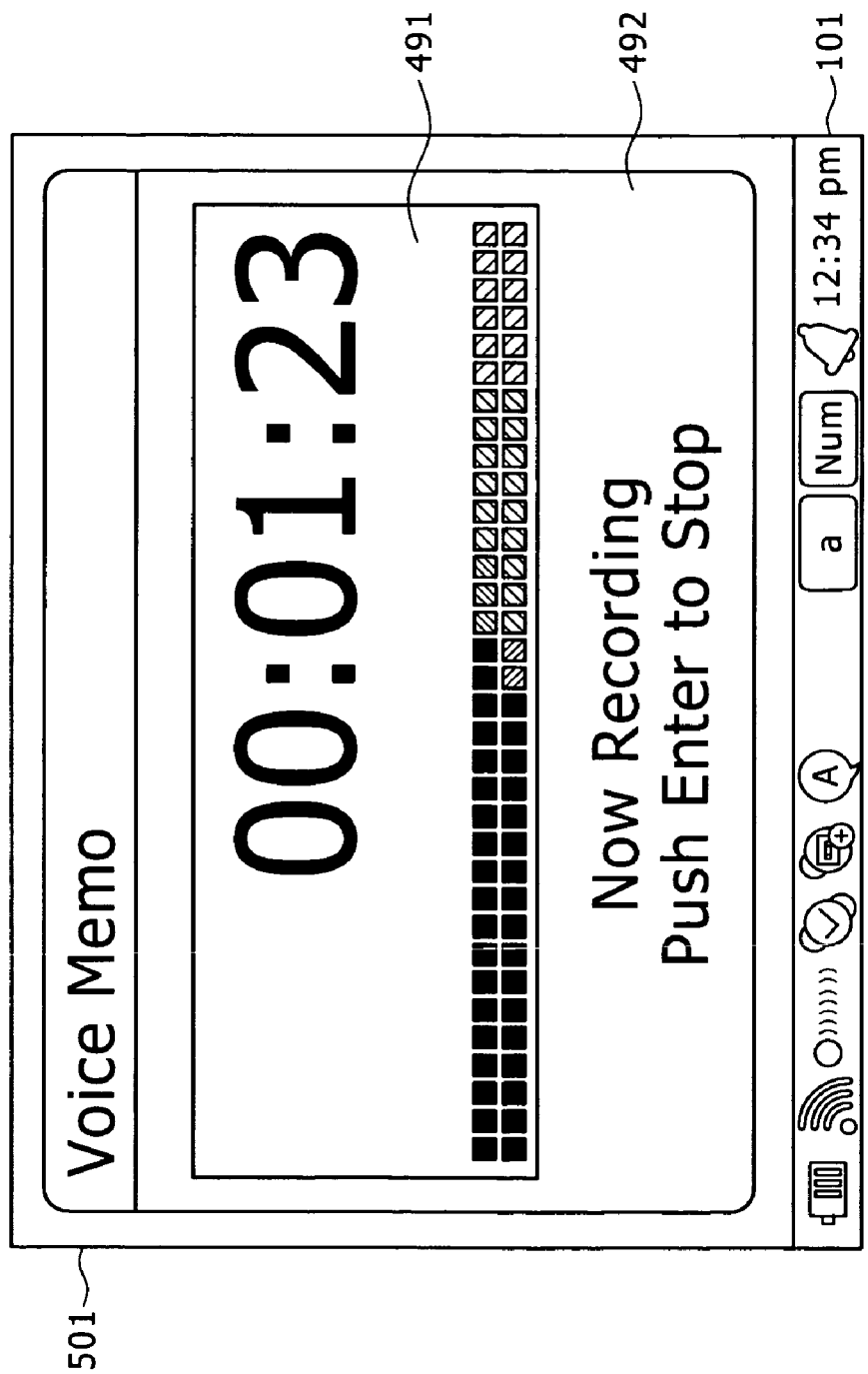
FIG. 16 is a diagram showing a typical display of the screen in a recording state.

FIG. 16 is a diagram showing a typical display of a screen 501 in a recording state.

As shown in FIG. 16, in a recording state, the recording-duration display area 491 shows an increasing recording length whereas the message display area 492 shows a message saying: "Now Recording. Push Enter to Stop."

When the user presses the enter button 27, that is, when a signal representing an operation input entered by the user is received from the input module 150, the application processor 131 stops the process to input voices by making use of the mike 29 or the mike connected to the connector jack 52.

Figure 17:
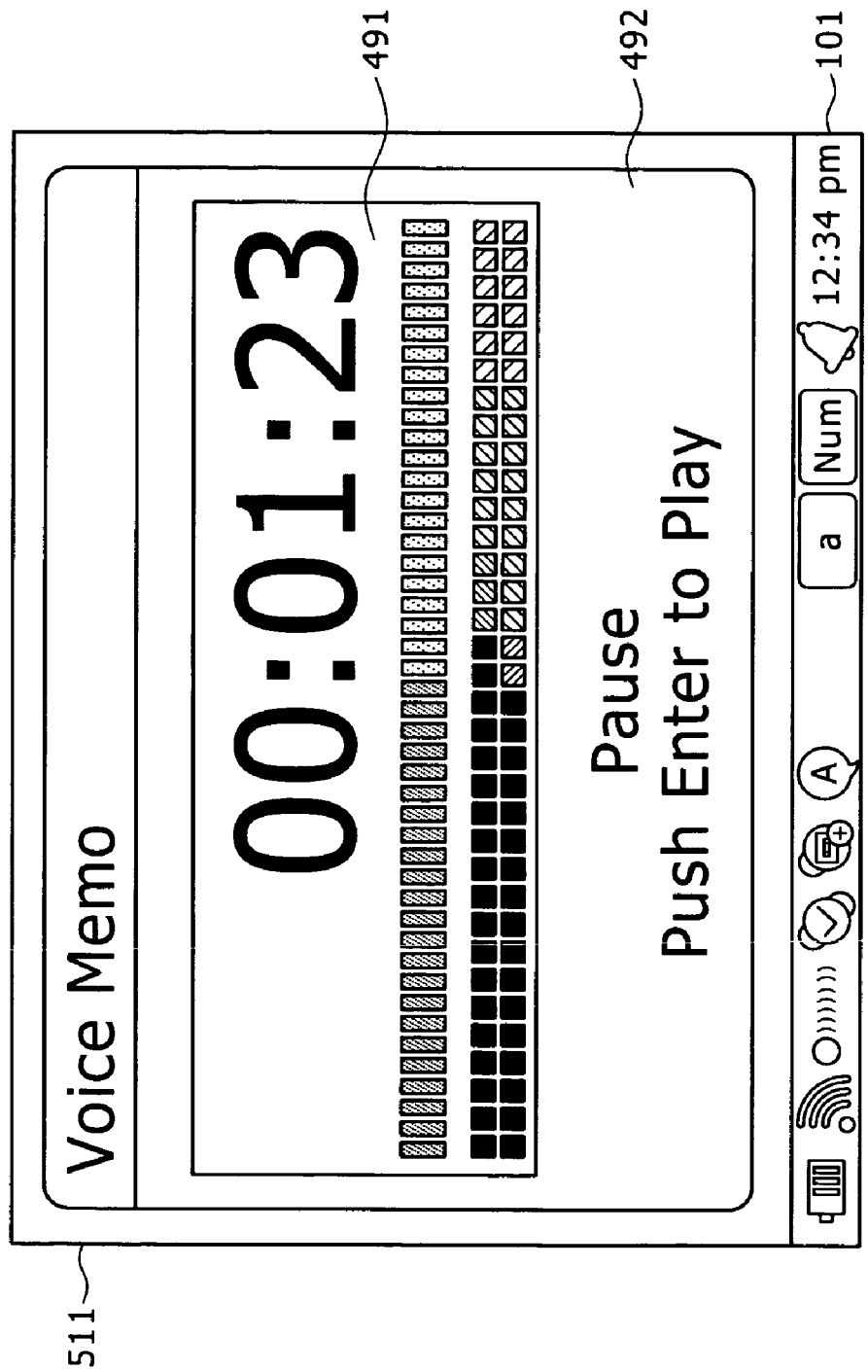
FIG. 17 is a diagram showing a typical display of the screen in a stopped-recording state, that is, a state of waiting for reproduction of recorded audio data (or, a temporarily stopped reproduction state)

FIG. 17 is a diagram showing a typical display of a screen 511 in a stopped-recording state, that is, a state of waiting for reproduction of recorded audio data (or, a reproduction pause state).

As shown in FIG. 17, in a reproduction pause state, the recording-duration display area 491 shows a fixed recording length and information on the progress of reproduction of the recorded sound data whereas the message display area 492 shows a message saying: "Pause. Push Enter to Play."

When the user presses the enter button 27, that is, when a signal representing an operation input entered by the user is received from the input module 150, the application processor 131 drives the audio processor 132 to read out recorded audio data from the large-capacity flash memory 154 and supply the data to the audio conversion module 145 after decoding the data. The audio conversion module 145 carries out a D/A conversion process on the audio data received from the audio processor 132 and outputs the data resulting from the D/A conversion process to the speaker 28 as reproduced data or outputs audio data obtained as a result of the D/A conversion process to typically a headphone connected to the connector jack 52 as a reproduced sound by way of the audio-signal processing module 152.

Figure 18:
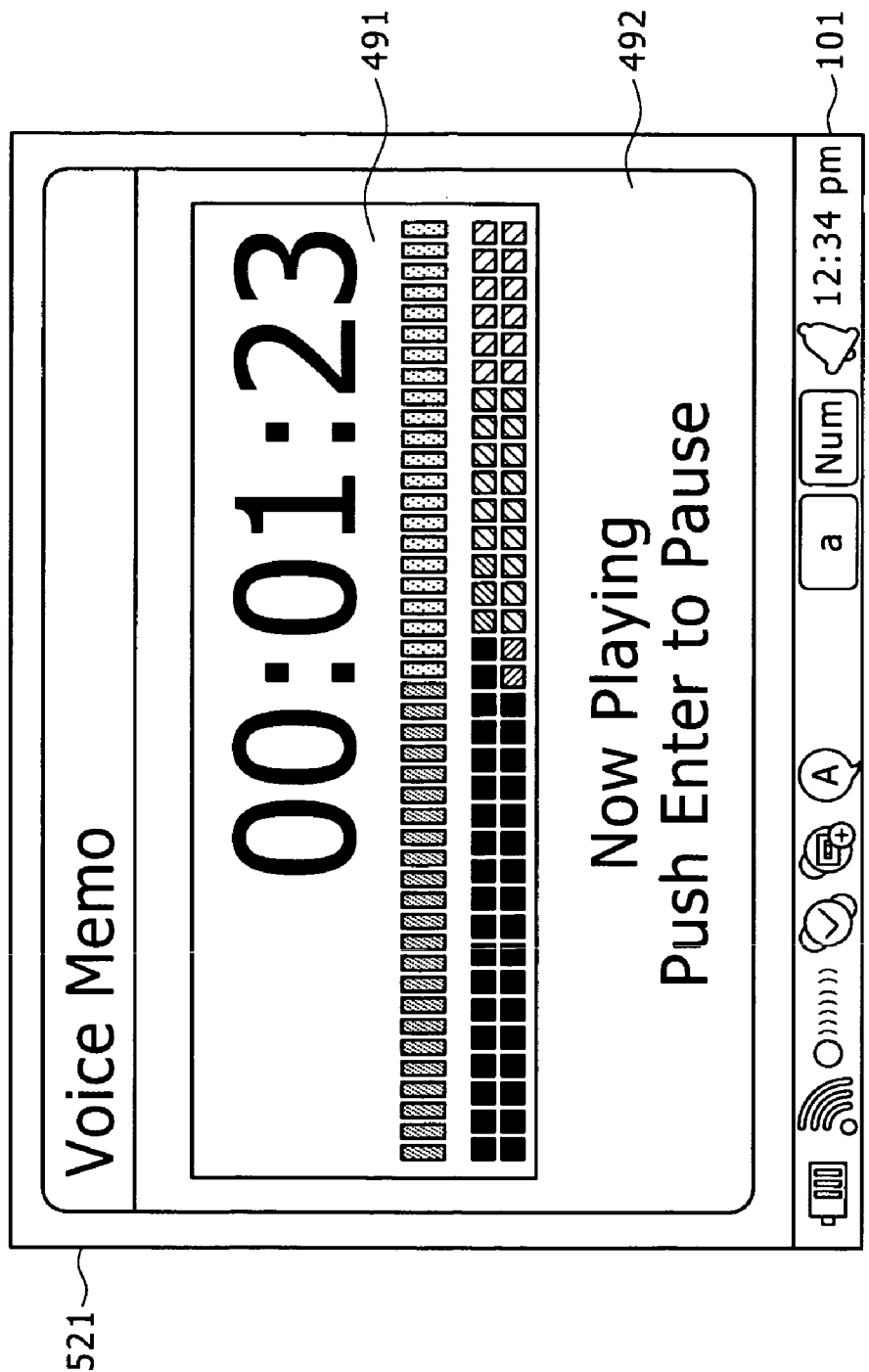
FIG. 18 is a diagram showing a typical display of the screen in a state of reproducing recorded audio data.

FIG. 18 is a diagram showing a typical display of a screen 521 in a state of reproducing recorded audio data.

As shown in FIG. 18, in a reproduction state, the recording-duration display area 491 shows a reproduction length and information on the progress of reproduction of the recorded sound data whereas the message display area 492 shows a message saying: "Now Playing. Push Enter to Pause," meaning that the information communication terminal 1 is in a reproduction state, which can be stopped by pressing the enter button 27. When the user presses the enter button 27 in the state shown in FIG. 18, the reproduction process is temporarily stopped to enter the reproduction pause state explained earlier by referring to FIG. 17.

The following description explains typical processing carried out by execution of the photo viewer 465 selected by confirmation from items included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs.

Figure 19:
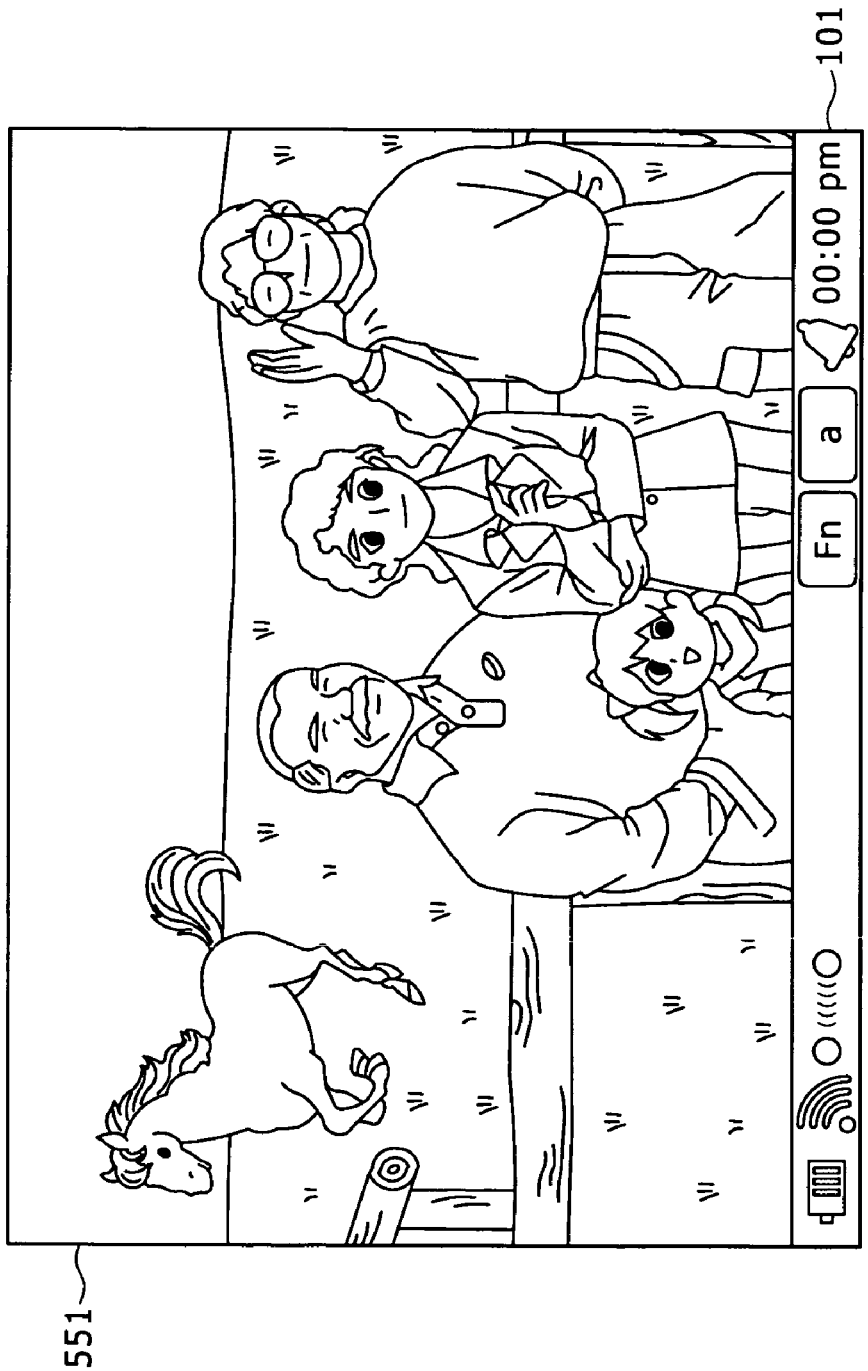
FIG. 19 is a diagram showing a typical display screen in execution of a photo viewer.

FIG. 19 is a diagram showing a typical display screen 551 in execution of the photo viewer 465. The photo viewer 465 is an application program for carrying out a process to read out the data of still pictures from the large-capacity flash memory 154 and display the data on the display unit 21 in accordance with an operation input entered by the user. Typically, the photo viewer 465 converts each of the still pictures into a thumbnail image and displays the data as a list of thumbnail images on the display unit 21. As an alternative, the photo viewer 465 displays the thumbnail images on the display unit 21 in units according to classification done by the user. As another alternative, the photo viewer 465 displays the thumbnail images on the display unit 21 in a slide-show format.

Figure 20:
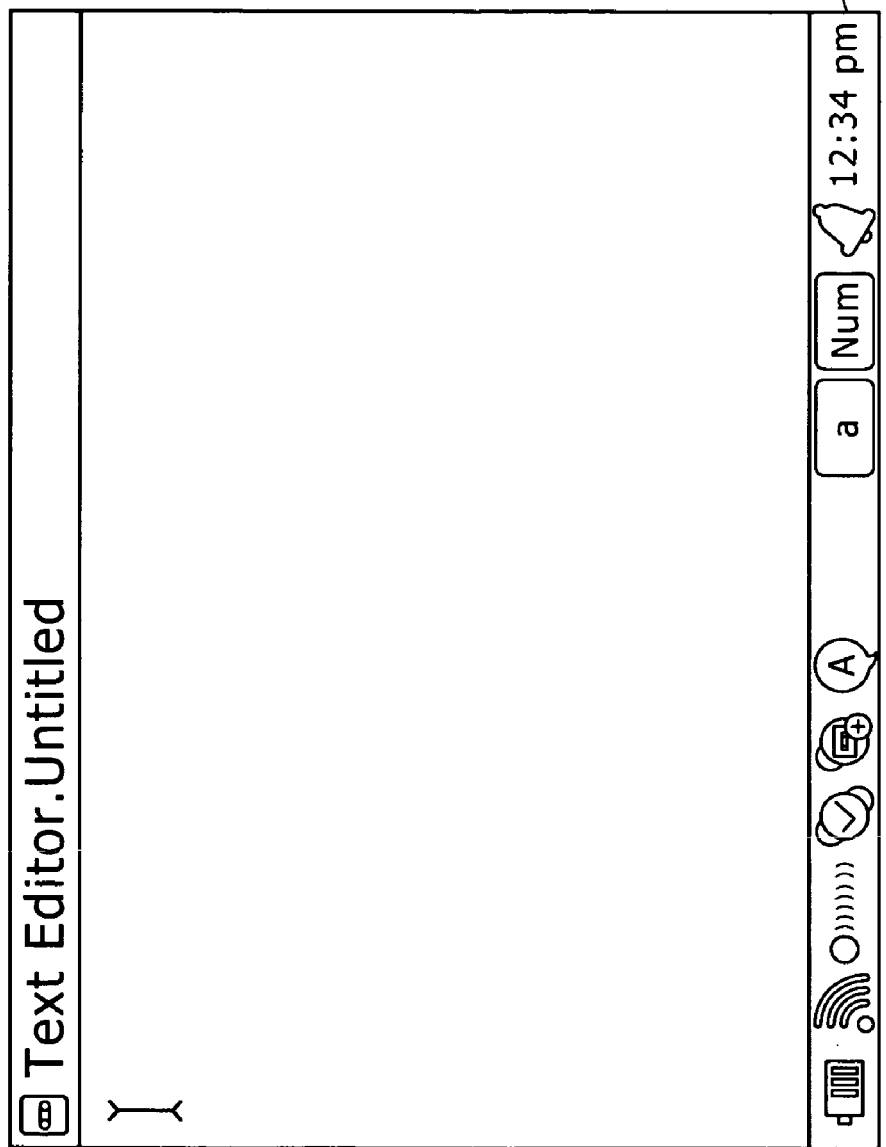
FIG. 20 is a diagram showing a typical screen for creation of a new text.
Figure 21:
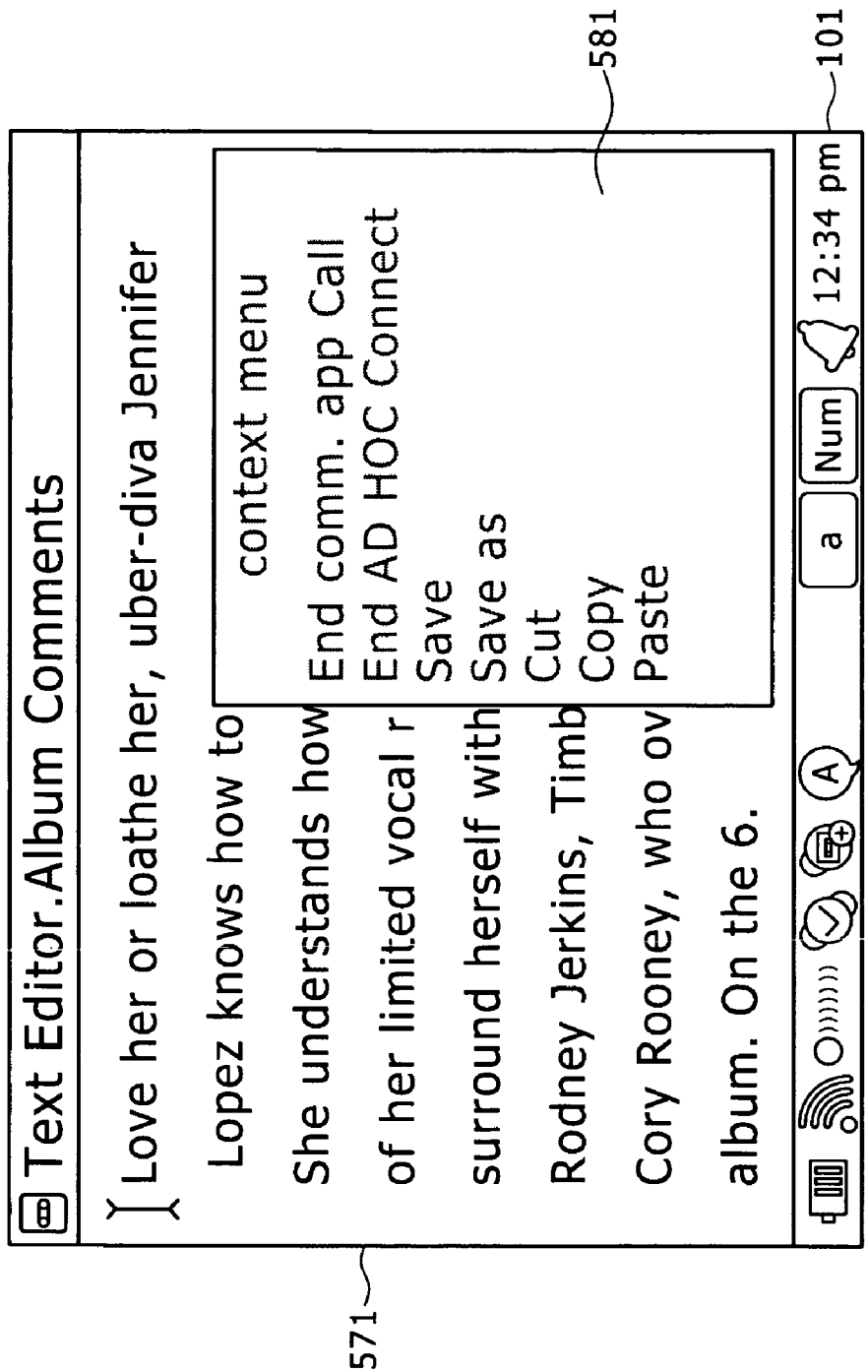
FIG. 21 is an explanatory diagram showing a context menu.

By referring to FIGS. 20 to 22, the following description explains typical processing carried out by execution of the text editor 466 selected by confirmation from items included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs.

FIG. 20 is a diagram showing a typical screen 571 for creation of a new text by making use of the text editor 466. On the top of the new-text creation screen 571, the name of a text file to be used for storing the new text is shown. If the user has not yet entered the name of a text file to be used for storing the new text, the name 'untitled' is used. In addition, the new-text creation screen 571 also shows a cursor pointing to the present edit position in a text input area.

While a text is being entered, it is possible to display a context menu 581 like one shown in FIG. 21 in accordance with an operation input entered by the user. The context menu 581 typically shows commands including 'End Comm. App. Call', 'End AD HOC Connect', 'Save', 'Save As', 'Cut', 'Copy' and 'Paste'. 'End Comm. App. Call' is the name of a command to terminate the text editor 466 and activate the communication application. 'End AD HOC Connect' is the name of a command to terminate the text editor 466 and start an ad-hoc connection mode. 'Save' is the name of a command to keep a created text. 'Save As' is the name of a command to keep a created text in a file by giving a name to the file. 'Cut' is the name of a command to cut out a portion of a text from the text. The portion to be cut out from the text is a character string in a specified range. 'Copy' is the name of a command to copy a portion of a text. The portion to be copied is a character string in a specified range. 'Paste' is the name of a command to paste a portion at a position in a text. The portion to be pasted to the text is a character string cut out from a text by making use of the 'Cut' command or a character string copied by making use of the 'Copy' command.

In addition, the text editor 466 also has a character predictive conversion function. The character predictive conversion function works as follows. When the user moves the cursor to a place at which a string of characters is to be entered and enters the first character of the string, the character predictive conversion function automatically displays a plurality of predicted candidates for the character string to be entered at the position of the entered first character as a string starting with the entered first character. The character predictive conversion function automatically displays the predicted candidates in a character-string predictive conversion bar 591 at the bottom of the new-text creation screen 571 as shown in FIG. 22.

If the predicted candidates shown in a character-string predictive conversion bar 591 include the character string to be entered by the user at the position of the entered first character, the user can carry out an operation to select the string of characters from the character-string predictive conversion bar 591 in order to enter the selected string of characters to the position. In this way, the user is capable of entering a desired string of characters to the position of the entered first character by carrying out only few text-character input operations. The user is capable of deleting the character-string predictive conversion bar 591 from the new-text creation screen 571 by carrying out an input operation of deciding to select an x box at the left end of the new-text creation screen 571.

The keyboard 71 shown in FIG. 8 as a keyboard employed in the information communication terminal 1 may have the so-called + character keys in addition to the 4-direction keys 26 provided on the cover 61. By providing the + character keys, the user may enjoy more convenience of selecting the + character keys or the 4-direction keys 26 as follows.

For example, the user may operate a key of the 4-direction keys 26 or a left-direction or right-direction key of the + character keys on the keyboard 71 in order to enter a command to move the cursor over the new-text creation screen 571 of the text editor 466 in a direction indicated by the operated key. On the other hand, the user may operate an upward-direction or downward-direction key of the + character keys on the keyboard 71 in order to enter a command to select a string of characters among a plurality of candidates shown in the character-string predictive conversion bar 591.

The software described above as the application programs implementing the photo viewer 465, the text editor 466 and the voice memo tool 467 is executed to carry out no processing of communication with an external apparatus. However, let us take functions each handling a musical content as an example. In this case, such a function may be executed to carry out processing of communication with an external apparatus or processing of no communication with an external apparatus. All the functions each handling a musical content are typically collected in a menu. This is because it is desirable to let the user utilize any of the functions each handling a musical content as an application program by selecting the program from the menu without the need to be aware of whether or not the selected program entails a communication with an external apparatus or without the need to distinguish the functions entailing a communication with an external apparatus and functions entailing no communication with an external apparatus from each other.

The method of communication with another apparatus can be implemented by wire connection making use of a USB cable or by radio connection making use of the WLAN. In the case of radio connection making use of the WLAN, the WLAN ad-hoc mode or the WLAN infrastructure mode can be adopted as described before.

The WLAN communication adopting the WLAN ad-hoc mode is explained by referring to FIGS. 23 to 26 as follows.

Figure 23:
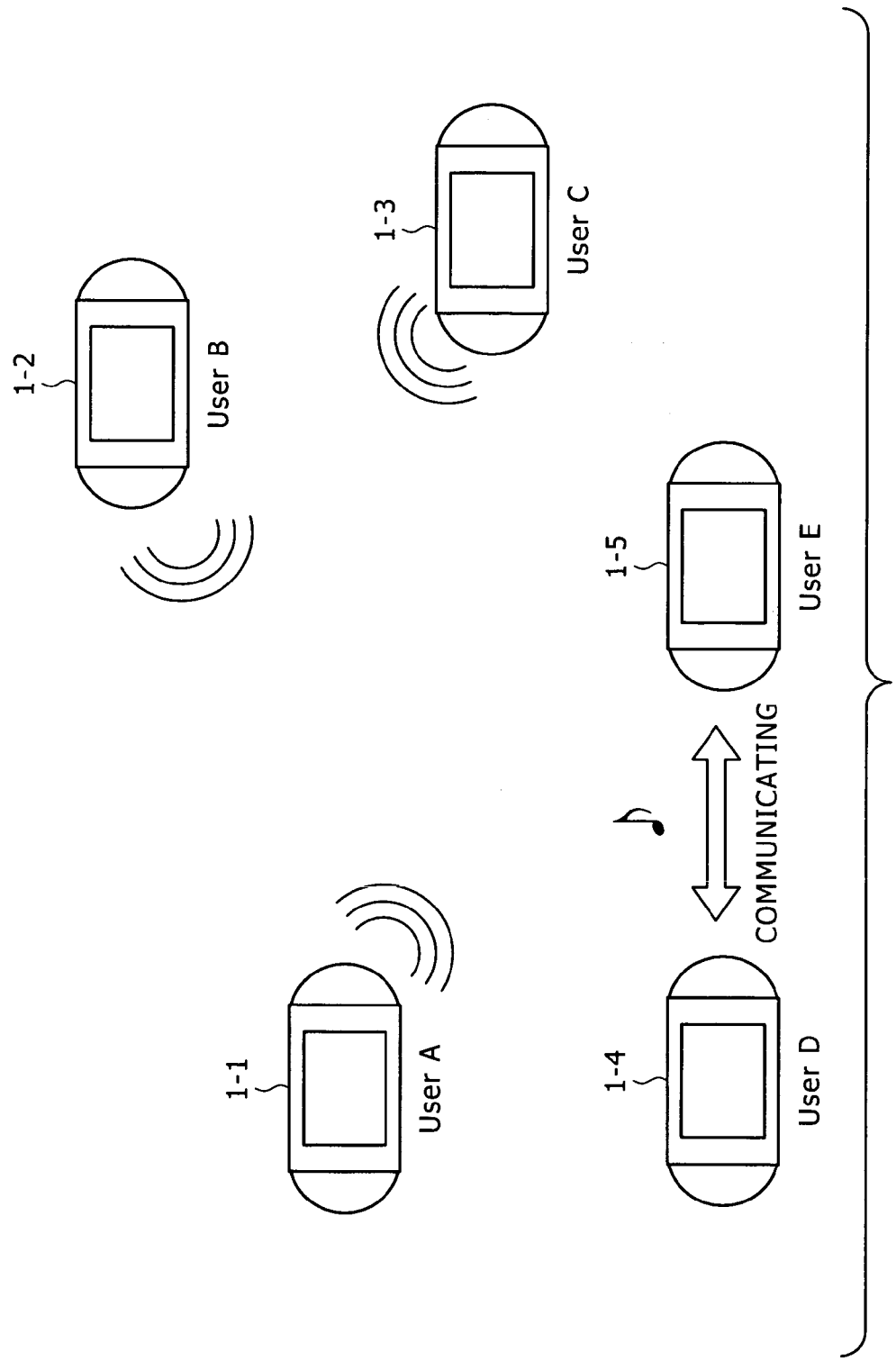
FIG. 23 is an explanatory diagram referred to in description of communications in an ad-hoc mode.

Let us assume for example that information communication terminals 1-1 to 1-5 operated by users A to E respectively exist in a range of implementable communications as shown in FIG. 23. Also let us assume that the information communication terminal 1-4 operated by user D is communicating in the WLAN ad-hoc mode with the information communication terminal 1-5 operated by user E.

In this case, each of the information communication terminals existing in the range of implementable communications as a terminal for the WLAN ad-hoc mode is not set to allow the information communication terminals to freely transfer files among each other and freely reproduce a transferred musical content in a streaming reproduction process. Instead, each of the WLAN ad-hoc mode information communication terminals existing in the range of implementable communications is set to allow only mutually registered information communication terminals to freely transfer files among each other and freely reproduce a transferred musical content in a streaming reproduction process. Two information communication terminals serving as mutual communication partners are said to be mutually registered information communication terminals if any specific one of the terminals is a terminal registered in the other terminal and the other terminal is a terminal registered in the specific terminal.

In the WLAN ad-hoc mode, each of the information communication terminals 1-1 to 1-5 operated by users A to E respectively as shown in FIG. 23 transmits its unique information and information on its present condition to all apparatus in the range of implementable communications by adoption of a broadcasting transmission technique, which does not specify any specific destination of the transmission. The unique information of an information communication terminal 1 is information that basically remains unchanged. On the other hand, the information on the present condition of an information communication terminal 1 is information that varies from time to time. FIG. 24 is a diagram explaining pieces of typical information transmitted by an information communication terminal 1 in an ad-hoc mode by adoption of the broadcasting transmission technique.

As shown in the figure, the typical information transmitted by an information communication terminal 1 in an ad-hoc mode by adoption of the broadcasting transmission technique includes a unique IP address and unique port number of this terminal, a unique apparatus ID of this terminal, a user ID with a set profile, connection/disconnection information typically indicating a busy or ready state or the like, information on music being reproduced (or now playing) including such as the music title and the artist name, information required in a streaming reproduction process for a musical content being reproduced as a content with a protected copyright, other information such as information on a reproduction state or the like and a text memo entered by the user. The sequence number and object handle of music being reproduced are typical information required in a streaming repro implementable duction process for a musical content being reproduced as a content with a protected copyright.

The unique IP address and unique port number of this terminal, the unique apparatus ID of this terminal and the user ID with a set profile, which are included in the information communication terminal 1 in an ad-hoc mode, are information that basically remains unchanged. On the other hand, the information on music being reproduced (or now playing), the information required in a streaming reproduction process for a musical content being reproduced as a content with a protected copyright and other information such as information on a reproduction state or the like are information varying from time to time. The text memo entered by the user is basically unchanged but the user may enter a text memo with contents varying from time to time.

In addition, each of the information communication terminals 1 setting the WLAN ad-hoc mode may transmit information other than that explained above by referring to FIG. 24 to all apparatus in the range of implementable communications by adoption of the broadcasting transmission technique as long as the other information is information that can be disclosed to any user not registered as a communication partner in the WLAN ad-hoc mode set typically for exchanging information. For example, each of the information communication terminals 1 setting the WLAN ad-hoc mode may transmit image data of an icon (or the thumbnail) of the sender itself along with the information explained above by referring to FIG. 24 to any other information communication terminal 1 setting the WLAN ad-hoc mode. The icon will be displayed on a standby screen of the other information communication terminal 1 operated by an ad-hoc communication partner, who is a user not mutually registered yet. The icon is an icon letting the user, who is not a mutually registered user, display a screen of the owner of the icon. The standby screen will be described later in detail.

On the other hand, each of the information communication terminals 1-1 to 1-5 operated by users A to E respectively as shown in FIG. 23 receives the information explained above by referring to FIG. 24 from each of the information communication terminals 1-1 to 15, and produces a result of determination as to whether the information communication terminals 1-1 to 1-5 each serving as a sender is owned by a user registered as an ad-hoc communication partner in order to recognize the states of communication with the information communication terminals 1-1 to 1-5 each owned by a user registered as an ad-hoc communication partner and recognize information on each user owning another information communication terminal 1 existing in the range of implementable communications as an unregistered information communication terminal 1.

Then, in the WLAN ad-hoc mode, the information communication terminal 1 displays an ad-hoc user list display screen on the display unit 21. The ad-hoc user list display screen is a screen showing a list of pieces of information on users each registered as an ad-hoc communication partner owning the information communication terminal 1 and users each owning another information communication terminal 1 existing in the range of implementable communications as an unregistered information communication terminal 1.

To put it concretely, the ad-hoc user list display screen shows the states of communication with the information communication terminals 1 each owned by a user registered as an ad-hoc communication partner and any other information communication terminal 1 existing in the range of implementable communications as an unregistered information communication terminal 1. The state of communication with another information communication terminal 1 owned by a user registered as an ad-hoc communication partner can be an online state, an offline state or a busy state. The online state of another information communication terminal 1 is a state in which a communication with the other information communication terminal 1 can be carried out. The offline state of another information communication terminal 1 is a state in which a communication with the other information communication terminal 1 cannot be carried out due to the fact that the other information communication terminal 1 does not exist in the range of implementable communications. The busy state of another information communication terminal 1 is a state in which a communication with the other information communication terminal 1 cannot be carried out due to the fact that the other information communication terminal 1 is communicating with another apparatus. As for the state of communication with any other information communication terminal 1 existing in the range of implementable communications as an unregistered information communication terminal 1, an unknown state is displayed.

Let us assume for example that users B, Z, D and E are each a user registered in the information communication terminal 1 owned by user A as a communication partner of user A. In this case, the ad-hoc user list display screen of user A displays a list shown on the left side of FIG. 25 as a list of users. The list of users shows user B in an online state, user Z in an offline state, user D in a busy state, user E in a busy state and user C in an unknown state. That is to say, a communication with user B can be carried out, a communication with user Z cannot be carried out due to the fact that the information communication terminal 1 owned by user Z does not exist in the range of implementable communications, a communication with either of users D and E cannot be carried out due to the fact users D and E are each communicating with another apparatus whereas the information communication terminal 1 owned by user C exists in the range of implementable communications as an unregistered information communication terminal 1.

By the same token, let us assume for example that users A, D and E are each a user registered in the information communication terminal 1 owned by user B as a communication partner of user B. In this case, the ad-hoc user list display screen of user B displays a list shown in the middle of FIG. 25 as a list of users. The list of users shows user A in an online state, user D in a busy state, user E in a busy state and user C in an unknown state. That is to say, a communication with user A can be carried out, a communication with either of users D and E cannot be carried out due to the fact users D and E are each communicating with another apparatus whereas the information communication terminal 1 owned by user C exists in the range of implementable communications as an unregistered information communication terminal 1.

In the same way, let us assume for example that users D and E are each a user registered in the information communication terminal 1 owned by user C as a communication partner of user C. In this case, the ad-hoc user list display screen of user C displays a list shown on the right side of FIG. 25 as a list of users. The list of users shows user D in a busy state, user E in a busy state, user A in an unknown state and user C in an unknown state. That is to say, a communication with either of users D and E cannot be carried out due to the fact that users D and E are each communicating with another apparatus whereas the information communication terminals 1 owned by users A and C each exist in the range of implementable communications as an unregistered information communication terminal 1.

In addition, the ad-hoc user list display screen may also display the name of a user identifiable from at least a user ID included in various kinds of information broadcasted by another information communication terminal 1, the state of communication with the information communication terminal 1 owned by the user and, if necessary, other information. As described above, the state of communication with the information communication terminal 1 owned by the identified user can be an online, offline, busy or unknown state. In the examples shown in FIG. 25, the ad-hoc user list display screen displays the name of each user, the state of communication with the information communication terminal 1 owned by the user and information on a now playing musical content, that is, a musical content being reproduced. In addition, the ad-hoc user list display screen may also display information such as a text memo entered by the user if necessary.

Various kinds of information broadcasted by another information communication terminal 1 include information that cannot be displayed on the ad-hoc user list display screen. The information that cannot be displayed on the ad-hoc user list display screen may be recognized as a user information property.

Figure 25:
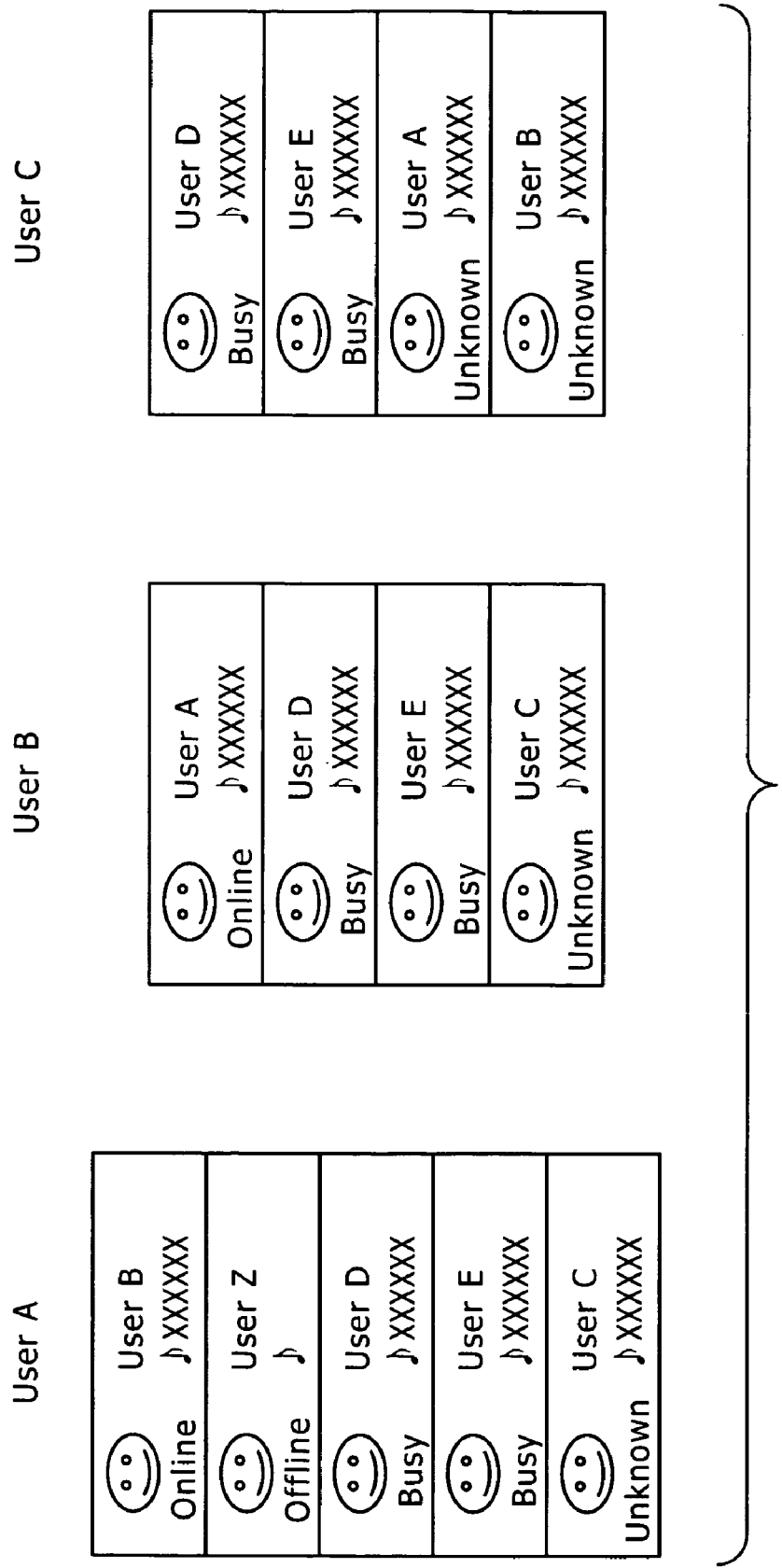
FIG. 25 is an explanatory diagram showing ad-hoc user list display screens.

In the examples shown in FIG. 25, let us assume that a decision is made by user A to confirm selection of the information communication terminal 1 owned by user C but not registered in the information communication terminal 1 owned by user A, a decision is made by user B to confirm selection of the information communication terminal 1 owned by user C but not registered in the information communication terminal 1 owned by user B or a decision is made by user C to confirm selection of the information communication terminal 1 owned by either of user A or B but not registered in the information communication terminal 1 owned by user C. In this case, a dialog box is displayed to show a message for verifying execution of a mutual registration process to register the selected user in the information communication terminal 1 owned by the selecting user and register the selecting user in the information communication terminal 1 owned by the selected user.

FIG. 26 is a diagram explaining typical user information exchanged between the information communication terminals 1 owned by the selecting and selected users serving as communication partners in the mutual registration process. As described above, the mutual registration process is carried out in order to register the selected user in the information communication terminal 1 owned by the selecting user and register the selecting user in the information communication terminal 1 owned by the selected user.

It is desirable to exchange information in the mutual registration process as information including an apparatus unique ID, a user ID with a set profile, a text, image data of a face icon, user color information, an ID used in a communication application and the ID of the instant messenger. Examples of the text entered by the user for the registration purpose are the URL of a home page of the user itself and sentences introducing the user itself. It is needless to say that the face icon to be displayed on a standby screen to be described later does not have to be a photo of the actual face of the user. The user color information set by the user is information on the display color of the background (or the so-called wallpaper) to be displayed during a process to communicate with the user as the background of the display unit 21. An example of the communication application cited above is a tool such as a chatting tool or an IP-telephone tool.

A message can be exchanged even between information communication terminals 1 owned by users not mutually registered in the information communication terminals 1 provided that the information communication terminals 1 exchanging the message exist in the range of implementable communications. For example, the radio communication module 148 employed in the information communication terminal 1 on the sender side transmits a message to an information communication terminal 1 on the recipient side as a message requesting the information communication terminal 1 serving as the message recipient to carry out a mutual registration process for registering the information communication terminals 1 in each other to in order to turn them into mutually registered terminals 1. After the information communication terminal 1 serving as the message recipient approves the request made by the information communication terminal 1 on the sender side, the information shown in FIG. 26 is exchanged between the terminals 1 and supplied to the application processors 131 employed in the terminals 1. The application processors 131 each supply the exchanged information to the flash memory 146 connected to the application processor 131 or either of the flash memory 156 and the large-capacity flash memory 154, which are connected to the audio processor 132. In this way, the exchanged information is stored in each specific one of the information communication terminals 1 as information on the other information communication terminal 1 owned by a user registered in the specific information communication terminal 1 as a communication partner capable of carrying out processing such as a process of exchanging files and a streaming reproduction process in an ad-hoc mode.

Between information communication terminals 1 mutually registering the other information communication terminal 1 as a communication partner capable of carrying out processing such as a process of exchanging files and a streaming reproduction process in an ad-hoc mode, a communication is always performed on a one-to-one basis in the same way as the communication between the information communication terminals 1-4 and 1-5 shown in FIG. 23 in order to implement the processing such as a process of exchanging files and processing to reproduce a musical content in a streaming reproduction process.

It is to be noted that, basically, all data files recorded internally in the information communication terminal 1 can be exchanged with the communication partner of the terminal 1 in the process of exchanging files. In the case of a data file exchanged in a file exchange process as a file having a protected copyright, however, the information communication terminal 1 serving as the communication partner receiving the data file in the file exchange process is not capable of opening (or reproducing) the file unless, for example, the information communication terminal 1 has a descramble key for decrypting the file.

In addition, in the case of a content to be reproduced in a streaming reproduction process as a content with a protected copyright in an ad-hoc mode by an information communication terminal 1 serving as a communication partner receiving the content in a file exchange process and having permission to reproduce the content, the information communication terminal 1 is not capable of opening (or reproducing) the data file containing the content unless, for example, the information communication terminal 1 has a descramble key for decrypting the streamed file.

By referring to FIGS. 27 to 32, the following description explains typical processing carried out by execution of the music tool 463 selected by confirmation from items included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs. The processing carried out by execution of the music tool 463 is typically a process to handle audio data, which is mainly musical data.

Figure 27:
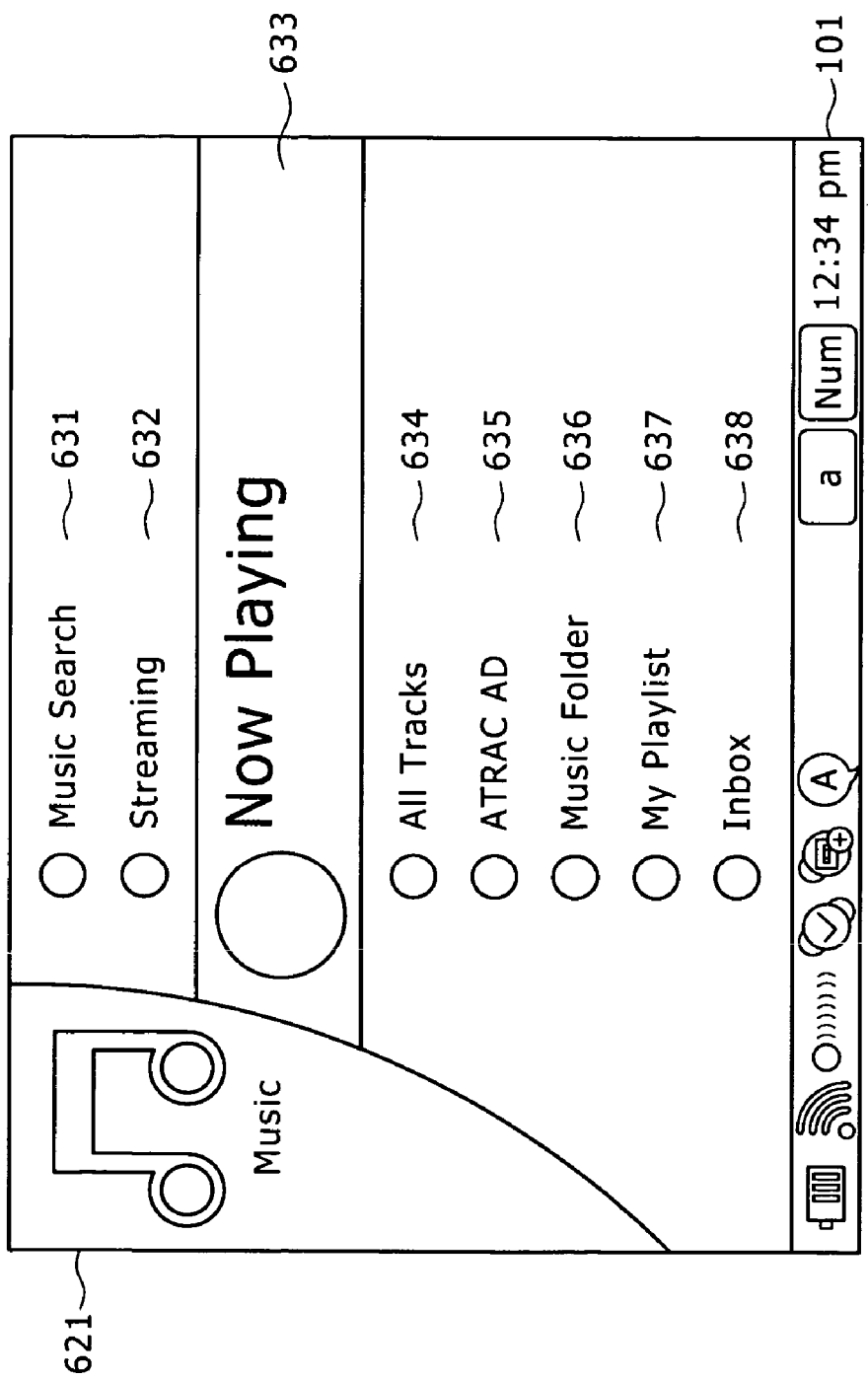
FIG. 27 is an explanatory diagram showing a menu screen.

FIG. 27 is an explanatory diagram showing a list menu screen 621 displayed on the display unit 21 as a list menu screen 621 of the music tool 463 selected by confirmation from items included in a menu displayed on the home screen 451 explained earlier by referring to FIG. 14. As shown in FIG. 27, the list menu screen 621 of the music tool 463 selected by confirmation from items included in a menu displayed on the home screen 451 shows a list of menu items such as Music Search 631, Streaming 632, Now Playing 633, All Tracks 634, ATRAC AD 635, Music Folder 636, My Playlist 637 and Inbox 638. The user is capable of selecting any desired one of the menu items by confirmation by operating the 4-direction keys 26 and the enter button 27.

If the Music Search menu item 631 is selected by confirmation from the list menu screen 621, for example, the music search application of the application layer explained before by referring to FIG. 12 is activated. The activated music search application displays a search screen 651 like one shown in FIG. 28. Then, the user enters a desired search key to a text input area 661 in order to select a musical content as follows.

First of all, when the user enters the desired search key to the text input area 661 and presses the enter button 27, the music search application activated by the application processor 131 supplies the search key received from the keyboard module 149 to the audio processor 132.

By carrying out the music-DB function explained earlier by referring to FIG. 13, the audio processor 132 searches content titles, album titles and artist names for ones each including the search keyword received from the music search application and supplies the result of the search process to the music search application activated by the application processor 131. Let us assume for example that the result of the search process is content titles each including the search keyword.

Figure 28:
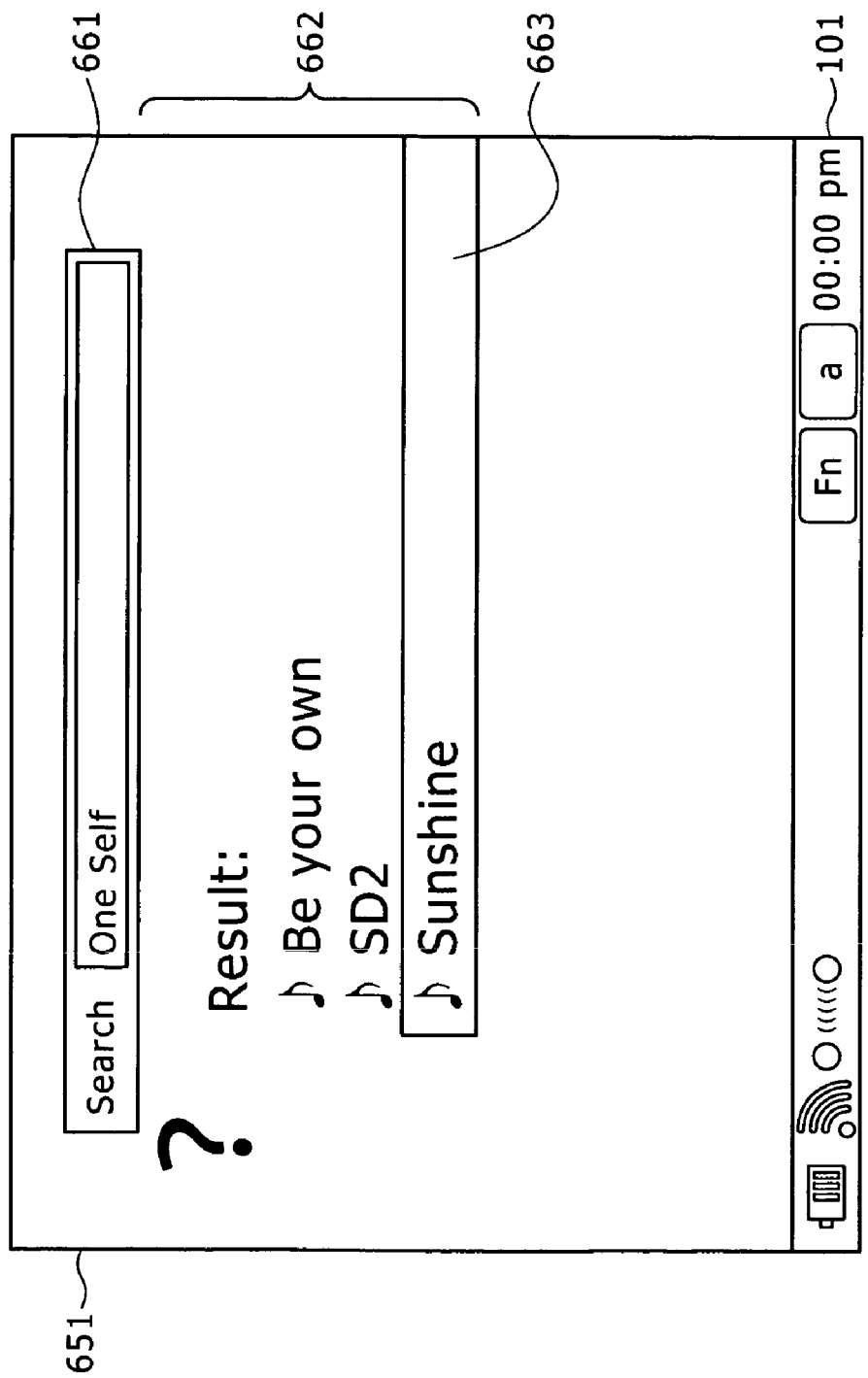
FIG. 28 is an explanatory diagram showing a search screen.

The music search application activated by the application processor 131 displays the search result, which is a list of content titles, in a search-result display area 662 of the search screen 651 as shown in FIG. 28.

Then, the user operates the 4-direction keys 26 in order to move the cursor 663 to the position of a desired content title selected from the list displayed in the search-result display area 662 of the search screen 651, and presses the enter button 27 to confirm the selection of the desired content title pointed to by the cursor 663. In this case, the application processor 131 activates the audio player explained before by referring to FIG. 12 and, if necessary, controls the audio processor 132 to output the musical data of the content, the title of which has been selected by confirmation by the user, as reproduced data. That is to say, by carrying out the function of the audio player explained before by referring to FIG. 13, the audio processor 132 starts a process to reproduce the musical data of the content, the title of which has been selected by confirmation by the user.

To put it concretely, the audio processor 132 reads out the musical data managed by making use of the music DB from the large-capacity flash memory 154 as the musical data selected by confirmation by the user. If the musical data selected by confirmation by the user is data with a protected copyright, the audio processor 132 carries out a process to descramble the data by making use of a function and data, which are stored in the DRM library. The audio processor 132 then supplies data obtained as the result of the descrambling process to the audio-signal processing module 152 and uses an audio coding/decoding function to control the audio-signal processing module 152 to carry out a decoding process and a D/A conversion process on the data obtained as the result of the descrambling process and supply the result of the decoding process and the D/A conversion process to the ringer speaker 42 or a headphone connected to the connector jack 52 to be output as reproduced data.

Figure 29:
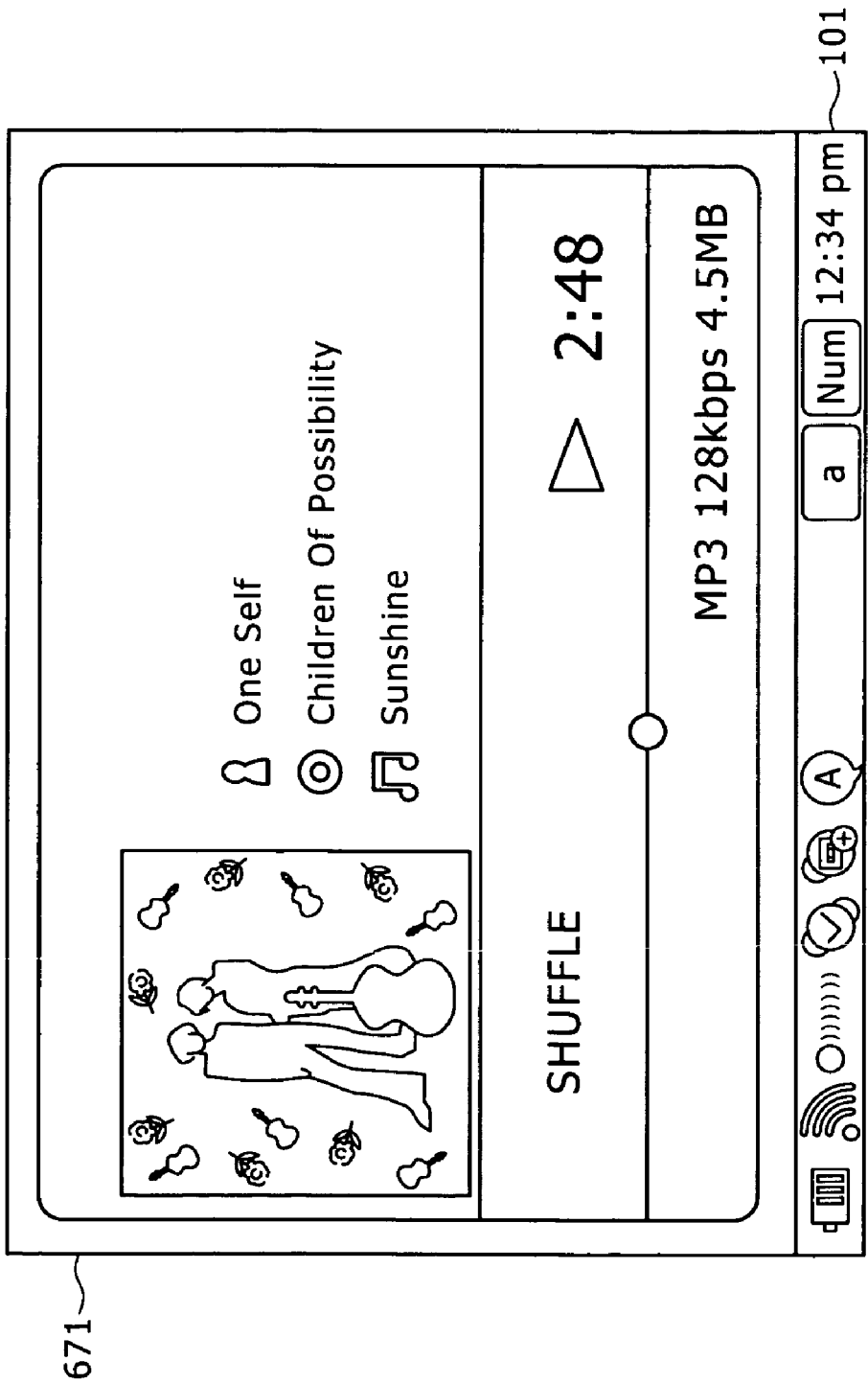
FIG. 29 is an explanatory diagram showing a musical-data reproduction display screen.

FIG. 29 is an explanatory diagram showing a musical-data reproduction display screen 671 appearing on the display unit 21 employed in the information communication terminal 1. The musical-data reproduction display screen 671 displays information on the musical content being reproduced. The information typically includes the title of the musical content, the name of an artist singing the content, the title of an album including the content and the thumbnail image of the jacket of the album.

Figure 30:
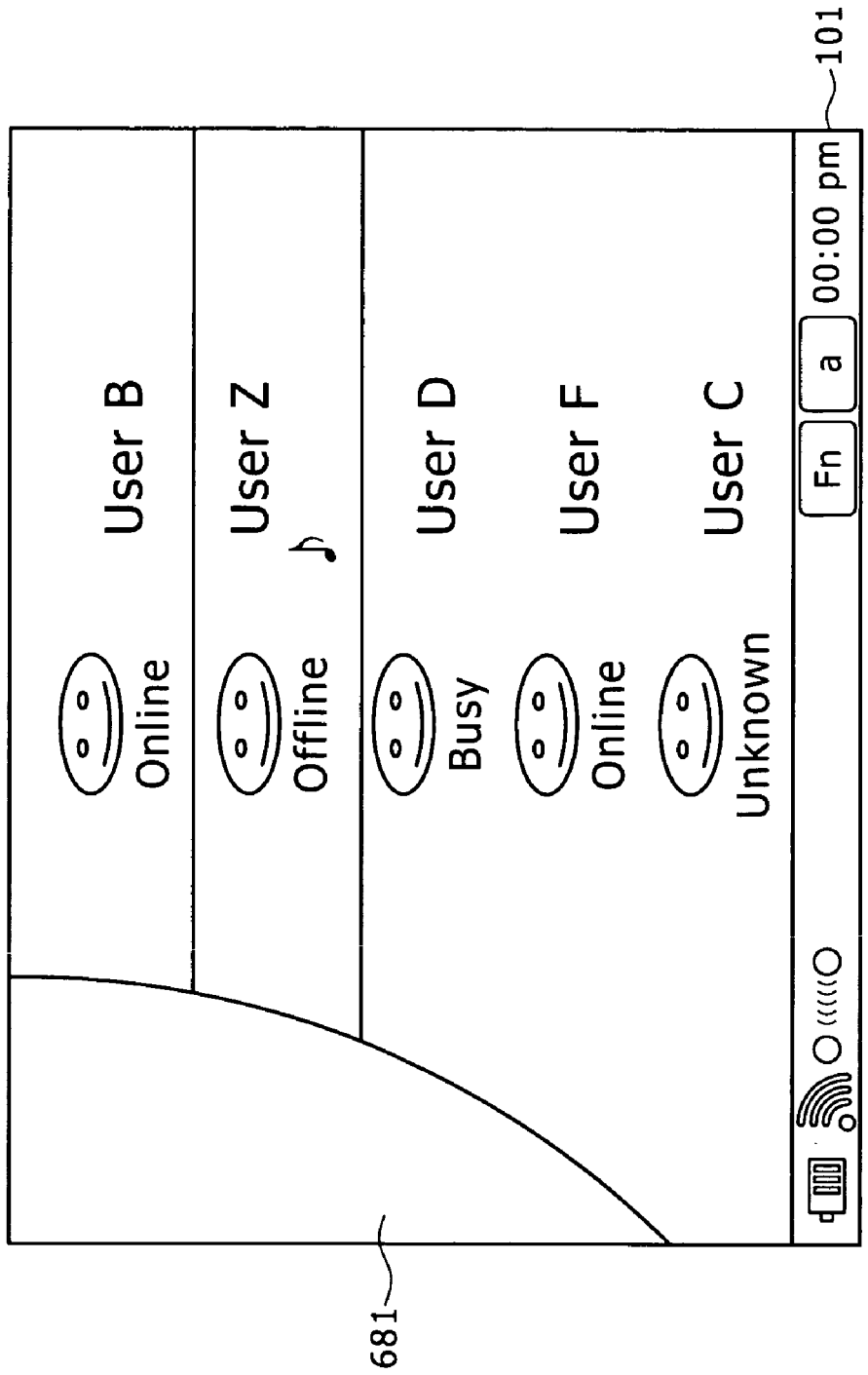
FIG. 30 is an explanatory diagram showing an ad-hoc user list display screen.

Let us now assume that the Streaming 632 is selected by confirmation from items of the menu screen 621 shown in FIG. 27 with the WLAN ad-hoc mode set. In this case, an ad-hoc user list screen 681 like one shown in FIG. 30 is displayed. If the Streaming 632 is selected by confirmation from items of the menu screen 621 shown in FIG. 27 without setting the WLAN ad-hoc mode, on the other hand, the information communication terminal 1 may display a dialog box including a message prompting the user to carry out an operation to set the WLAN ad-hoc mode. In this case, if the user carries out an operation to set the WLAN ad-hoc mode after selecting the Streaming 632 from the menu screen 621 shown in FIG. 27, an ad-hoc user list screen 681 like one shown in FIG. 30 is displayed.

As described before by referring to FIG. 25, the ad-hoc user list screen 681 basically shows a list of pieces of information on users each owning an information communication terminal 1 registered as an ad-hoc communication partner and users each owning an information communication terminal 1 located in a range of implementable communications but not registered as an ad-hoc communication partner.

Figure 31:
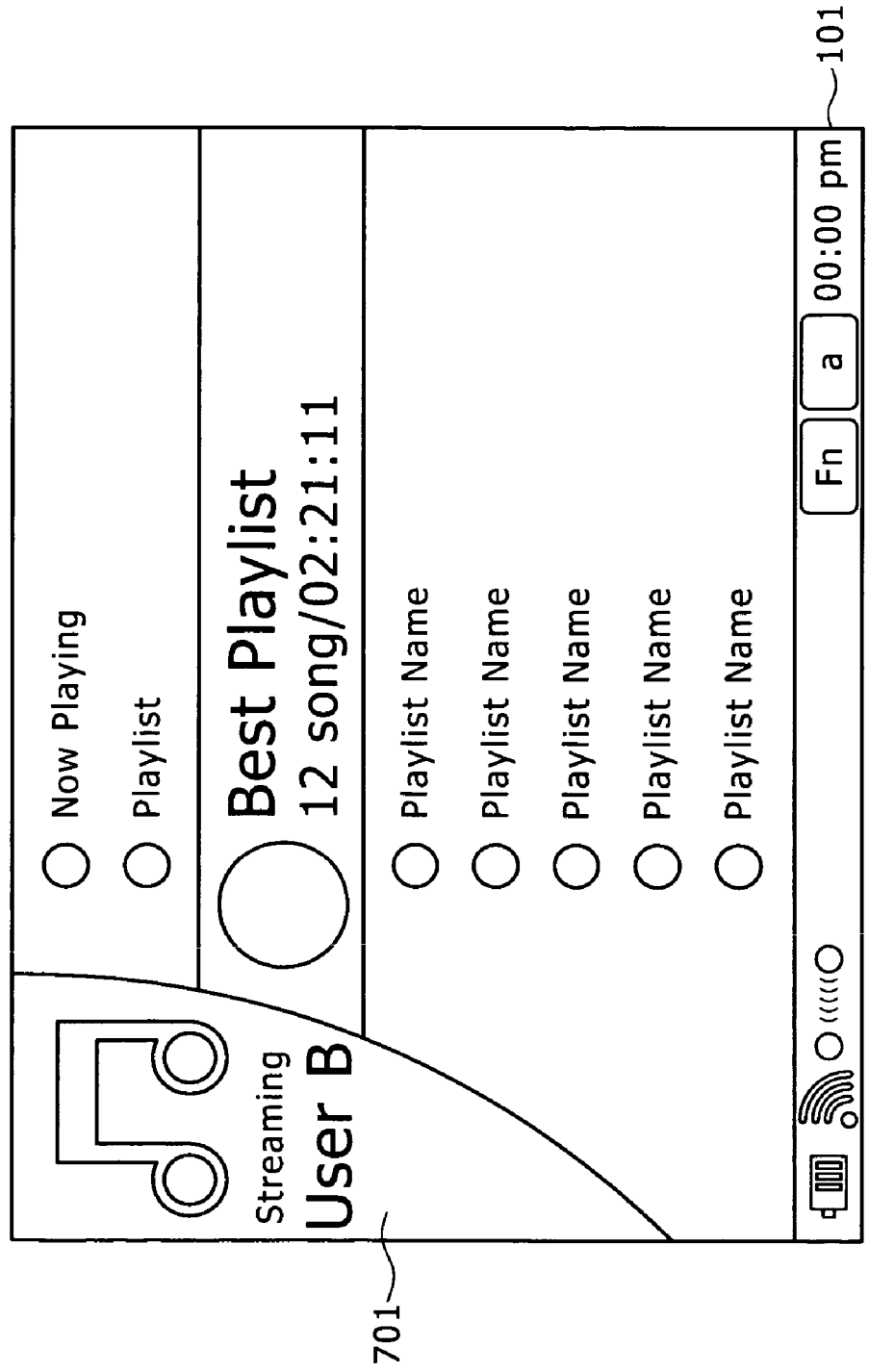
FIG. 31 is an explanatory diagram showing a released-playlist list display screen.

Let us assume for example that user B in an online state is selected by confirmation among users shown on the ad-hoc user list screen 681 of FIG. 30. In this case, the connection of the information communication terminal 1 to an information communication terminal 1 owned by user B in an online state is confirmed and disclosable playlists that can be disclosed to users by broadcasting are exchanged with user B. A playlist to be described later in detail is a list of some musical contents stored internally in the information communication terminal 1. Then, a disclosed-playlist list display screen 701 like one shown in FIG. 31 is displayed. As shown in the figure, the disclosed-playlist list display screen 701 is a list showing disclosed playlists received from the information communication terminal 1 owned by user B as disclosed playlists of user B and information selected from pieces of broadcasted information as information on a musical content being reproduced by (or now playing in) the information communication terminal 1 owned by user B. At that time, if the playlist including the musical content being reproduced by (or now playing in) the information communication terminal 1 owned by user B is a playlist disclosed to users, the disclosed-playlist list display screen 701 shows the playlist as a disclosed playlist in a selected state.

Figure 32:
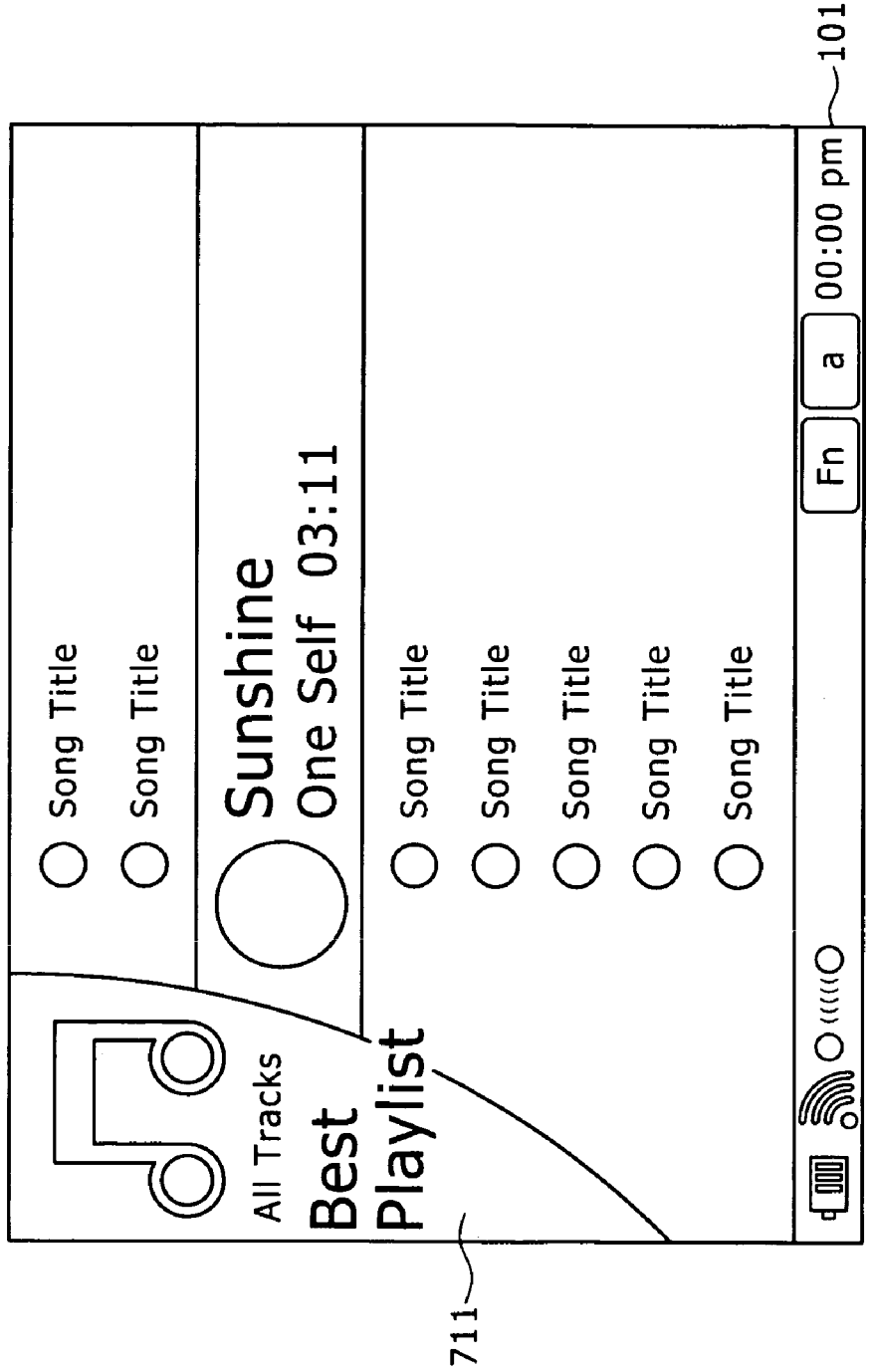
FIG. 32 is an explanatory diagram showing a track display screen.

Let us assume that the user selects by confirmation a desired playlist among the disclosed playlists shown on the disclosed-playlist list display screen 701 of FIG. 31 as disclosed playlists of user B. In this case, a track-list display screen 711 like one shown in FIG. 32 is shown. As shown in the figure, the track-list display screen 711 is a list of tracks included in the desired playlist selected by confirmation among the disclosed playlists shown on the disclosed-playlist list display screen 701. In other words, the track-list display screen 711 is a list of musical contents included in the desired playlist. If the user selects a desired track by confirmation among the tracks shown on the track-list display screen 711, the information communication terminal 1 reproduces the desired track while receiving the track from the information communication terminal 1 owned by user B in a streaming reproduction process.

To put it concretely, the music streaming application executed by the application processor 131 employed in the information communication terminal 1-1 owned by user A receives a signal representing an input operation carried out by the user from the input module 150 and controls the radio communication module 148 to transmit information specifying the musical content selected by user A by confirmation from those included in the desired playlist also selected by user A by confirmation to the information communication terminal 12 owned by user B.

At that time, the display unit 21 employed in the information communication terminal 1-2 owned by user B may or may not display a request made by user A as a request for a permission of a connection with the information communication terminal 1-1 owned by user A.

The music streaming application executed by the application processor 131 employed in the information communication terminal 1-2 receives information from the information communication terminal 1-1 through the radio communication module 148 employed in the information communication terminal 1-2 and supplies the information to the audio processor 132. The information received from the information communication terminal 1-1 is the information specifying the musical content selected by user A by confirmation from those included on the desired playlist also selected by user A by confirmation. The audio processor 132 reads out the musical content managed by making use of the music DB from the large-capacity flash memory 154 and supplies the musical data, which is streamed data, to the application processor 131. The application processor 131 then controls the radio communication module 148 to transmit the streamed musical content to the information communication terminal 1-1.

The music streaming application executed by the application processor 131 employed in the information communication terminal 1-1 receives the streamed musical content from the information communication terminal 1-2 through the radio communication module 148 employed in the information communication terminal 1-1. If the musical content is a content with a protected copyright, the audio processor 132 carries out a process to descramble the musical content by making use of a function and data, which are stored in the DRM library. The audio processor 132 then supplies data obtained as the result of the descrambling process to the audio-signal processing module 152 and uses an audio coding/decoding function to control the audio-signal processing module 152 to carry out a decoding process and a D/A conversion process on the data obtained as the result of the descrambling process and supply the result of the decoding process and the D/A conversion process to the ringer speaker 42 or a headphone connected to the connector jack 52 to be output as reproduced data.

At that time, the musical-data reproduction display screen 671 explained earlier by referring to FIG. 29 is displayed on the display unit 21 employed in the information communication terminal 1-1, which is reproducing the musical content in a streaming reproduction process. As shown in the figure, the musical-data reproduction display screen 671 displays information on the musical content being reproduced. The information typically includes the title of the musical content, the name of an artist singing the content, the title of an album including the content and the thumbnail image of the jacket of the album. In addition, the musical-data reproduction display screen 671 may also display other information such as information on the supplier of the streamed musical content. In this case, the supplier of the streamed musical content is user B.

If the Now Playing 633 is selected by confirmation from items shown on the menu screen 621 explained earlier by referring to FIG. 27, the application processor 131 activates the audio player described before by referring to FIG. 12 and, if necessary, controls the audio processor 132 to output the musical content desired by the user as reproduced musical data. That is to say, the function of the audio player described before by referring to FIG. 13 is executed by the audio processor 132 to start a process to reproduce the musical content selected by the user by confirmation.

The audio processor 132 executes the function of the music DB explained earlier by referring to FIG. 13 to generate a list of musical contents recorded in the large-capacity flash memory 154 or information on a file structure, supplying the list or the information to the application processor 131. The file structure can be a real file structure or a virtual file structure. The application processor 131 displays the list of musical contents recorded in the large-capacity flash memory 154 or the information on the file structure on the display unit 21 by making use of the function of the graphic library. The user enters an operation input selecting a desired musical content by confirmation from those included in the data displayed on the display unit 21.

The audio processor 132 reads out the desired musical content selected by confirmation from those managed by making use of the music DB from the large-capacity flash memory 154. If the desired musical content is a content with a protected copyright, the audio processor 132 carries out a process to descramble the musical content by making use of a function and data, which are stored in the DRM library. The audio processor 132 then supplies data obtained as the result of the descrambling process to the audio-signal processing module 152 and uses an audio coding/decoding function to control the audio-signal processing module 152 to carry out a decoding process and a D/A conversion process on the data obtained as the result of the descrambling process and supply the result of the decoding process and the D/A conversion process to the ringer speaker 42 or a headphone connected to the connector jack 52 to be output as reproduced data.

At that time, the musical-data reproduction display screen 671 explained earlier by referring to FIG. 29 is displayed on the display unit 21.

If the All Tracks 634 is selected from items shown on the menu screen 621 explained earlier by referring to FIG. 27, a list of all tracks recorded in the large-capacity flash memory 154 is displayed on the display unit 21.

It is to be noted that the a content such as musical data recorded in the large-capacity flash memory 154 can be a content directly acquired from a service provider for distributing data of musical contents, acquired from a predetermined recording medium or acquired from another information communication terminal 1 or the personal computer 13. In other words, the content such as musical data recorded in the large-capacity flash memory 154 can be acquired by carrying out a radio communication in the WLAN infrastructure mode or the WLAN ad-hoc mode or by a wire communication through a USB connection according to the MSC or MTP method.

The information communication terminal 1 is capable of recording contents such as musical data in the large-capacity flash memory 154 by classifying the contents in accordance with the acquisition technique, the coding/decoding type and the copyright protection method. For example, the data of musical contents may be received from different service providers for distributing musical contents conforming to different coding/decoding techniques and/or different copyright protection methods. In this case, the contents such as musical data are classified on the basis of the service providers, which can each be an organization or an enterprise.

In the following description, in accordance with a typical classification method, contents such as musical data are categorized into at least 3 groups, i.e., ATRAC AD, Music Folder and Inbox. Thus, when the All Tracks item 634 is selected by confirmation from items shown on the menu screen 621 explained earlier by referring to FIG. 27, a list of all tracks recorded in each of three folders, namely, ATRAC AD, Music Folder and Inbox, are displayed on the display unit 21.

Musical contents stored in the folders named ATRAC AD and Music Folder are contents each acquired by carrying out a radio communication in either the WLAN infrastructure mode or the WLAN ad-hoc mode. To be more specific, musical contents stored in the folder named ATRAC AD are contents each having the ATRAC format. On the other hand, musical contents stored in the folder named Music Folder are contents each having a format other than the ATRAC format. Musical contents stored in the folder named Inbox are contents each acquired by carrying out a wire communication through a USB connection.

In the past, the copyright management method and the coding/decoding method, which were adopted for acquired (or, in most cases, downloaded) musical contents, varied in many cases in accordance with the service provider for distributing the musical contents. In addition, in many cases, the traditional information communication terminal was provided with an application program to be executed to acquire a musical content from a service provider for distributing the musical contents and reproduce the acquired musical content. In such cases, the communication method permitted as a method for exchanging musical data also varied. On the other hand, the information communication terminal 1 is adapted to the WLAN infrastructure radio communication mode and the WLAN ad-hoc radio communication mode as well as the MSC and MTP methods adopted for the USB connection. Thus, by installing an application program (or, software codec or DRM protocol) proper for the WLAN infrastructure radio communication mode and the WLAN ad-hoc radio communication mode and/or the MSC and MTP methods in the information communication terminal 1, the information communication terminal 1 can be made capable of acquiring data of musical contents from a number of service providers as well as storing and reproducing the data.

If the ATRAC AD 635 is selected from items shown on the menu screen 621 explained earlier by referring to FIG. 27, a list of all tracks recorded in the ATRAC AD folder stored in the large-capacity flash memory 154 is displayed on the display unit 21. By the same token, if the Music Folder item 636 is selected by confirmation from items shown on the menu screen 6211 explained earlier by referring to FIG. 27, a list of all tracks recorded in the 'Music Folder' folder stored in the large-capacity flash memory 154 is displayed on the display unit 21. In the same way, if the Inbox item 638 is selected by confirmation from items shown on the menu screen 621 explained earlier by referring to FIG. 27, a list of all tracks received in a file transfer through the USB connection and recorded in the 'Inbox' folder stored in the large-capacity flash memory 154 is displayed on the display unit 21.

Musical contents recorded in the folder named Inbox are each a content acquired from the personal computer 13 connected to the information communication terminal 1 by a USB connection. To put it in detail, musical contents recorded in the folder named Inbox are each a content acquired from the personal computer 13 connected to the information communication terminal 1 by a wire communication through the USB connection according to the MSC or MTP method adopted as the USB connection method.

As described above, in the past, the copyright management method and the coding/decoding method, which were adopted for acquired (or, in most cases, downloaded) musical contents, varied in many cases in accordance with the service provider for distributing the musical contents. In addition, in many cases, the traditional information communication terminal was provided with an application program to be executed to acquire a musical content from a service provider for distributing the musical contents and reproduce the acquired musical content. That is to say, in many cases, since the personal computer 13 has installed application programs provided by a plurality of service providers, a content (such as musical data) stored in the personal computer 13 can be handled only by a predetermined application program provided by a service provider supplying the content. In other words, in many cases, an operation to copy a content from the personal computer 13 connected to the information communication terminal 1 by a USB connection to the information communication terminal 1 can be carried out only by a predetermined application program provided by a service provider distributing the content. Even in such a case, the information communication terminal 1 is capable of acquiring contents such as musical data from the personal computer 13, which has received the data from a variety of service providers, as well as storing and reproducing the data. This is because the information communication terminal 1 is adapted to both the USC and MTP modes adopted as the USB connection mode for the USB connection.

An operation to switch the USE connection mode from MSC to MTP or vice versa can be started by selecting the Tools 468 from the items shown on the home screen 451 explained before by referring to FIG. 14. The setting tool described earlier by referring to FIG. 13 as a tool for the application processor 131 has a function to switch the USB connection mode from DISC to MTP or vice versa by controlling the audio processor 132 to select the MSC or MTP software owned by the audio processor 132 as described earlier by referring to FIG. 13. In this way, the function used by application programs such the file exchange application can be switched.

If the My Playlist 63 is selected from items shown on the menu screen 621 explained earlier by referring to FIG. 27, a list of contents such as musical data is displayed in accordance with an input operation carried out by the user. To put it concretely, My Playlist is a list of contents (such as musical data) managed as a virtual file generated as a file of a virtual-file system in a process to classify the contents in accordance with a method determined by the user. As described before, the contents such as musical data are categorized into at least three groups, i.e., ATRAC AD, Music Folder and Inbox and recorded in three folders, namely, the aforementioned ATRAC AD, Music Folder and inbox folders respectively. For example, the playlist is a list of favorite contents such as songs. In order to manage a number of musical contents, playlists are typically classified by genre into, for example, a playlist of indoor music, a playlist of orchestral music, a playlist of instrumental music and a playlist of vocal music. At the same time, playlists may also be classified by artist and/or performer into, for example, a playlist of music performed by musician A, a playlist of music performed by musician B, a playlist of music performed by orchestra A, a playlist of music performed by orchestra B, a playlist of music performed by conductor A and a playlist of music performed by conductor B. In addition, playlists may also be classified by composer into a playlist of music written by composer A and a playlist of music written by composer B.

In addition, it is needless to say that playlists represented by the My Playlist menu can organized in a layer structure consisting of a plurality of layers. For example, the playlists are classified by composer into large groups such as a playlist of music written by composer A and a playlist of music written by composer B.

Then, music pertaining to each of the large groups is further classified by genre into middle groups such as a playlist of indoor music, a playlist of orchestral music, a playlist of instrumental music and a playlist of vocal music. Furthermore, music pertaining to each of the middle groups is classified by music title into small groups, which including the same title of music performed by different artist and/or performer, or orchestra. By organizing musical contents in a layer structure consisting of a plurality of layers as described above, the user is capable of searching the structure for a musical content, which the user wants to listen to, with ease. For example, the user can easily find a musical content included on the orchestral-music playlist pertaining to the playlist of music written by composer A as a content performed by orchestra B named the Xth Symphony Orchestra.

In addition, it is possible to have a plurality of My Playlist musical groups. In this case, it is needless to say that the same musical content may pertain to more than one My Playlist musical group. Since each of the My Playlist musical groups is a virtual file of a virtual-file system, a musical content is actually stored as a real data file in the large-capacity flash memory 154 even if the same musical content pertains to more than one My Playlist musical group.

On top of that, each of the My Playlist musical groups may include a flag indicating whether or not the group can be disclosed at an ad-hoc broadcasting time. That is to say, it is possible to provide a configuration in which only some of the My Playlist musical groups are disclosed at an ad-hoc broadcasting time.

Moreover, My Playlist can be newly created, deleted or updated with a high degree of freedom in accordance with an operation input entered by the user. For example, it is desirable to provide a configuration in which, when the user presses downward the option button 25 with information on My Playlist displayed on the display unit 21, a dialog box appears on the screen of the display unit 21 as a box for letting the user select an operation to newly create, delete or update My Playlist.

The following description explains applications each executed in order to carry out processing involving a communication process performed in the WLAN infrastructure mode. The applications each executed in order to carry out processing involving a communication process performed in the WLAN infrastructure mode include the instant messenger, the web browser and the communication application including functions such as the IP-telephone function. In addition, application programs such as the email application may also be installed in the information communication terminal 1 as an application to be executed in order to carry out processing involving a communication process performed in the WLAN infrastructure mode.

The following description explains typical processing carried out by execution of the communication application (communication 462) selected by confirmation from application programs included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs.

Examples of the communication tool making use of a wide-area network such as the Internet are the IP-telephone function and the chatting function. Services making use of such communication tools are provided by a plurality of service enterprises each serving as a service provider. The information communication terminal 1 is configured to be capable of utilizing communication tools provided by a plurality of service enterprises each serving as a service provider.

Figure 33:
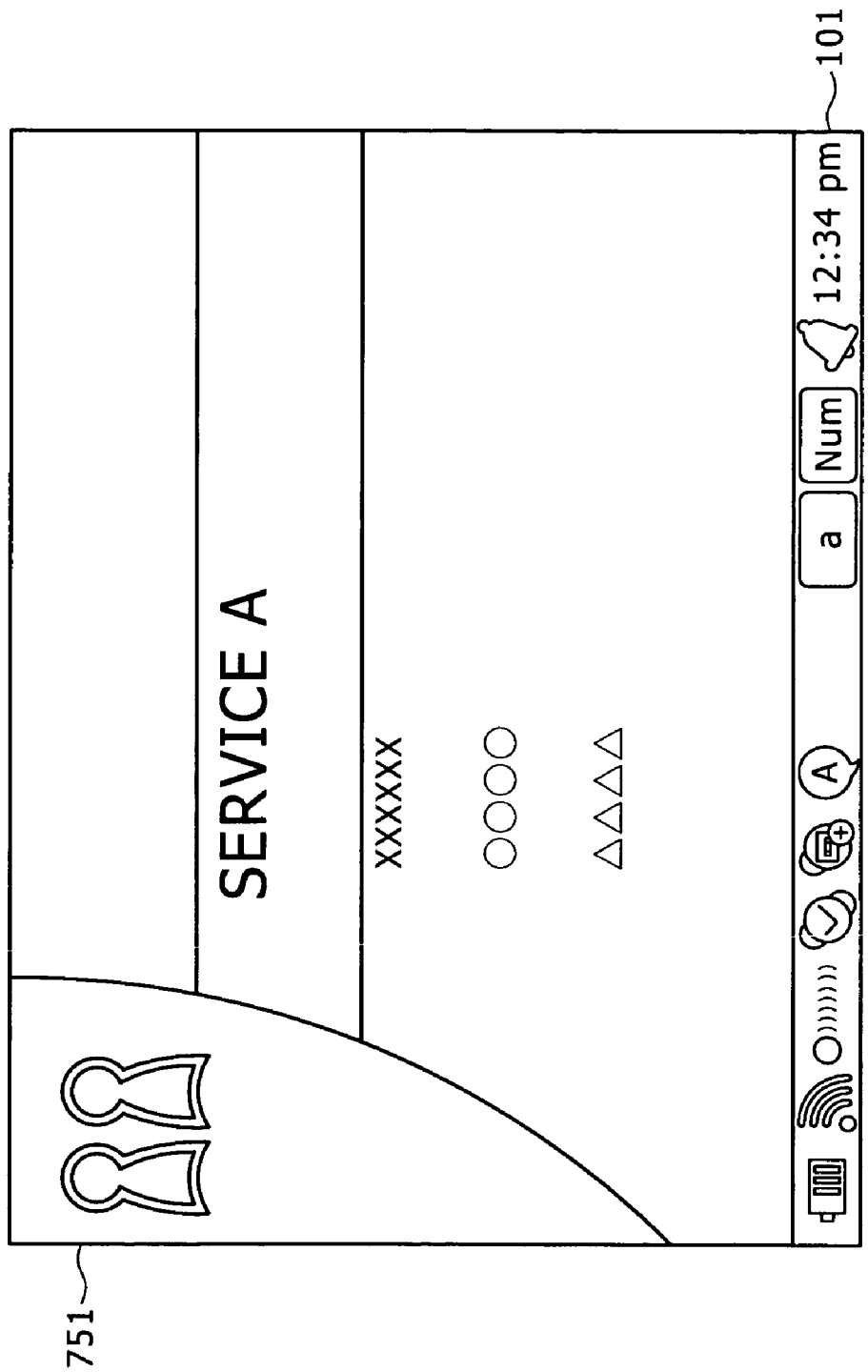
FIG. 33 is an explanatory diagram showing the top screen of a communication application.

FIG. 33 is an explanatory diagram showing the top screen 751 of the communication application (Communication 462) selected by confirmation from application programs included in a menu displayed on the home screen 451 explained earlier by referring to FIG. 14. As shown in FIG. 33, the communication-application top screen 751 displays the names of communication tools provided by a plurality of service enterprises each serving as a service provider.

The user is allowed to set the so-called auto login function in an on or off state in advance for each of the communication tools to be used. The operation to set the auto login function in an on or off state is carried out by the setting tool started by selecting the Tools 468 among items shown in a menu displayed on the home screen 451 explained earlier by referring to FIG. 14. The setting tool has been explained earlier by referring to FIG. 12 as a tool of the application processor 131. The setting tool is provided with a function to switch the auto login function to an on or off state in accordance with an operation input entered by the user or provided with a function to switch the processing carried out by the communication application.

In addition, initial setting can be made in order to automatically activate a communication application with the WLAN put in an on state and the WLAN infrastructure mode set as the communication mode.

FIG. 34 is an explanatory diagram showing a login screen 771, which is displayed when the user selects by confirmation the name of a communication tool with the auto login function disabled in advance among menu items appearing on the communication-application top screen 751 shown in FIG. 33. As shown in FIG. 34, the login screen 771 includes areas to which information required in a login process is to be entered by the user. Information required in a login process includes a user ID and a password.

It is to be noted that, if the WLAN infrastructure mode is not set in this state, a message can be displayed in order to prompt the user to carry out an operation of putting the WLAN infrastructure mode in an on state before going on to a process carried out as described below after the WLAN infrastructure mode is set.

Figure 35:
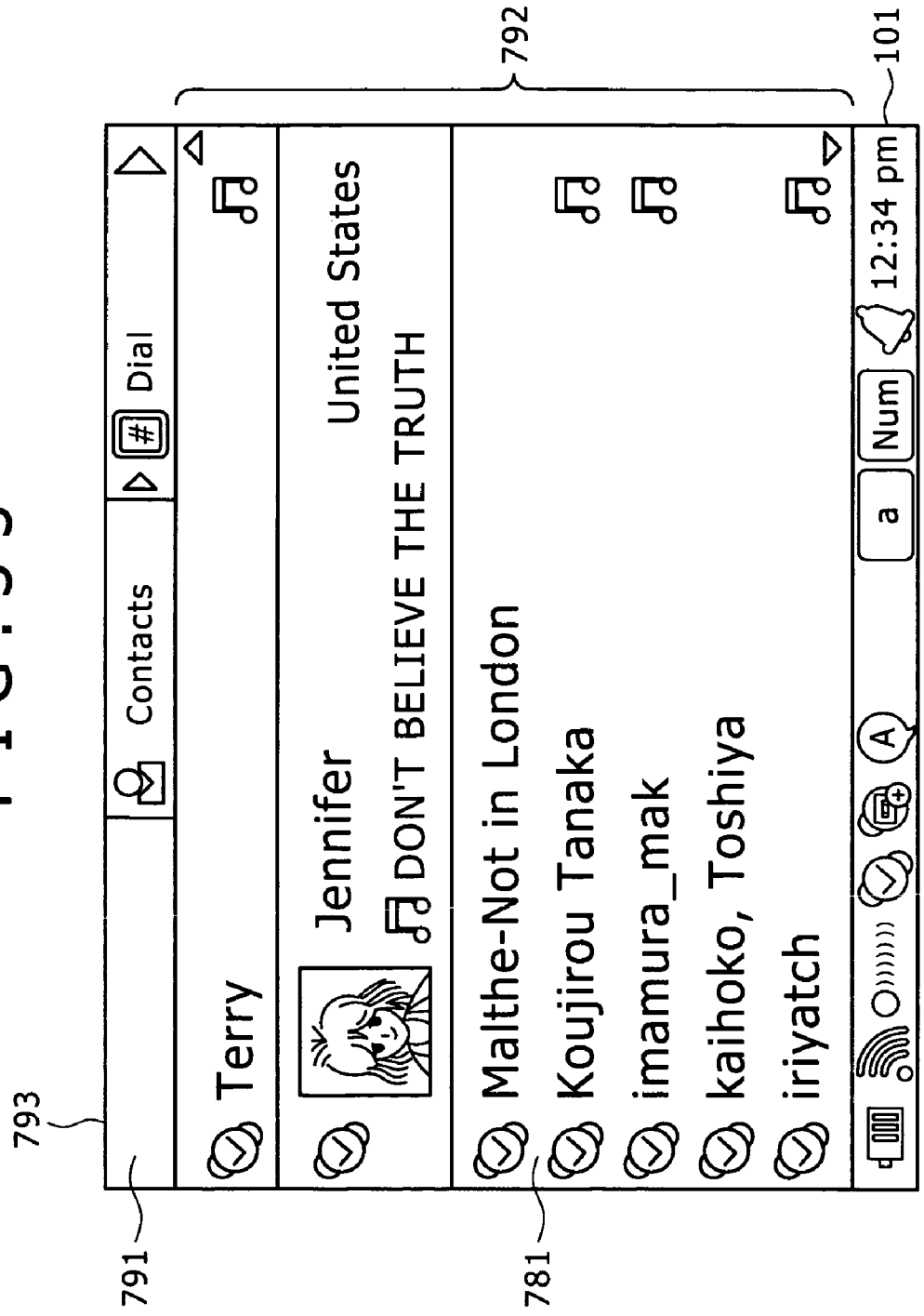
FIG. 35 is an explanatory diagram showing a contact list display screen.

If the user selects by confirmation the name of a communication tool with the auto login function enabled in advance among menu items appearing on the communication-application top screen 751 shown in FIG. 33 or, if the login process is completed by the user by entering the information required in the login process to the login screen 771 shown in FIG. 34, a contact-list display screen 781 like one shown in FIG. 35 is displayed.

As shown in FIG. 35, the contact-list display screen 781 includes a content-tab display area 791 and a list display area 792 in addition to the continuous display panel 101.

The content-tab display area 791 includes a plurality of tabs each showing a command to carry out an operation. The list display area 792 is a list of contacts. The user operates the 4-direction keys 26 to select a tab shown in the content-tab display area 791 and select a contact on the list displayed in the list display area 792, pressing the enter button 27 to confirm the selection of the command and the selection of the contact in order to carry out the command displayed in the selected tab on the selected contact.

In this case, the tabs are laid out virtually to form an array. By operating the right-direction and left-direction keys of the 4-direction keys 26, the user is capable of shifting the whole array horizontally with a center display area 793 of the content-tab display area 791 always assumed to be an area showing the tab selected by the user. By operating the right-direction and left-direction keys of the 4-direction keys 26 to shift the whole array horizontally, the user is capable of shifting any tab on the left or right side of the selected-tab display area 793 to the area 793. It is to be noted that the virtual array can be designed as a circular array with the left-end tab followed by the right-end tab and vice versa or designed as a non-circular array. In the case of a non-circular virtual array, the user is capable of shifting the entire array horizontally to the right by making use of the right-direction key of the 4-direction keys 26 till the left-end tab is placed in the center display area 793 as a selected tab, or shifting the entire array horizontally to the left by making use of the left-direction key of the 4-direction keys 26 till the right-end tab is placed in the center display area 793 as a selected tab.

The content-tab display area 791 typically includes a contact-list tab, a dial tab, a call tab, a chat tab, a call-list tab, a setting tab and a start tab. The contact-list tab is a tab to be selected to display a list of registered users with which the user operating the information communication terminal 1 is capable of communicating. The dial tab is a tab to be selected to display a list of users with which the user operating the information communication terminal 1 is capable of communicating or a list of phone numbers, let the user enter an operation input to select one of the users by confirmation as a communication partner and carry out processing to make an IP call to the selected communication partner. The call tab is a tab to be selected to carry out a process of setting a screen during a call. The chat tab is a tab to be selected to display a text input area for inputting a chatting text and a text display area for displaying a text entered by the chatting partner. The call-list tab is a tab to be selected to display a history of outgoing and incoming calls. The setting tab is a tab to be selected to display a screen used to establish various kinds of setting. The start tab is a tab to be selected to display the status of the information communication terminal 1 owned by the user itself.

With the contact-list tab selected, for example, the list display area 792 shows a list of registered users with which the user operating the information communication terminal 1 is capable of communicating. In this case, the user can operate the 4-direction keys 26 to select a desired registered user among those shown on the list. The desired registered user selected among those shown on the list and information on the selected user may be deliberately displayed to occupy a largest area in the list display area 792 among the unselected users on the list. Then, the user typically operates the enter button 27 in order to confirm the selection of the desired user after examining the information on the selected user. In this case, it is desirable to display a list of usable communication tools, any one of which can be selected by the user. The usable communication tools typically include tools for carrying out the IP-phone, chatting and email functions.

The following description explains typical processing carried out by execution of the web browser 464 selected by confirmation from items included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs.

Figure 36:
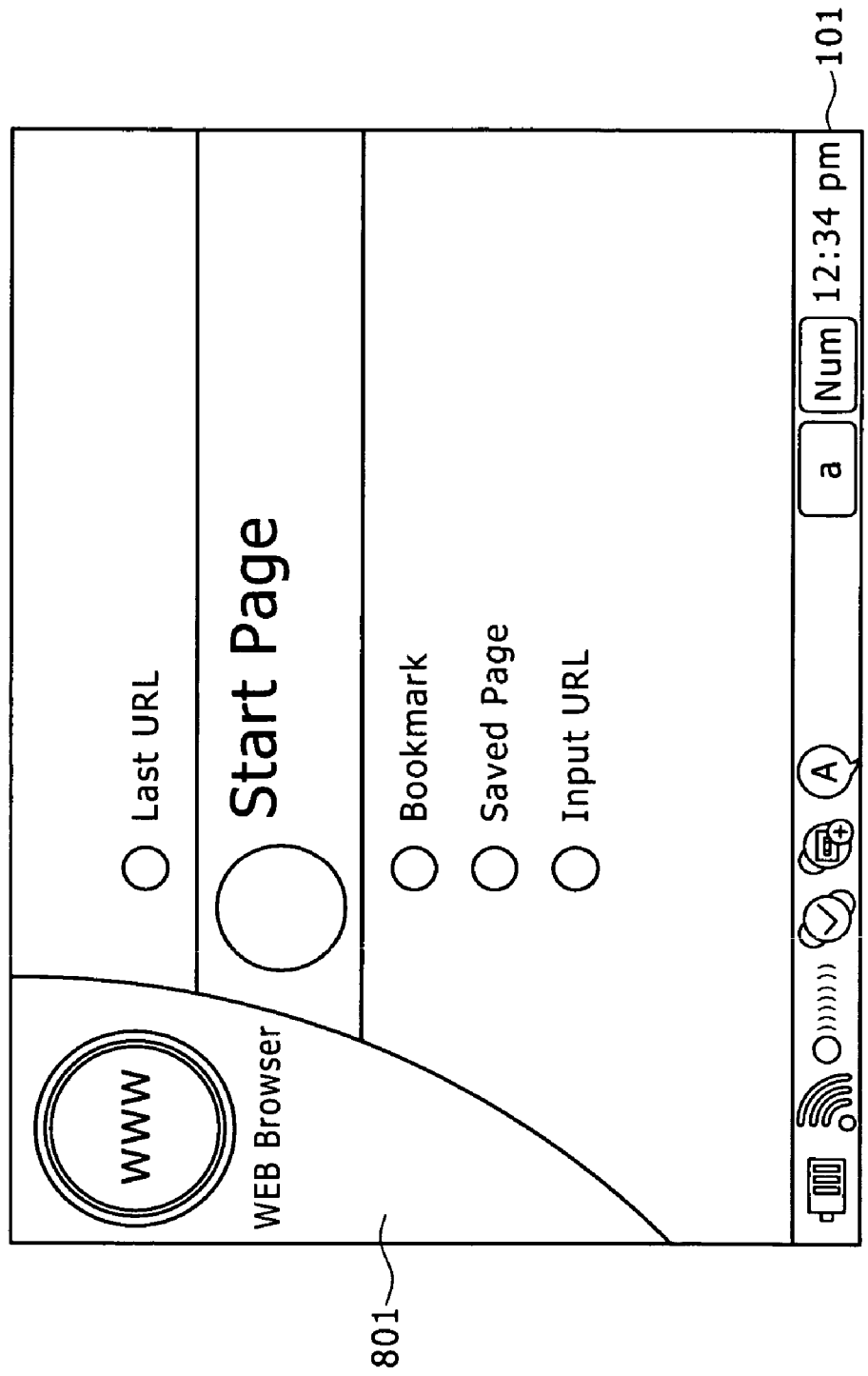
FIG. 36 is an explanatory diagram showing a web browser menu screen.

When the web browser 464 is selected by confirmation from items included in a menu displayed on the home screen 451 explained earlier by referring to FIG. 14, a web browser menu screen 801 like one shown in FIG. 36 is displayed. The web browser menu screen 801 displays a menu used for selecting a method to specify a web page to be displayed.

Typical methods each used to specify a web page to be displayed include a last-URL method, a start-page method, a bookmark method, a saved-page method and an input-URL method. The last-URL method is a method in accordance with which a web page accessed last is displayed. The start-page method is a method in accordance with which a page recorded in advance is displayed as a web page to be displayed initially. The bookmark method is a method in accordance with which a stored list of favorite web pages is displayed and the user selects a desired web page by confirmation among those on the list as a page to be displayed. The saved-page method is a method in accordance with which a page with the data thereof saved in advance is displayed. The input-URL method is a method in accordance with which the user enters the URL of a desired web page.

Figure 37:
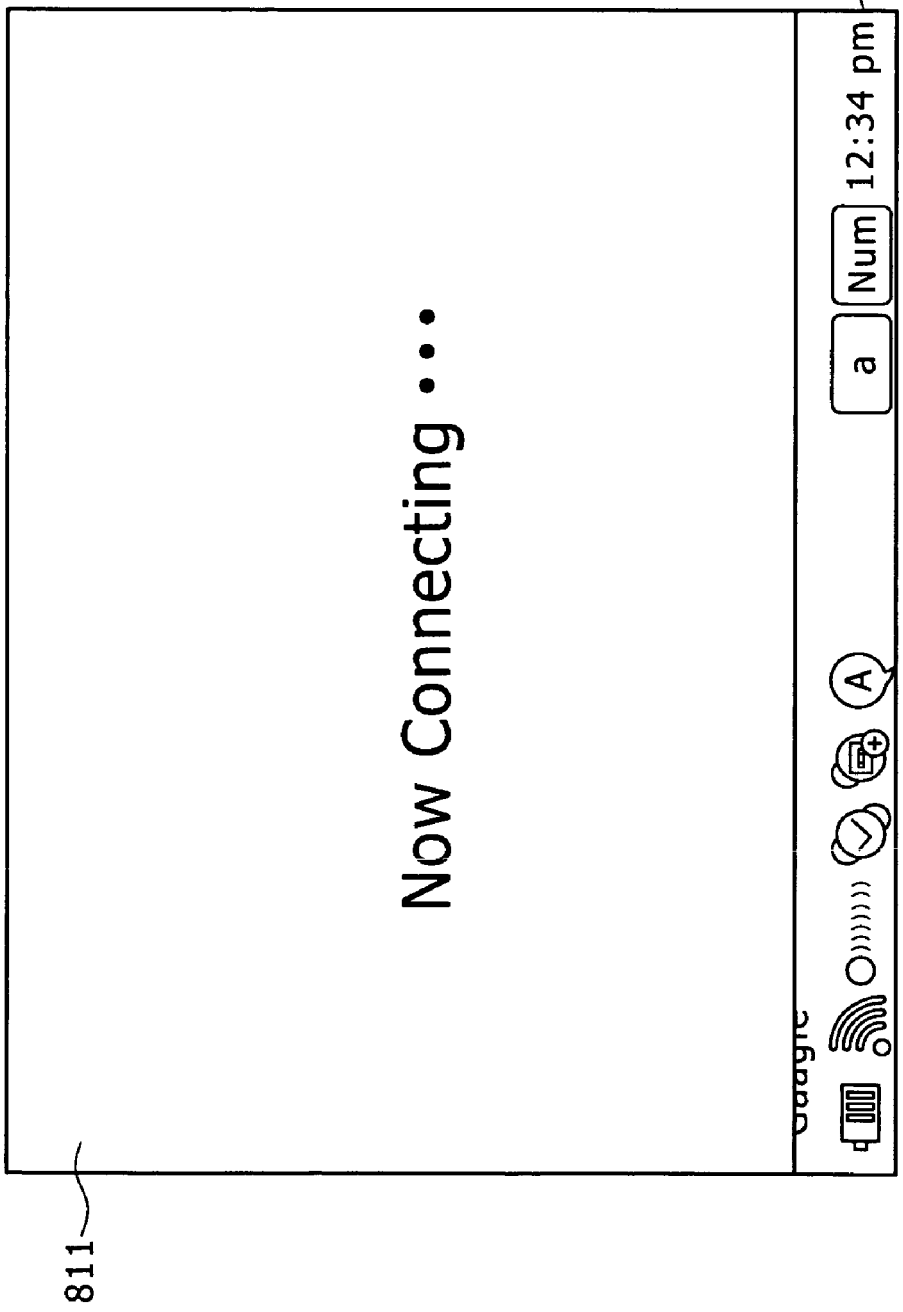
FIG. 37 is an explanatory diagram showing a connection screen.

When the user selects a method to specify a web page to be displayed from those appearing on the web browser menu screen 801 and a web page to be accessed is confirmed, a connection to the page is established. In the mean time, a connection screen 811 like one shown in FIG. 37 is displayed. The connection to the web page is established by making an access to a server 12 disclosing the page in the network such as the Internet.

Figure 38:
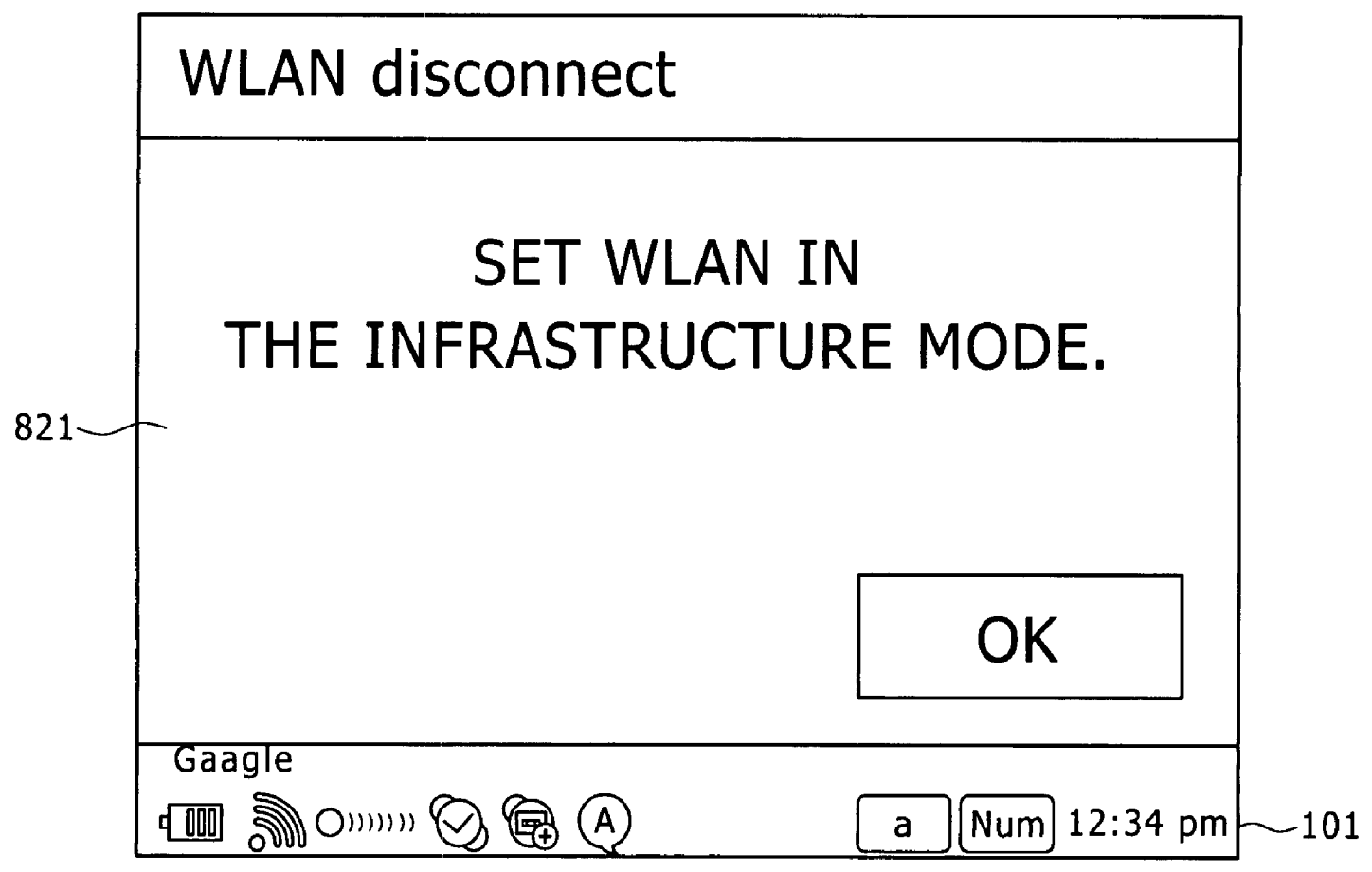

It is to be noted that, if the WLAN infrastructure mode has not been put in an on state in this case, the information communication terminal 1 typically displays a message display screen 821 including a message shown to the user as a message prompting the user to carry out an operation to set the WLAN infrastructure mode as shown in FIG. 38 before going on to a process carried out as described below after the WLAN infrastructure mode is set.

Figure 39:
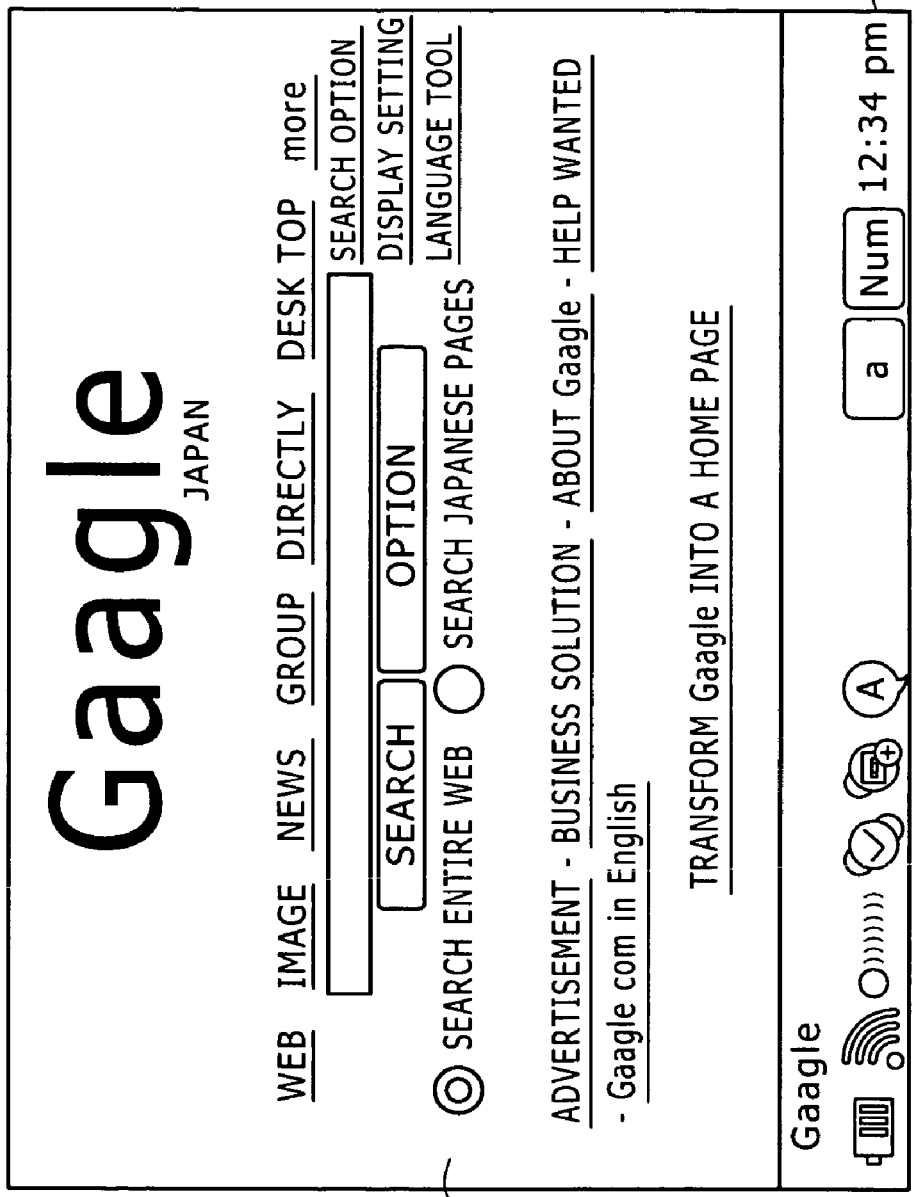
FIG. 39 is an explanatory diagram showing a web-page display screen.

After the WLAN infrastructure mode is put in an on state and the connection to the web page at the specified URL is established, the web page is displayed as a web-page display screen 831 like one shown in FIG. 39.

In addition, the continuous display panel 101 of the connection screen 811 shown in FIG. 37, the continuous display panel 101 of the message display screen 821 shown in FIG. 38 and the continuous display panel 101 of the web-page display screen 831 shown in FIG. 39 may display information such as the URL or name of the web page to be connected or being connected.

The following description explains typical processing, which is carried out when the standby screen 461 is selected by confirmation from items included in a menu displayed on the home screen 451 explained earlier by referring to FIG. 14. As described before, the displayed menu is a list of application programs that can be executed in the information communication terminal 1 or, as an alternative, the displayed menu can also be a list of items each including a plurality of such application programs.

Figure 40:
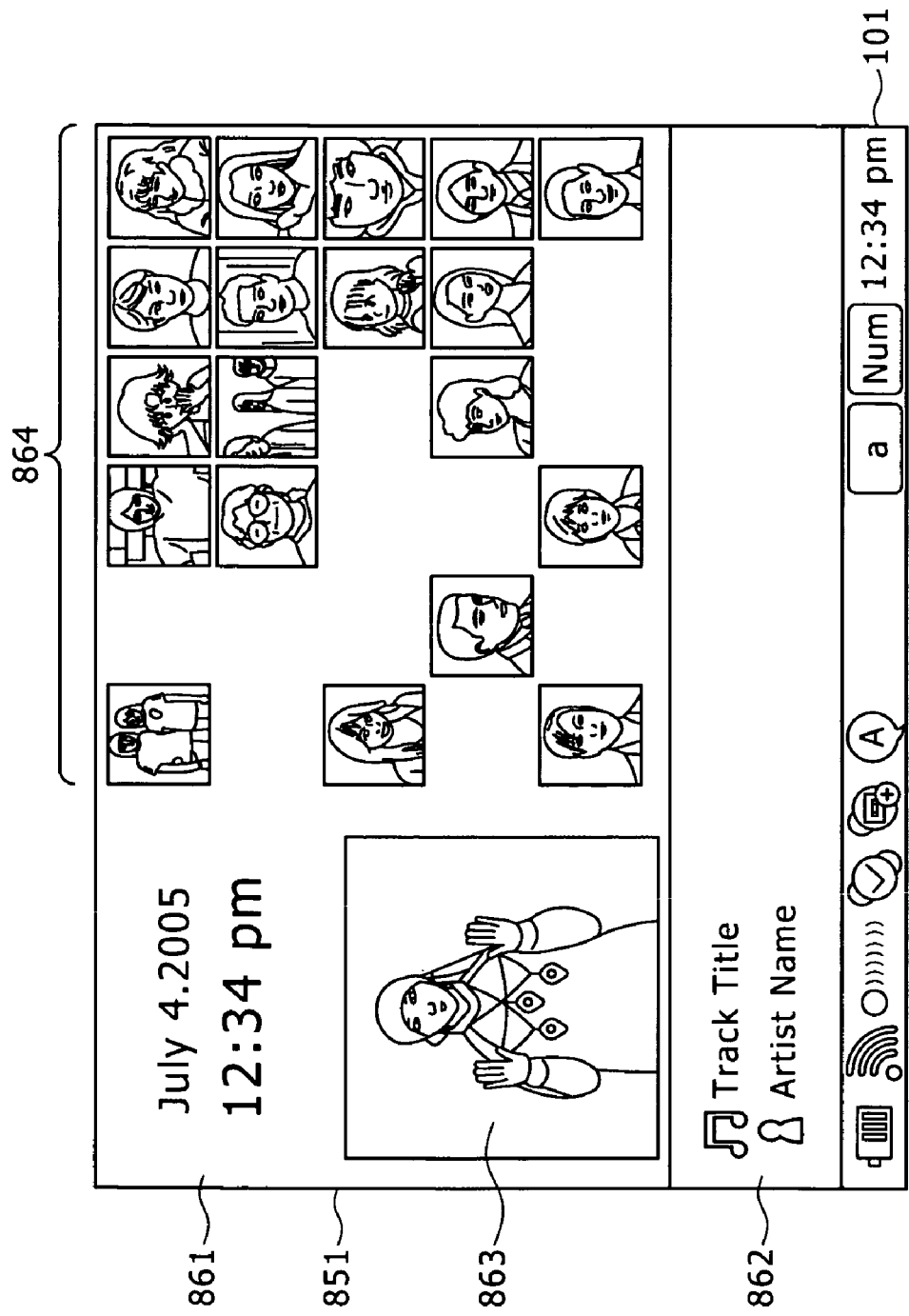
FIG. 40 is an explanatory diagram showing a standby screen.

When the standby screen 461 is selected by confirmation from items included in a menu displayed on the home screen 451 explained earlier by referring to FIG. 14, a standby screen 851 like one shown in FIG. 40 is displayed.

As shown in the figure, the standby screen 851 includes a date/time display area 861, a reproduced music data information display area 862, an image display area 863 and a contact-icon display area 864.

The date/time display area 861 is an area for displaying the present date expressed in terms of a year, a month and a day, and displaying the present time.

The reproduced music data information display area 862 is an area for displaying information on a musical content if the musical content is presently being reproduced and output.

The image display area 863 is an area for displaying an image. For example, if an image set by the user exists or if a musical content is presently being reproduced and output, the image set by the user or an image stored by being associated with the musical content is displayed in the image display area 863. The image set by the user is typically the so-called wallpaper whereas the image stored by being associated with the musical content is typically the image of a jacket for an album including the musical content.

The contact-icon display area 864 is an area for displaying information on whether or not it is possible to communicate with a communication partner in the current communication mode. The information also includes information on whether the communication partner is a registered partner.

Thus, the standby screen 851 displays information on whether or not it is possible to communicate with a communication partner in each current communication mode. That is to say, the information communication terminal 1 is configured to be capable of communicating with another apparatus by adoption of the radio-communication method or the wire-communication method. When the information communication terminal 1 is configured to be capable of communicating with another apparatus by adoption of the radio-communication method, however, the information communication terminal 1 is capable of communicating with a plurality of information communication terminals 1. In this case, the standby screen 851 displays information on whether or not it is possible to communicate with a communication partner in the WLAN infrastructure mode or the WLAN ad-hoc mode with the WLAN communication enabled.

In the WLAN ad-hoc mode, the contact-icon display area 864 may typically display icons each representing an online user, which is defined as a registered user existing in the present range of implementable communications. In addition, in the WLAN ad-hoc mode, the contact-icon display area 864 may also display icons each representing an online user, which is defined as a registered user existing in the present range of implementable communications as described above, and icons each representing an unknown user, which is defined as an unregistered user existing in the range of implementable communications, by distinguishing the icons for online users from the icons for unknown users from each other. On top of that, in the WLAN ad-hoc mode, the contact-icon display area 864 may also display icons each representing an online user, icons each representing an offline user, which is defined as a registered user not existing in the present range of implementable communications, and icons each representing an unknown user by distinguishing the icons for online users, the icons for offline users and the icons for unknown users from each other in basically the same way as the displays explained before by referring to FIG. 25.

Furthermore, in the WLAN ad-hoc mode, the contact-icon display area 864 may typically display icons representing users with which the information communication terminal 1 is capable of communicating by executing a plurality of application programs each used for carrying out a communication process in the WLAN ad-hoc mode. To be more specific, the contact-icon display area 864 may display icons each representing a user with which the information communication terminal 1 is capable of communicating by execution of the instant messenger, icons each representing a user with which the information communication terminal 1 is capable of communicating by execution of the communication application, and icons each representing a user, the email address of which has been registered in the information communication terminal 1.

In such cases, if the communication mode is switched from the WLAN infrastructure mode to the WLAN ad-hoc mode or vice versa with the standby screen 851 displayed for example, icons appearing in the contact-icon display area 864 of the standby screen 851 are automatically changed in accordance with the switching of the communication mode.

To put it in detail, the application processor 131 generates data of images to be displayed in the contact-icon display area 864 of the standby screen 851 correlating to the communication mode, and controls the display module 142 to display the images on the display unit 21. The application processor 131 generates data on the basis of information stored in the flash memory 146 connected to the application processor 131 or either of the flash memory 156 and the large-capacity flash memory 154, which are connected to the audio processor 132. The information used as the basis for generating the data can be:

information on each other information communication terminal 1 owned by a user registered as a communication partner, in conjunction with which a file can be exchanged or a streaming reproduction process or other operations can be carried out in the WLAN ad-hoc mode;

information on each other information communication terminal 1 owned by a user registered as a communication partner for the instant messenger or the communication application in the WLAN infrastructure mode; or the broadcasted information explained earlier by referring to FIG. 24 as information received by the radio communication module 148 employed in this information communication terminal 1 in the WLAN ad-hoc mode.

It is to be noted that each icon displayed in the contact-icon display area 864 as an icon representing a registered user is created on the basis of image data included in the information explained earlier by referring to FIG. 26 as user information, which is received if the user is a mutually registered user. On the other hand, each icon displayed in the contact-icon display area 864 as an icon representing an unknown user defined as an unregistered user existing in the range of implementable communications is created on the basis of image data received as image data for the icon along with the broadcasted information explained earlier by referring to FIG. 24 if such image data has been received for the icon. As an alternative, an icon displayed in the contact-icon display area 864 as an icon representing an unknown user can be an icon showing character information included in the broadcasted information explained earlier by referring to FIG. 24. For example, the icon displayed in the contact-icon display area 864 as an icon representing an unknown user is an icon showing the word 'unknown'.

In addition, it is desirable to arrange icons each displayed in the contact-icon display area 864 as an icon representing a registered user in accordance with predetermined rules, which will be described later in detail.

By having the configuration described above, the user owning the information communication terminal 1 is capable of determining which other user is to be contacted by adoption of a more natural method in a process to contact the other user through a communication with the other user.

That is to say, in general, in a communication including a case not making use of a communication apparatus, an attempt is made to contact a person, who can be contacted with ease, in some cases. An example of such a person who can be contacted with ease is a nearby person. In other words, the standby screen displays partners (with each of whom the user is capable of communicating) by indicating that each of the partners is an online partner, an offline partner or an unknown partner defined as a partner with whom the user is capable of communicating but has not communicated before. In this way, the user owning the information communication terminal 1 is capable of determining which other user is to be contacted by adoption of a more natural method in a process to contact the other user through a communication with the other user.

In addition, it is possible to provide a configuration in which, if any of the icons appearing in the contact-icon display area 864 is selected in the WLAN ad-hoc mode, image data disclosed by a selected user is displayed in the image display area 863 whereas information on a musical content being reproduced by the selected user, a text memo broadcasted by the selected user and other information are displayed in the reproduced music data information display area 862 on the basis of the information explained earlier by referring to FIG. 24 as information broadcasted by another information communication terminal 1 existing in the range of implementable communications and on the basis of the user information explained earlier by referring to FIG. 26 as information exchanged with a communication partner in a process to mutually register the communication partner.

On top of that, the information communication terminal 1 is configured to be capable of producing a result of determination as to whether or not a musical content is being reproduced by another information communication terminal 1 on the basis of the Now Playing information included in information broadcasted by the other information communication terminal 1 in the WLAN ad-hoc mode. Thus, in the WLAN ad-hoc mode, it is possible to provide a configuration in which the application processor 131 employed in this information communication terminal 1 activates a portion of the music streaming function in advance as a background function with the standby screen 851 displayed, an icon representing another information communication terminal 1 owned by a registered user existing in a range of implementable communications is selected among icons appearing in the contact-icon display area 864 and, if the user represented by the selected icon is reproducing a musical content, the application processor 131 transmits a request to another information communication terminal 1 owned by the user represented by the selected icon in order to request the other information communication terminal 1 to serve as the sender of the musical content in a streaming reproduction process to be carried out by this information communication terminal 1 on the musical content being reproduced so that this information communication-terminal 1 is capable of carrying out the streaming reproduction process to reproduce the musical content received from the other information communication terminal 1. It is to be noted that a displayed icon may be regarded as a selected icon only if the icon is being pointed to by a cursor used for selecting an icon for at least a predetermined period of typically three seconds in order to prevent any icon, which happens to be instantly pointed to by the cursor in a process to change the position of the cursor during an operation to select an icon, from being interpreted as a selected icon. In this way, the application processor 131 is capable of transmitting a request to another information communication terminal 1 owned by a user represented by the truly selected icon in order to request the other information communication terminal 1 to serve as the sender of the musical content in a streaming reproduction process to be carried out by this information communication terminal 1 on the musical content being reproduced by the other information communication terminal 1 instead of transmitting the request to another information communication terminal 1 owned by a user represented by an icon, which happens to be instantly pointed to by the cursor in a process to change the position of the cursor during an operation to select an icon.

On top of that, it is possible to provide a configuration in which, if any of the icons appearing in the contact-icon display area 864 is selected in the WLAN infrastructure mode, image data disclosed by a selected user is displayed in the image display area 863 whereas a text memo broadcasted by the selected user and other information are displayed in the reproduced music data information display area 862 on the basis of the user information explained earlier by referring to FIG. 26 as information exchanged with a communication partner in a process to mutually register the communication partner.

In addition, it is possible to provide a configuration in which, if any of the icons appearing in the contact-icon display area 864 is selected, without regard to whether the communication mode is the WLAN infrastructure mode or the WLAN ad-hoc mode, the selected icon is displayed in a shape enlarged to typically about 150% of the shapes of the other icons.

Furthermore, it is possible to provide a configuration in which, if any of the icons appearing in the contact-icon display area 864 is selected by confirmation, for example, user information can be displayed on the display unit 21 on the basis of the information explained earlier by referring to FIG. 24 as information broadcasted by another information communication terminal 1 existing in the range of implementable communications and on the basis of the user information explained earlier by referring to FIG. 26 as information exchanged with a communication partner in a process to mutually register the communication partner.

Moreover, it is possible to provide a configuration in which, if any of the icons appearing in the contact-icon display area 864 is selected by confirmation, a list of applications is displayed in order to show the applications each usable for exchanging information with another apparatus such as another information communication terminal 1 owned by a user represented by the icon selected by confirmation or the personal computer 13.

By providing configuration described above, the user owning the information communication terminal 1 is capable of determining which other user is to be contacted by adoption of a more natural method in a process to contact the other user through a communication with the other user.

That is to say, in a communication including a case of not making use of a communication apparatus in general, in order to contact a certain communication partner, it is necessary to think of a method for contacting the partner. That is to say, a list of applications is displayed as a list showing applications each usable in a process to exchange information with a communication partner selected by confirmation by making use of the standby screen in order to make the user owning the information communication terminal 1 capable of determining which other user is to be contacted by adoption of a more natural method in a process to contact the other user through a communication with the other user.

Most of the processes to select an icon from those appearing on the standby screen 851 described above and control an operation to display a list of applications each usable for contacting a specific user represented by the selected icon displayed on a screen following the standby screen 851, that is, an operation to display a list of applications each usable for exchanging information with the specific user are basically processes carried out by the application processor 131 by execution of the menu display tool explained earlier by referring to FIG. 12.

FIG. 41 is a functional block diagram showing functions of the menu display tool executed by the application processor 131 in most of the processes to select an icon from those appearing on the standby screen 851 described above and control an operation to display a list of applications each usable for contacting a specific user represented by the selected icon displayed on a screen following the standby screen 851, that is, an operation to display a list of applications each usable for exchanging information with the specific user. It is to be noted that the menu display tool executed by the application processor 131 also has other functions not shown in FIG. 41. For example, the menu display tool has another function to control a process to display another display screen. However, the explanation of the other function, which is not shown in FIG. 41, is omitted from this patent specification. The functional blocks shown in the figure are an operation-input acquisition unit 871, a communication-state acquisition unit 872, a display setting storage control unit 873, a registered-user information acquisition unit 874, a broadcasted-information acquisition unit 875, an online/offline determination unit 876, an icon-array determination unit 877, a usable-application extraction unit 878, a display information acquisition unit 879 and a display-image generation unit 880.

The operation-input acquisition unit 871 is a section for receiving a signal representing an operation input entered by the user to the input module 150 from a device driver through the OS.

The communication-state acquisition unit 872 is a section for acquiring a radio-communication state controlled by an application program for controlling the operation of the WLAN as the state of the radio communication of the information communication terminal 1. To be more specific, the communication-state acquisition unit 872 produces a result of determination as to whether the WAN is an on or off state and, if the WAN is an on state, the communication-state acquisition unit 872 produces a result of determination as to whether the adopted communication mode is the WLAN infrastructure mode or the WLAN ad-hoc mode.

The display setting storage control unit 873 is a section for acquiring information on display setting of the standby screen 851 on the basis of receiving a signal received by the operation-input acquisition unit 871 as the signal representing an operation input entered by the user to the input module 150 and storing the information in the flash memory 146. The display setting storage control unit 873 is also a section for controlling an operation to read out information on display setting from the flash memory 146 by controlling a device driver through the OS.

The registered-user information acquisition unit 874 is a section for controlling a process to read out information on a registered user from the large-capacity flash memory 154 by way of the audio processor 132 by controlling a device driver through the OS. The registered user is typically a user capable of serving as a communication partner in either of a streaming reproduction process and a file exchange process, which are carried out in the WLAN ad-hoc mode, or a user capable of serving as a communication partner by executing an application program in the WLAN infrastructure mode as a program for carrying out a communication process in the WLAN infrastructure mode.

The broadcasted-information acquisition unit 875 is a section for controlling a process to acquire the information explained earlier by referring to FIG. 24 as information broadcasted by another information communication terminal 1 existing in the range of implementable communication from the radio communication module 148 by controlling a driver through the OS.

The online/offline determination unit 876 is a section for making an access in the WLAN infrastructure mode to typically each of the servers 12 each rendering a service by making use of at least some functions of an application program used for carrying out a communication with another apparatus in the WLAN infrastructure mode in order to produce a result of determination as to whether a user registered as a communicatable user is an online or offline user. Examples of the application program are the communication application and the instant messenger. In addition, the online/offline determination unit 876 is also a section for controlling a device driver for controlling operations carried out by the radio communication module 148 so as to allow the communication mode to be switched from the WLAN infrastructure mode to the WLAN ad-hoc mode or vice versa if necessary for, among others, the purpose of producing a result of determination as to whether a user registered as a communicatable user is an online or offline user.

The icon-array determination unit 877 is a section for determining an array of icons to be displayed in the contact-icon display area 864 on the basis of information including:

a radio-communication state detected by the communication-state acquisition unit 872 as the radio-communication state of the information communication terminal 1;

display setting information read out from the flash memory 146 in a read operation controlled by the display setting storage control unit 873;

information received by the registered-user information acquisition unit 874 as information on registered users;

information received by the broadcasted-information acquisition unit 875 as information broadcasted in the WLAN ad-hoc mode; and a determination result produced by the online/offline determination unit 876 in making an access in the WLAN infrastructure mode to typically servers 12 each rendering a service by making use of at least a partial function of an application program used for carrying out a communication with another apparatus in the WLAN infrastructure mode as a result of determination as to whether a user registered as a communicatable user is an online or offline user.

By referring to FIGS. 44 to 51, the following description explains a concrete array of icons displayed in the contact-icon display area 864.

The usable-application extraction unit 878 is a section for extracting applications each usable for exchanging information with an apparatus owned by a user represented by a selected icon on the basis of:

a signal received by the operation-input acquisition unit 871 as the signal representing an operation input entered by the user to the input module 150;

information received by the registered-user information acquisition unit 874 as information on registered users;

information received by the broadcasted-information acquisition unit 875 as information broadcasted in the WLAN ad-hoc mode; and a determination result produced by the online/offline determination unit 876 in making an access in the WLAN infrastructure mode to typically servers 12 each rendering a service by making use of at least a partial function of an application program used for carrying out a communication with another apparatus in the WLAN infrastructure mode as a result of determination as to whether a user registered as a communicatable user is an online or offline user.

Figure 42:
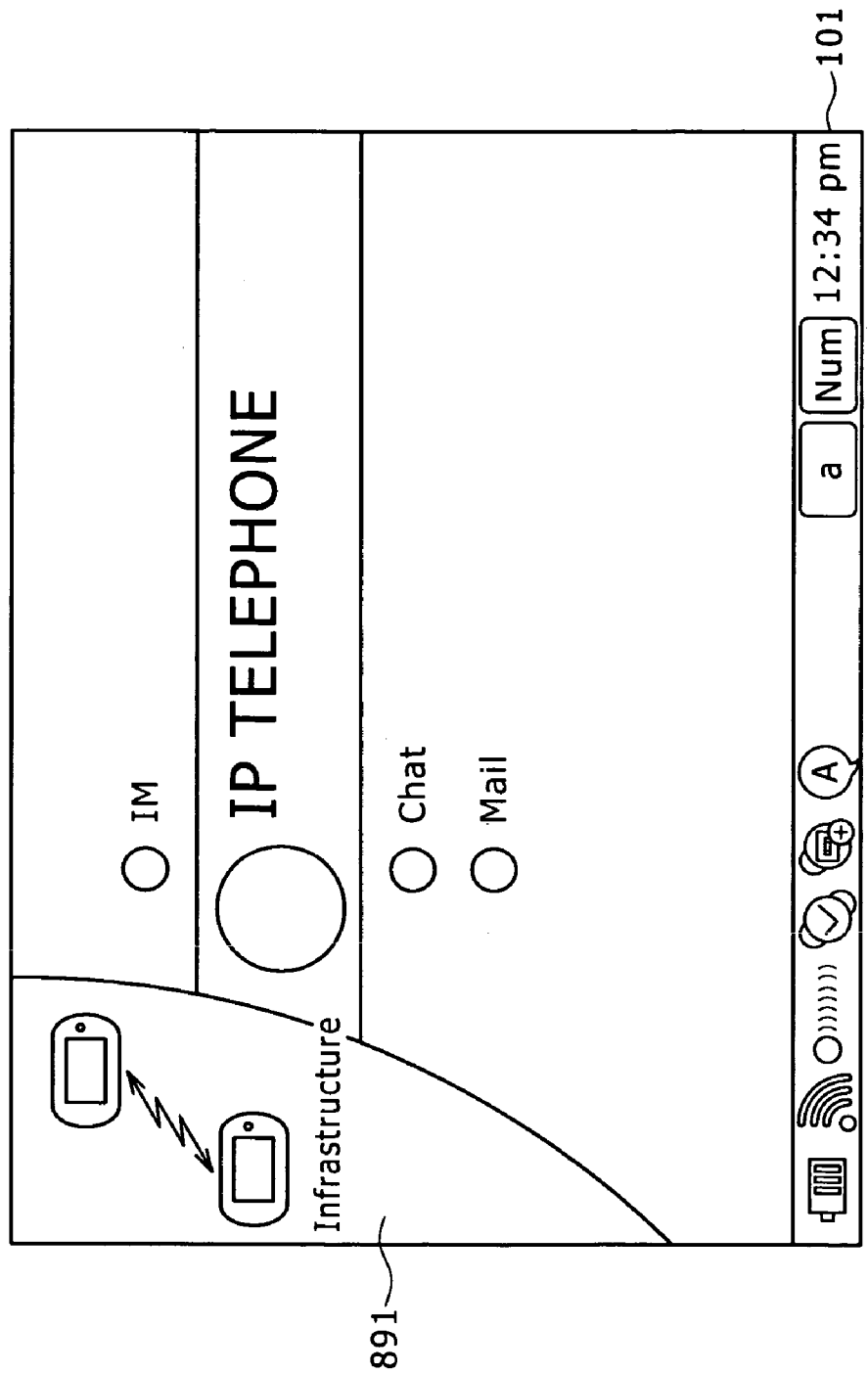
FIG. 42 is an explanatory diagram showing a usable-application list display screen.
Figure 43:
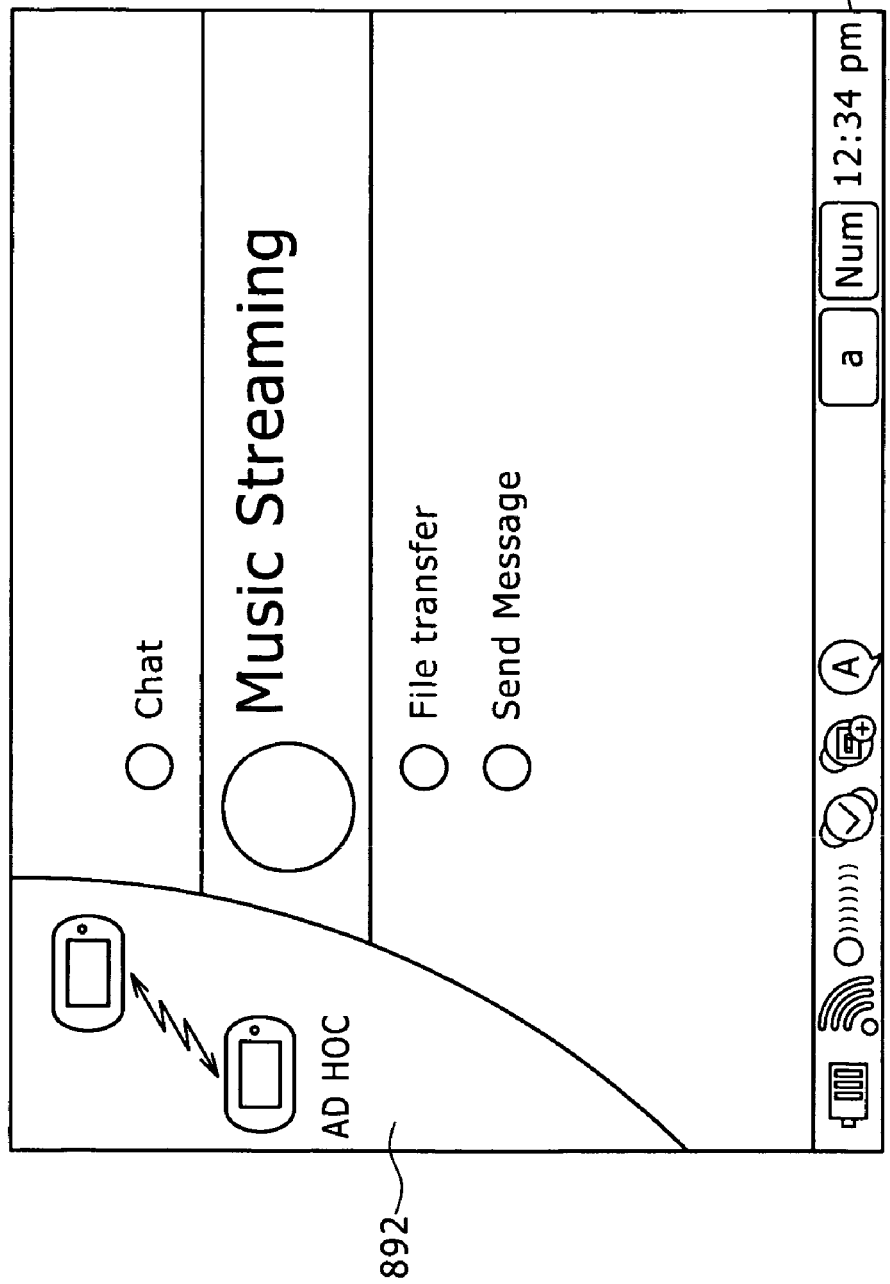
FIG. 43 is an explanatory diagram showing a usable-application list display screen.

By referring to FIGS. 42 and 43, the following description explains typical display screens each showing a list of applications each usable for exchanging information with an apparatus owned by a user represented by a selected icon.

The display information acquisition unit 879 is a section for controlling a device driver through the OS in order to control a process to acquire information required for generating display image data of a screen to be displayed on the display unit 21 from any of the components including the flash memory 146, the memory 147 and the audio processor 132.

The display-image generation unit 880 is a section for generating display image data to be displayed on the display unit 21 and displaying the screen on the display unit 21 by controlling the display module 142, that is, controlling a device driver through the OS. The display-image generation unit 880 generates display image data on the basis of pieces of information listed below and, if necessary, by making use of the graphic library. The information used as a basis for generating the display image data includes:

the icon array determined by the icon-array determination unit 877 as an icon array displayed in the contact-icon display area 864;

the applications each extracted by the usable-application extraction unit 878 as an application usable for exchanging information with an apparatus owned by a user represented by a selected icon; and information acquired in a process controlled by the 879 as information required for generating display image data of a screen to be displayed on the display unit 21.

By referring to FIGS. 42 and 43, the following description explains typical methods to display a display screen showing a list of applications each extracted by the usable-application extraction unit 878 as an application usable for exchanging information with an apparatus owned by a user represented by a selected icon.

To put it concretely, let us assume for example that, with the WLAN infrastructure mode detected by the communication-state acquisition unit 872 as the communication mode, the operation-input acquisition unit 871 receives a signal representing an operation input entered by the user as an operation input to select an icon from those displayed in the contact-icon display area 864 explained earlier by referring to FIG. 40. In this case, the registered-user information acquisition unit 874 fetches information on another user represented by the selected icon from information stored in the large-capacity flash memory 154 for other users through the audio processor 132 and supplies the fetched information to the usable-application extraction unit 878.

Since the WLAN infrastructure mode has been detected by the communication-state acquisition unit 872 as the communication mode, the usable-application extraction unit 878 extracts applications each usable for exchanging information with another apparatus owned by another user represented by a selected icon in a communication carried out in the WLAN infrastructure mode on the basis of the fetched information on the other users, and supplies information on the applications to the display-image generation unit 880. On the basis of information supplied to the display-image generation unit 880, the display-image generation unit 880 generates display image data to be displayed on the display unit 21 and displays the screen on the display unit 21 by controlling the display module 142 through the OS. The screen shows a list of applications each usable for exchanging information with another apparatus such as another information communication terminal 1 owned by the other user or the personal computer 13.

To put it concretely, let us assume for example that user A represented by the selected icon is a registered user capable of communicating by making use of an application for communicating by use of a communication carried out in the WLAN infrastructure mode and the email address of user A has been registered. Examples of the application for communicating by use of a communication carried out in the WLAN infrastructure mode are the instant messenger and the communication application such as the chatting application and the IP-phone application. In this case, a usable-application list screen 891 like one shown in FIG. 42 is displayed. In addition, let us also assume for example that user B represented by the selected icon is not a registered user capable of communicating by making use of an application for communicating by use of a communication carried out in the WLAN infrastructure mode even though the email address of user B has been registered. As described above, examples of the application for communicating by use of a communication carried out in the WLAN infrastructure mode are the instant messenger and the communication application such as the chatting application and the IP-phone application. In this case, a usable-application list screen 891 showing only the email application as the communication application is displayed.

Then, if the user selects a desired application by confirmation among usable applications shown on the usable-application list screen 891, on the basis of a signal received from the input module 150 as a signal representing an operation input entered by the user, the application processor 131 activates the desired application specified by the user and, if necessary, starts an access to servers 12 that each provide a service.

Then, the online/offline determination unit 876 makes an access in the WLAN infrastructure mode to typically each of the servers 12 each rendering a service by making use of at least some functions of an application program used for carrying out a communication with another apparatus in the WLAN infrastructure mode in order to produce a result of determination as to whether a user registered as a communicatable user is an online or offline user all the time. In this way, it is possible to extract an application with a higher degree of precision as an application usable for exchanging information with a user represented by the selected icon.

To put it concretely, let us assume for example that user A represented by the selected icon is a registered user capable of communicating by making use of an application for communicating by use of a communication carried out in the WLAN infrastructure mode, the application in an online state without regard to whether the application is the instant messenger or the communication application and the email address of user A has been registered. As described above, examples of the application for communicating by use of a communication carried out in the WLAN infrastructure mode are the instant messenger and the communication application such as the chatting application and the IP-phone application. In this case, a usable-application list screen 891 like one shown in FIG. 42 is displayed. In addition, let us also assume for example that user B represented by the selected icon is not a registered user capable of communicating by making use of an application for communicating by use of a communication carried out in the WLAN infrastructure mode, or if user B is a registered user capable of communicating by making use of an application, user B is in an offline state even though the email address of user B has been registered. As described above, examples of the application for communicating by use of a communication carried out in the WLAN infrastructure mode are the instant messenger and the communication application such as the chatting application and the IP-phone application. In this case, a usable-application list screen 891 showing only the email application as the communication application is displayed.

Furthermore, let us assume for example that user C represented by the selected icon is a registered user capable of communicating by making use of an application for communicating by use of a communication carried out in the WLAN infrastructure mode. As described above, examples of the application for communicating by use of a communication carried out in the WLAN infrastructure mode are the instant messenger and the communication application such as the chatting application and the IP-phone application. The instant messenger is in an offline state while the communication application is in an online state. In this case, the usable-application list screen 891 shows selectable communication applications such as chatting and IP-phone functions as applications each capable of carrying out a communication. Thus, if the user owning the information communication terminal 1 desires to communicate with user C, the user may select the IP-phone function of the communication application, which perceives user C as a user presently in an online state in order to make an IP-phone call. By providing the configuration described above, the user is capable of selecting the most suitable communication method among a plurality of communication methods with ease in a process to establish a contact with a desired partner.

Let us assume for example that, with the WLAN ad-hoc mode detected by the communication-state acquisition unit 872 as the communication mode, the operation-input acquisition unit 871 receives a signal representing an operation input entered by the user as an operation input to select an icon from those displayed in the contact-icon display area 864 explained earlier by referring to FIG. 40. In this case, the registered-user information acquisition unit 874 fetches information on another user represented by the selected icon from information stored in the large-capacity flash memory 154 for other users through the audio processor 132 and supplies the fetched information to the usable-application extraction unit 878.

Since the WLAN ad-hoc mode has been detected by the communication-state acquisition unit 872 as the communication mode, the usable-application extraction unit 878 extracts applications each usable for exchanging information with another apparatus owned by another user represented by a selected icon in a communication carried out in the WLAN ad-hoc mode on the basis of the fetched information on the other users, and supplies information on the applications to the display-image generation unit 880. On the basis of information supplied to the display-image generation unit 880, the display-image generation unit 880 generates display image data of a screen to be displayed on the display unit 21 and displays the screen on the display unit 21 by controlling the display module 142 through the OS. The screen shows a list of applications each usable for exchanging information with another information communication terminal 1 owned by the other user.

To put it concretely, let us assume for example that user A represented by the selected icon is an already registered user capable of carrying out a streaming reproduction process and a file exchange process in the WLAN ad-hoc mode. In this case, a usable-application list screen 892 like one shown in FIG. 43 is displayed. In addition, let us also assume for example that user B represented by the selected icon is not a registered user. In this case, a usable-application list screen 892 showing only a Send Message application as a usable application is displayed by putting this application in a selectable state.

It is desirable to arrange icons each displayed in the contact-icon display area 864 as an icon representing a registered user in accordance with predetermined rules.

The layout of displayed icons each representing a registered user in both the WLAN infrastructure mode and the WLAN ad-hoc mode is determined on the basis of the connection states of apparatus owned by the registered users. The apparatus owned by the registered users can typically be any of other information communication terminals 1, personal computers 13, PDAs and portable phones as long as the apparatus have functions such as the instant-messenger function, the IP-phone function, the chat-service function and the email function.

By referring FIGS. 44 to 51, the following description explains typical layouts of icons shown in the contact-icon display area 864.

Figure 44:
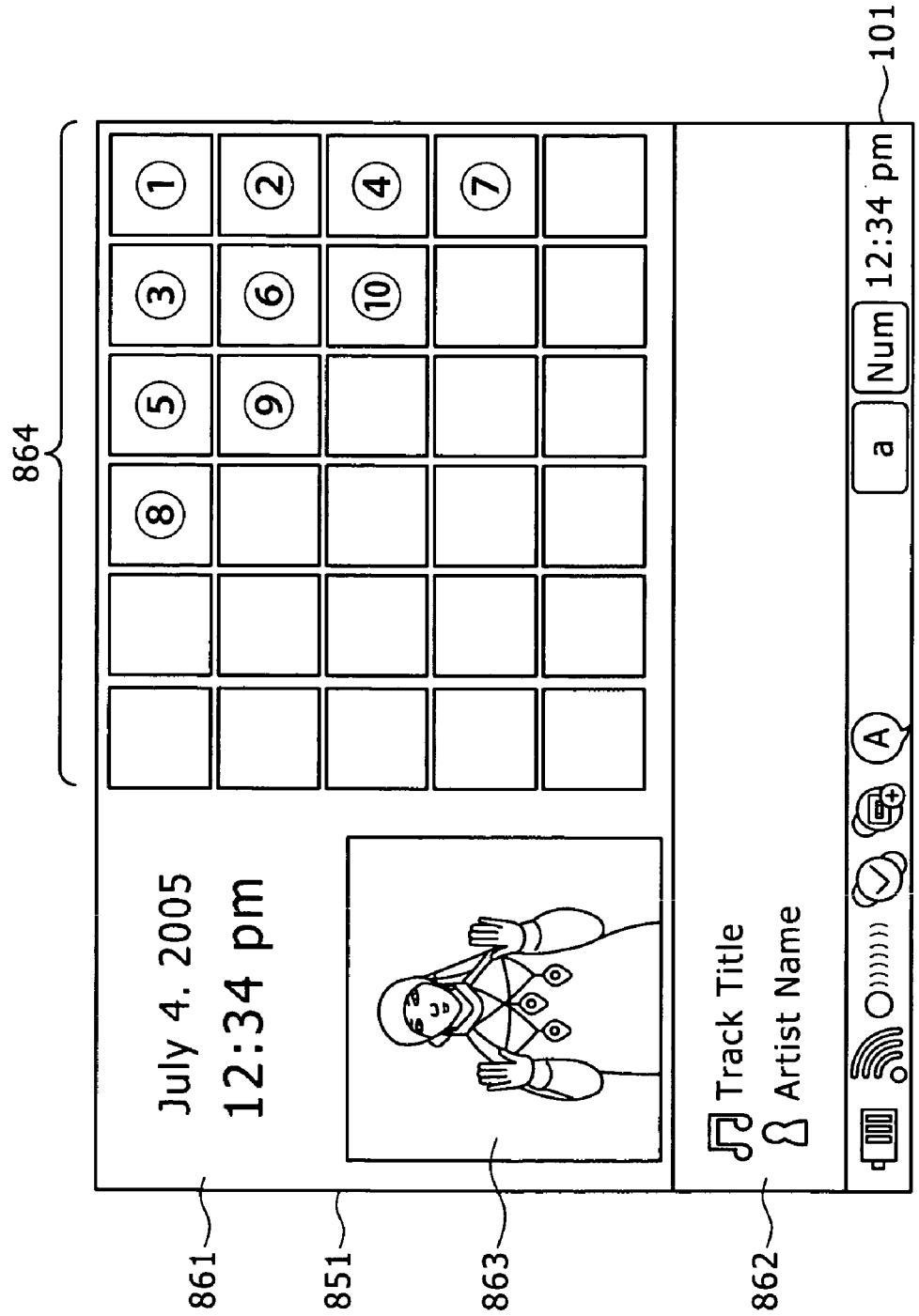
FIGS. 44 to 51 are explanatory diagrams each showing a standby screen.
Figure 45:
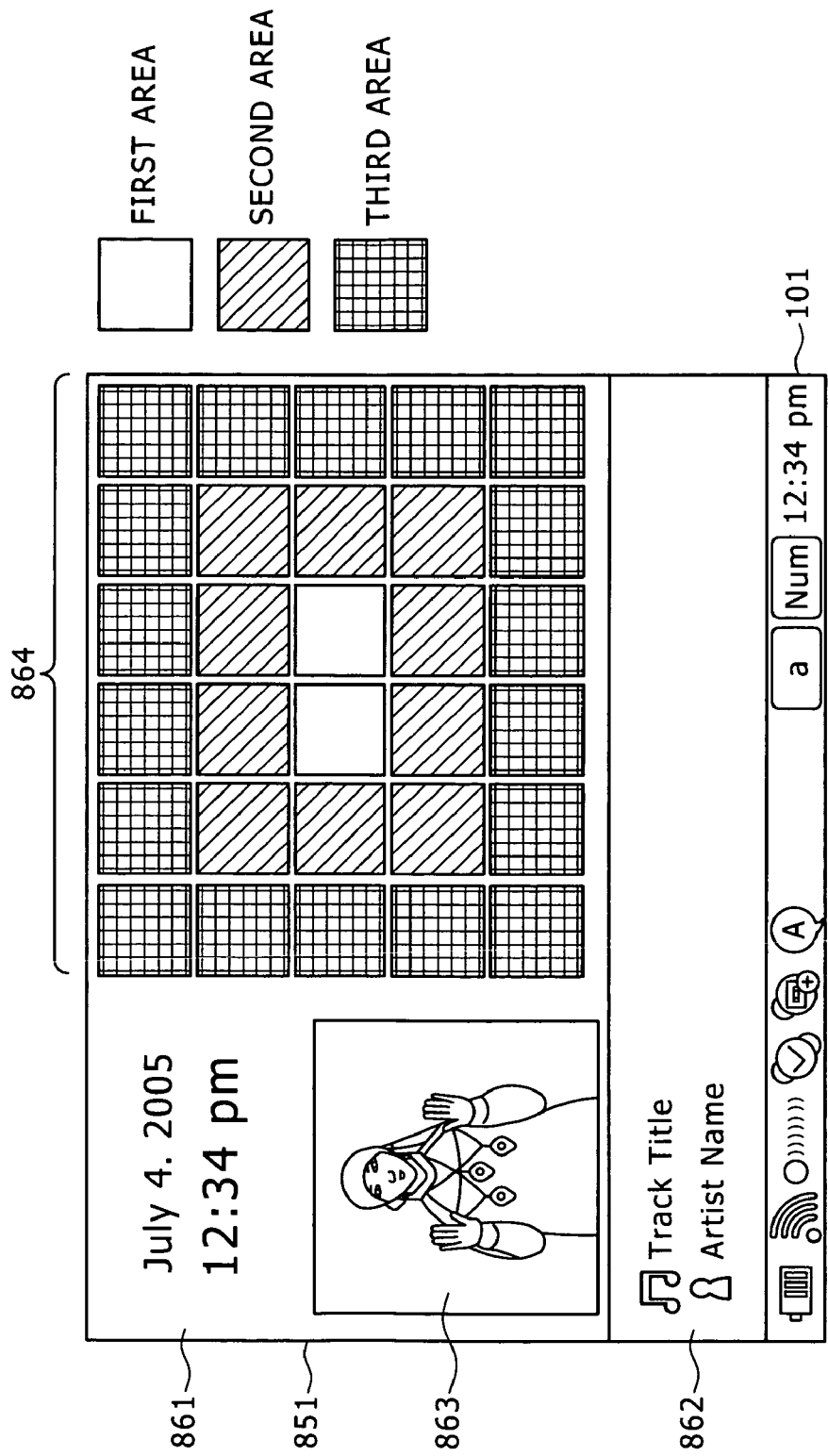
Figure 46:
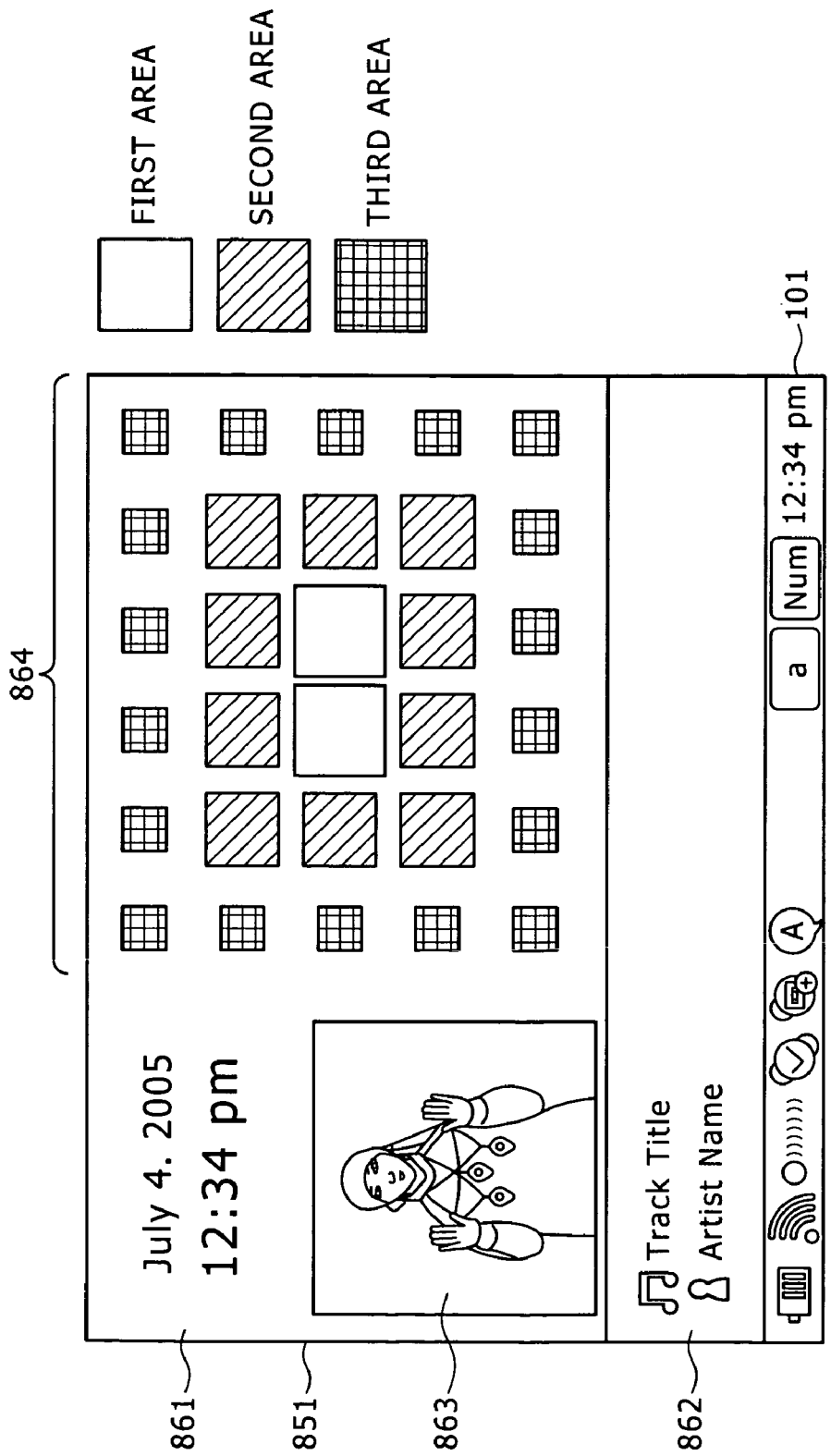

First of all, typical priority levels assigned to the layout of icons and typical methods to determine the layout are described by referring to FIGS. 44 to 46.

Assignment of levels of priority to the layout of icons is described by referring to FIG. 44.

Numbers each representing a level of priority are assigned to the contact-icon display area 864 shown in FIG. 44. As shown in the figure, the smallest number representing the highest level of priority is assigned to the position at the right upper corner of the layout. In the typical layout of icons, the smaller the number, the highest the priority level represented by the number. Numbers are assigned to positions on the top row of the layout of icons in such a way that, the shorter the distance from the position to the right upper corner, the smaller the number assigned to the position. By the same token, numbers are assigned to positions on the rightmost column of the layout of icons in such a way that, the shorter the distance from the position to the right upper corner, the smaller the number assigned to the position. Since each position in the layout of icons is allocated to an icon representing a registered user, a level of priority assigned to the position is also assigned to the user represented by the icon. The levels of priority are assigned to the positions in the layout of icons on the basis of states of connections of the apparatus owned by the registered users.

For example, it is possible to provide a configuration in which a registered user presently in an online state defined as a state of existence in a range of implementable communications has the highest level of priority, a registered user presently in an offline state defined as a state of nonexistence in the range has a priority level next to the highest level of priority and an unregistered user presently in the online state has the lowest level of priority. An unregistered user presently in the online state is referred to as an online unregistered user. Since a plurality of applications can be used in communications carried out in the WLAN infrastructure mode, it is also possible to provide a configuration in which the level of priority is set on the basis of users registered for each or the applications or on the basis of a result of determination as to whether or not each registered user in every application is an online user. It is to be noted that the user may also be allowed to set levels of priority with a high degree of freedom.

As explained earlier by referring to FIG. 44, the smallest number representing the highest level of priority is assigned to the position at the right upper corner of the layout of icons, numbers are assigned to positions on the top row of the layout in such a way that, the shorter the distance from the position to the right upper corner, the smaller the number assigned to the position, and numbers are assigned to positions on the rightmost column of the layout in such a way that, the shorter the distance from the position to the right upper corner, the smaller the number assigned to the position. However, numbers representing levels of priority do not have to be assigned to positions in the layout of icons in this way. For example, numbers representing high levels of priority can be assigned to upper rows or middle rows. In addition, a number representing a level of priority can be assigned to each position allocated to an icon as described above by referring to FIG. 44 or assigned to an area allocated to a plurality of icons. In the latter case, for example, the contact-icon display area 864 is divided into areas consisting of an area of the first level of priority, an area of the second level of priority, --- and an area of the Xth level of priority, which are enumerated here in an order of decreasing levels of priority, that is, in the enumeration order of the areas, the first level of priority is the highest level of priority while the Xth level of priority is the lowest level of priority. Then, icons representing users are placed in the areas on the basis of the connection states of apparatus owned by the users. In addition, it is also possible to provide a configuration in which the order of priority levels assigned to the areas is set with a high degree of freedom by the user owning the information communication terminal 1.

By referring to FIG. 45, the following description explains a typical layout of icons for a case in which areas allocated to a plurality of icons have been set.

The contact-icon display area 864 shown in FIG. 45 is divided into three areas, i.e., first, second and third areas. Levels of priority are assigned to the areas so that the first area at the center of the contact-icon display area 864 is an area having high levels of priority while the third area on the periphery of the contact-icon display area 864 is an area having low levels of priority. The second area with middle levels of priority is the area between the first and third areas. Then, icons representing registered users are placed in the areas by assigning the levels of priority to the users on the basis of the connection states of apparatus owned by the users for both the WLAN infrastructure mode and the WLAN ad-hoc mode. As a result, the icons representing registered users are arranged in the displayed contact-icon display area 864. It is desirable to use different background colors and/or different colors for the edges of each icon so as to make it easy for the user owning the information communication terminal 1 to distinguish the three areas, i.e., first, second and third areas, from each other.

For example, icons each representing a registered user presently in an online state defined as a state of existence in a range of implementable communications are placed in the first area having the high levels of priority. Icons each representing a registered user presently in an offline state defined as a state of nonexistence in the range of implementable communications are placed in the second area having priority levels next to the high levels of priority. Icons each representing an unregistered user presently in an online state are placed in the third area having low levels of priority. Such a user is referred to as an online unregistered user. With icons placed in the first to third areas as described above, the user owning the information communication terminal 1 is capable of recognizing the communication state of each of users each represented by one of the icons by merely referring to the positions of the icons.

In addition, it is possible to provide a configuration wherein, in a process to display icons each representing a user in accordance with a predetermined order of priority levels, the size of each of the icons to be displayed is set in accordance with the priority level assigned to the icon.

By referring to FIG. 46, the following description explains a typical layout of icons for a case in which the size of each of the icons to be displayed is set in accordance with the priority level assigned to the icon.

The contact-icon display area 864 shown in FIG. 46 is divided into three areas, i.e., first, second and third areas. Levels of priority are assigned to the areas so that the first area at the center of the contact-icon display area 864 is an area having the high levels of priority while the third area on the periphery of the contact-icon display area 864 is an area having low levels of priority. The second area with middle levels of priority is the area between the first and third areas. In addition, icons are displayed in the contact-icon display area 864 by setting the size of each icon so that icons placed in the first area each have a largest size, icons placed in the third area each have a smallest size and icons placed in the second area each have a middle size. With icons placed in the first to third areas as described above, the user owning the information communication terminal 1 is capable of recognizing the communication state of each of users represented by the icons more intuitively by merely referring to the positions of the icons.

By referring to FIGS. 47 to 51, the following description explains a typical concrete case in which the layout of icons is determined in accordance with the communication modes of apparatus owned by users each represented by one of the icons.

First of all, a first typical layout of icons in the WLAN ad-hoc mode is explained by referring to FIG. 47 as follows.

Figure 47:
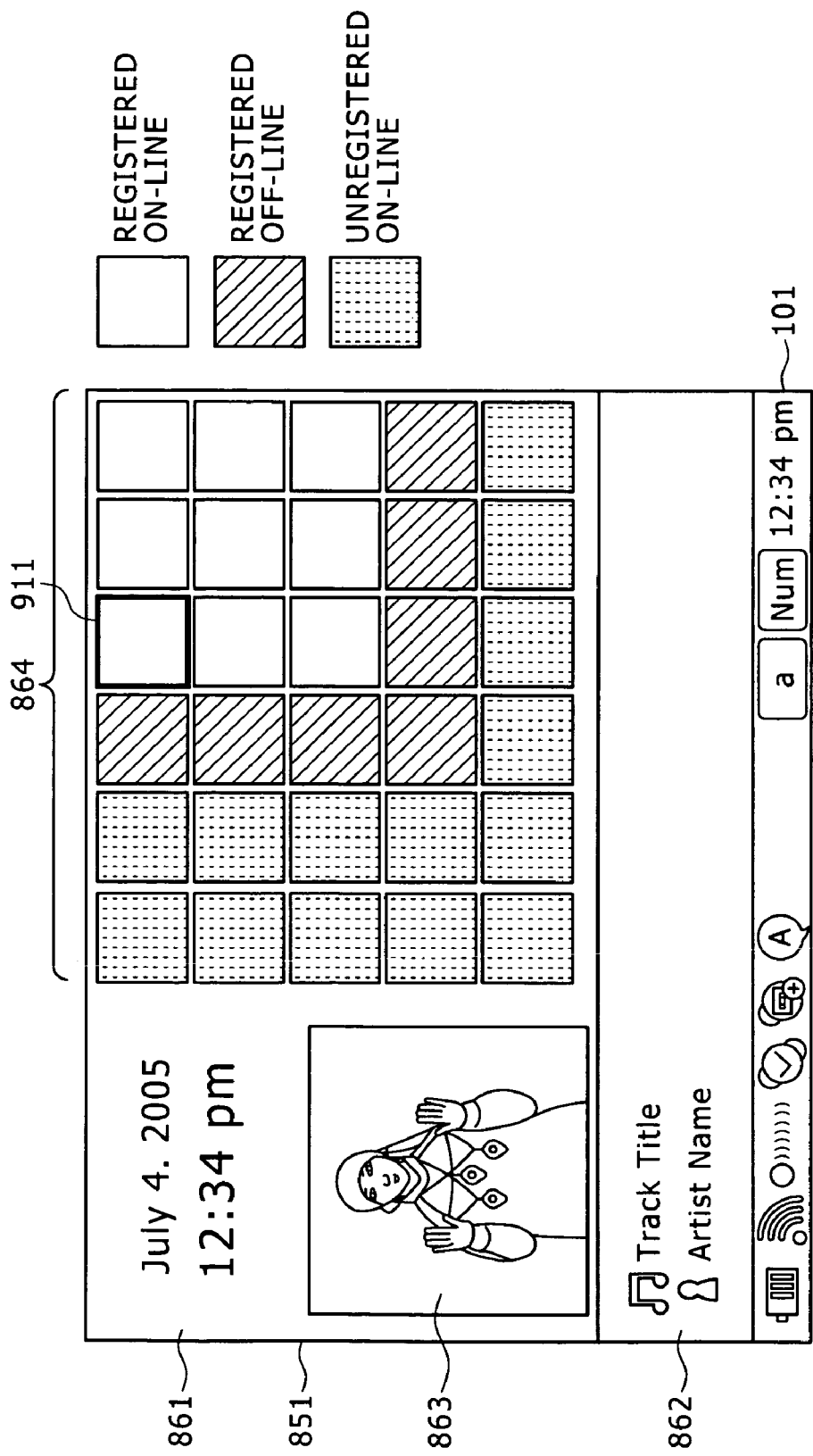

The contact-icon display area 864 shown in FIG. 47 is divided into three areas, i.e. first, second and third areas, which are laid out in an order of decreasing levels of priority in directions from the upper right corner of the contact-icon display area 864 to the left and to the bottom of the contact-icon display area 864. That is to say, the shorter the distance from the position to the upper right corner, the higher the priority level assigned to the icon placed at the position. To be more specific, the white first area closest to the upper right corner is an area allocated to icons with high levels of priority. The hatched second area enclosing the first area is an area allocated to icons with middle levels of priority and the dotted third area enclosing the second area is an area allocated to icons with low levels of priority. In the WLAN ad-hoc mode, icons each representing a registered user presently in an online state defined as a state of existence in a range of implementable communications are placed in the first area having the high levels of priority. Icons each representing a registered user presently in an offline state defined as a state of nonexistence in the range of implementable communications are placed in the second area having priority levels next to the high levels of priority. Icons each representing an unregistered user presently in an online state are placed in the third area having low levels of priority. Such a user is referred to as an online unregistered user.

With icons placed in the first to third areas as described above, the user owning the information communication terminal 1 is capable of recognizing the communication state of each of users represented by the icons by merely referring to the positions of the icons.

Next, a second typical layout of icons in the WLAN ad-hoc mode is explained by referring to FIG. 48 as follows.

Figure 48:
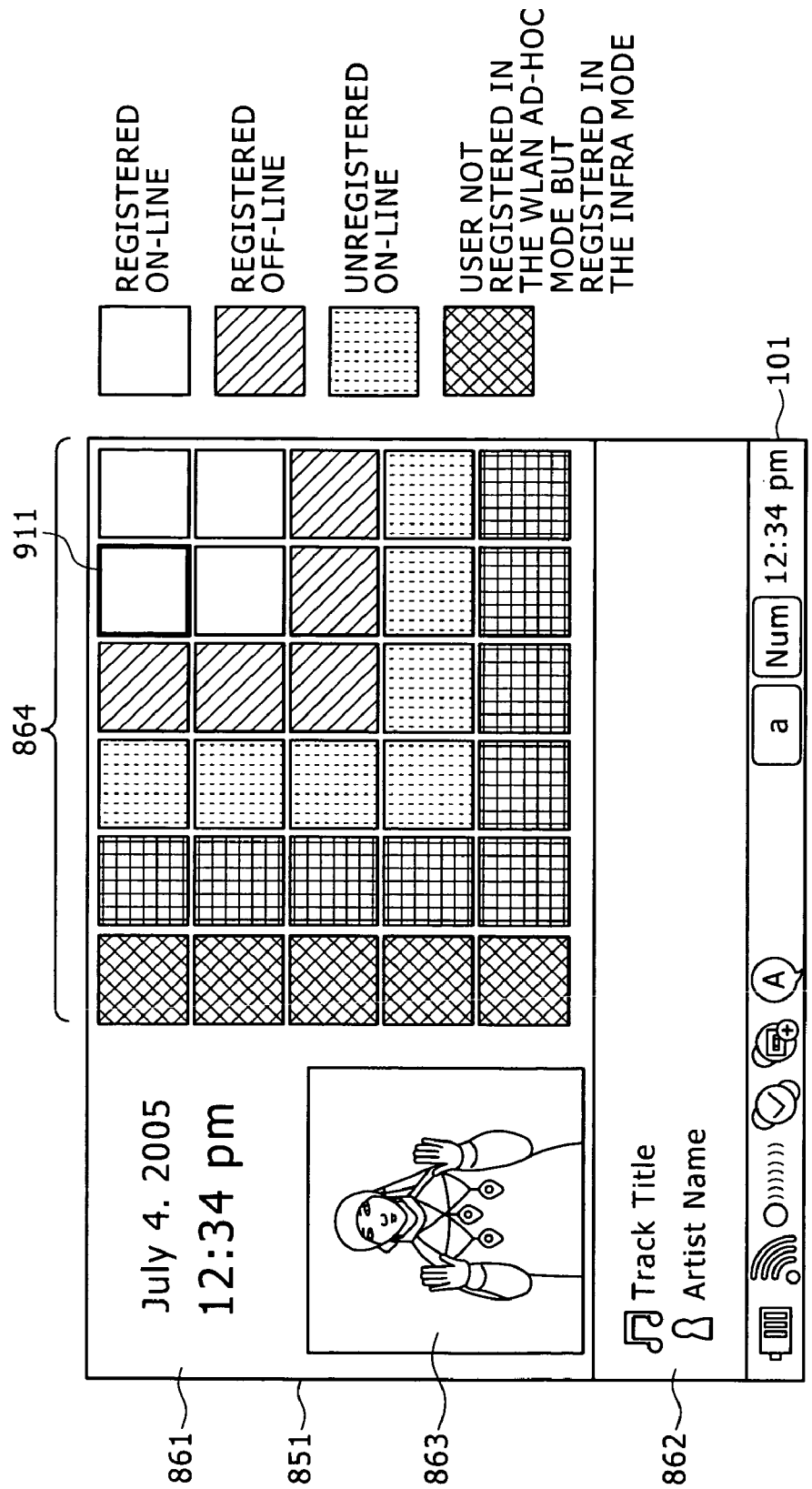

The contact-icon display area 864 shown in FIG. 48 is similar to that shown in FIG. 47 except that the contact-icon display area 864 shown in FIG. 48 has an additional fourth area. To put it in detail, much like contact-icon display area 864 shown in FIG. 47, the contact-icon display area 864 shown in FIG. 48 includes three areas, i.e. first, second and third areas, which are laid out in an order of decreasing levels of priority in directions from the upper right corner of the contact-icon display area 864 to the left and to the bottom of the contact-icon display area 864. That is to say, the shorter the distance from the position to the upper right corner, the higher the priority level assigned to the icon placed at the position. To be more specific, the white first area closest to the upper right corner is an area allocated to icons with high levels of priority. The hatched second area enclosing the first area is an area allocated to icons with middle levels of priority and the dotted third area enclosing the second area is an area allocated to icons with low levels of priority. In the WLAN ad-hoc mode, icons each representing a registered user presently in an online state defined as a state of existence in a range of implementable communications are placed in the first area having the high levels of priority. Icons each representing a registered user presently in an offline state defined as a state of nonexistence in the range of implementable communications are placed in the second area having priority levels next to the high levels of priority. Icons each representing an unregistered user presently in an online state are placed in the third area having low levels of priority. Such a user is referred to as an online unregistered user. In addition, as described above, the contact-icon display area 864 also includes a cross-hatched fourth area enclosing the third area. Having priority levels even lower than the priority levels assigned to the third area, the fourth area is allocated to icons each representing a user not registered as a user in the WLAN ad-hoc mode but registered as a user in any of applications each capable of communicating in the WLAN infrastructure mode.

With icons placed in the first to fourth areas as described above, let us assume for example that the user owning the information communication terminal 1 wants to transfer a file to a destination apparatus owned by a friend but forgets the user status as to whether the friend is a user registered as a communication partner in the WLAN ad-hoc mode or the WLAN infrastructure mode. In this case, the user owning the information communication terminal 1 is capable of confirming that the friend is a user registered as a communication partner in the WLAN infrastructure mode by referring to the fourth area of the contact-icon display area 864. Thus, in order to transfer the file to the destination apparatus owned by the friend, it is necessary to switch the communication mode from the WLAN ad-hoc mode to the WLAN infrastructure mode.

In addition, it is also possible to provide a configuration in which the area provided in the contact-icon display area 864 for users each registered as a communication partner in the WLAN infrastructure mode is allocated to icons each having a priority level higher than the priority levels assigned to icons placed in the areas provided in the contact-icon display area 864 for users each registered as a communication partner in the WLAN ad-hoc mode. That is to say, in the configuration, which is shown in none of the figures, icons each representing a user registered as a communication partner in the WLAN ad-hoc mode is displayed in areas each having priority levels lower than priority levels assigned to users each registered as a communication partner in the WLAN infrastructure mode.

Also in this configuration, it is needless to say that the same effect as the layout explained above by referring to FIG. 48 can be obtained.

In the case of the examples described above, the area having the highest level of priority among areas allocated to icons is the area at the right upper corner of the contact-icon display area 864 and, levels of priority are assigned to the icons so that, the shorter the distance from the area to the corner, the higher the levels of priority assigned to icons located in the area. However, instead of assigning the highest level of priority to the area at the right upper corner of the contact-icon display area 864, the highest level of priority can be assigned to areas in the middle of the contact-icon display area 864 as shown in FIG. 45 and/or displays of each of the icons in an area having the highest level of priority can be enlarged as shown in FIG. 46.

Next, a first typical layout of icons each representing a user registered for the WLAN infrastructure mode is explained by referring to FIG. 49 as follows.

The information communication terminal 1 is configured to allow a plurality of applications to be executed to carry out communication processes in the WLAN infrastructure mode. In order to implement this feature, for example, icons each representing a user registered in one of the applications are displayed in the contact-icon display area 864 by in a state allowing the icons to be distinguished from each other with ease as described before.

In addition, in the case of a configuration for monitoring the state of each user in order to produce a result of determination as to whether or not the user is in an online state by activating some functions of each of a plurality of applications each used for carrying out a communication in the WLAN infrastructure mode, it is nice to have a feature of not only distinguishing icons each representing a registered user from each other for each of the applications, but also determining a layout of the icons on the basis of a result of distinguishing users in an online state from those not in an online state.

In this case, when the user owning the information communication terminal 1 wants to have a contact with a friend, the user thinks of which method is to be adopted as a method for establishing the contact with the friend. Thus, for the user owning the information communication terminal 1, the recognition of whether or not the user is in an online state is more important than the recognition of the type of the application.

Figure 49:
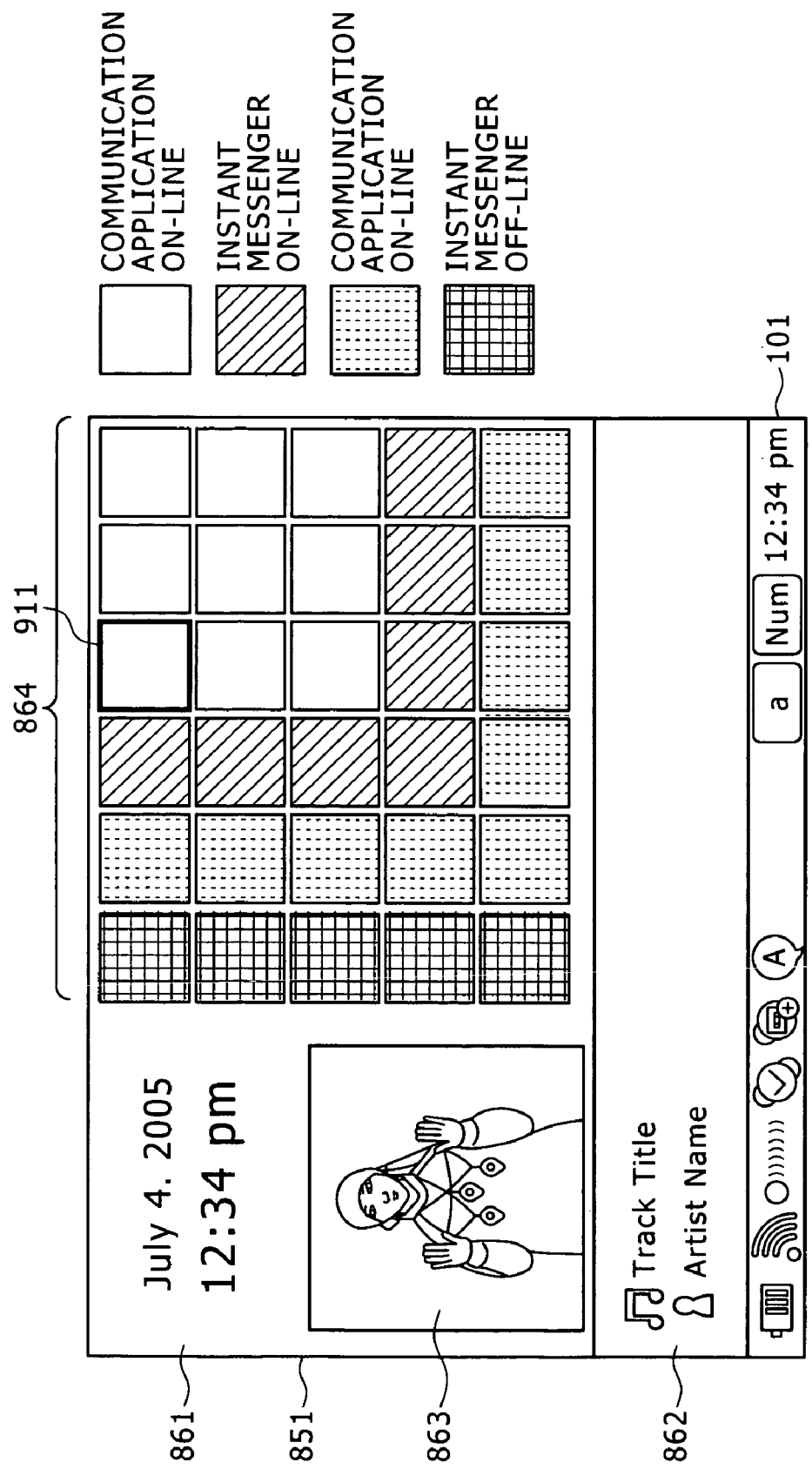

Therefore, in an icon layout shown in FIG. 49 as the first typical layout of icons in the WLAN infrastructure mode, the contact-icon display area 864 is divided into four areas, i.e., first to fourth areas, which are laid out in an order of decreasing levels of priority in directions from the upper right corner of the contact-icon display area 864 to the left and to the bottom of the contact-icon display area 864, and levels of priority are assigned to icons so that, the shorter the distance from an area to the fight upper corner, the higher the levels of priority assigned to the icons located in the area. To be more specific, the white first area closest to the upper right corner is an area allocated to icons with high levels of priority. The hatched second area enclosing the first area is an area allocated to icons with middle levels of priority and the dotted third area enclosing the second area is an area allocated to icons with low levels of priority. Icons each representing a registered user presently put in an online state, which is defined as a state of existence in a range of implementable communications, as a registered user of the communication application are placed in the first area having the high levels of priority. Icons each representing a registered user also presently put in an online state as a registered user of the instant messenger are placed in the second area having priority levels next to the high levels of priority. Icons each representing a registered user presently put in an offline state, which is defined as a state of nonexistence in the range of implementable communications, as a registered user of the communication application are placed in the third area having low levels of priority. As described above, the contact-icon display area 864 also includes a cross-hatched fourth area enclosing the third area. Having priority levels even lower than the priority levels assigned to the third area, the fourth area is allocated to icons each representing a user also presently in an online state as a user of the instant messenger.

By having the contact-icon display area 864 configured as described above, a plurality of applications can be executed in the same communication mode and, even for a case in which a registered user serving as a communication partner has a plurality of communication states, the user owning the information communication terminal 1 is capable of recognizing the communication state of each registered user by merely referring to the layout of the icons.

In accordance with the description given above, the information communication terminal 1 is configured to be capable of executing two applications each used for carrying out a communication in the WLAN infrastructure mode. Even if the information communication terminal 1 is configured to be capable of executing three or more applications each used for carrying out a communication in the WLAN infrastructure mode, however, it is needless to say that levels of priority are assigned to icons and a layout of the icons is determined in the same way on the basis of results of distinguishing users in an online state from those not in an online state for each of the applications.

In addition, in these areas allocated to icons, levels of priority are assigned to icons so that, the shorter the distance from an area to the fight upper corner, the higher the levels of priority assigned to the icons located in the area as described above. However, the highest level of priority can be assigned to areas in the middle of the contact-icon display area 864 as shown in FIG. 45 and/or displays of each of the icons in an area having the highest level of priority can be enlarged as shown in FIG. 46.

Figure 50:
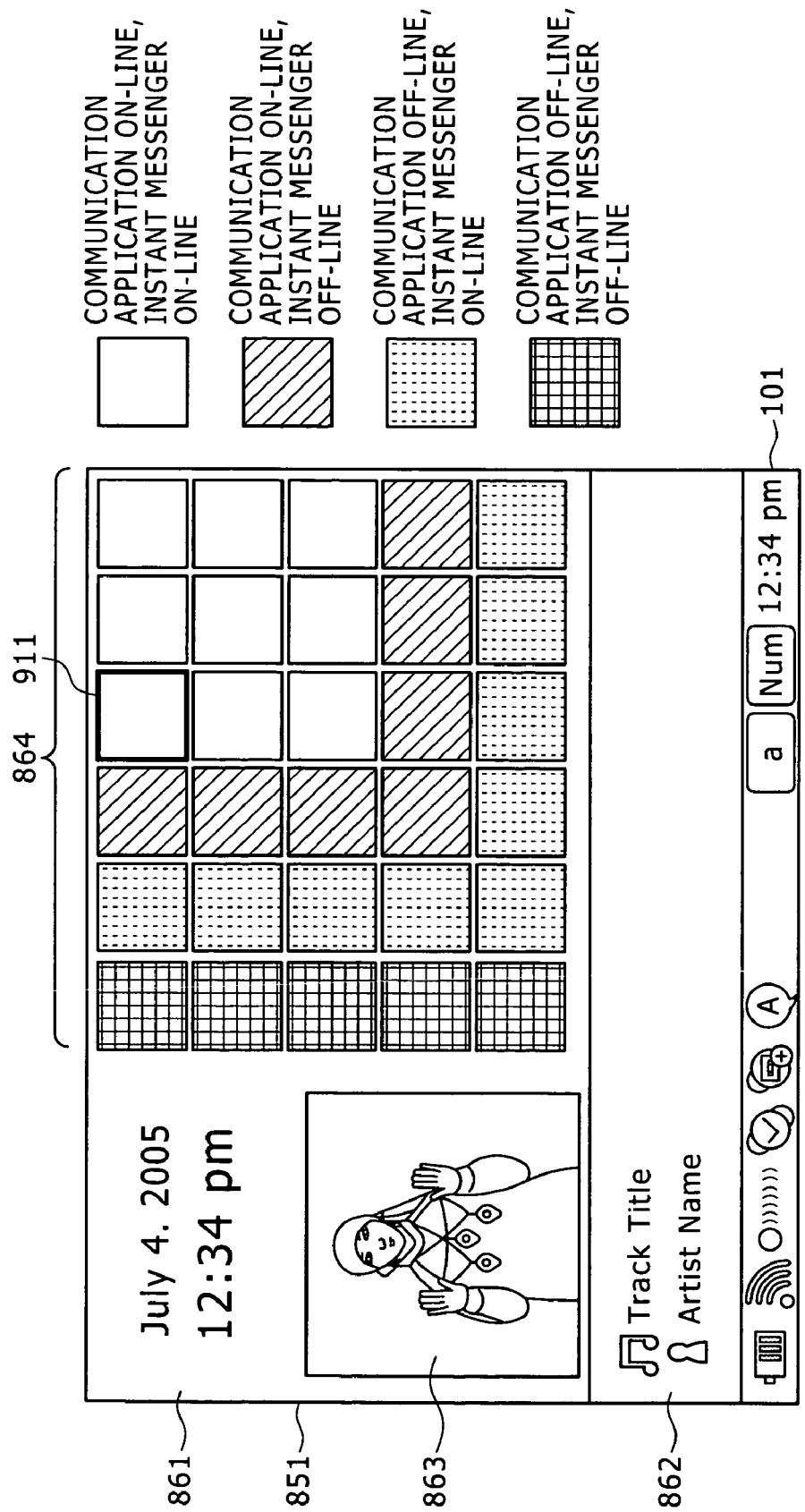

Next, a second typical layout of icons each representing a user registered for the WLAN infrastructure mode is explained by referring to FIG. 50 as follows.

In accordance with the description given above, the information communication terminal 1 is configured to be capable of executing a plurality of applications each used for carrying out a communication in the WLAN infrastructure mode. In addition, when the user owning the information communication terminal 1 wants to have a contact with a friend, the user thinks of which method is to be adopted as a method for establishing the contact with the friend. Thus, for the user owning the information communication terminal 1, the recognition of whether or not the user is in an online state is more important than the recognition of the type of the application.

It is thus desirable to determine such a layout of icons that an area for high levels of priority can be used for accommodating icons representing registered users in an online state defined as a state of allowing the users to communicate with others by execution of as many applications as possible.

Let us assume for example that two applications, i.e., the instant messenger and the communication application, can each be executed to carry out a communication in the WLAN infrastructure mode. In this case, as shown in the second typical icon layout of FIG. 50, the contact-icon display area 864 is divided into four areas, i.e., first to fourth areas, which are laid out in an order of decreasing levels of priority in directions from the upper right corner of the contact-icon display area 864 to the left and to the bottom of the contact-icon display area 864, and levels of priority are assigned to icons so that, the shorter the distance from an area to the right upper corner, the higher the levels of priority assigned to the icons located in the area. To be more specific, the white first area closest to the upper right corner is an area allocated to icons with high levels of priority. The hatched second area enclosing the first area is an area allocated to icons with middle levels of priority and the dotted third area enclosing the second area is an area allocated to icons with low levels of priority. Icons each representing a registered user presently put in an online state, which is defined as a state of existence in a range of implementable communications, as a registered user of the communication application and the instant messenger are placed in the first area having the high levels of priority. Icons each representing a registered user also presently put in an online state as a registered user of the communication application only are placed in the second area having priority levels next to the high levels of priority. Icons each representing a registered user presently put in an online state as a registered user of the instant messenger only are placed in the third area having low levels of priority. As described above, the contact-icon display area 864 also includes a cross-hatched fourth area enclosing the third area. Having priority levels even lower than the priority levels assigned to the third area, the fourth area is allocated to icons each representing an unregistered user or a user presently put in an offline state defined as a state of nonexistence in the range of implementable communications without regard to whether the application is the communication application or the instant messenger.

By having the contact-icon display area 864 configured as described above, a plurality of applications can be executed in the same communication mode and, even for a case in which a registered user serving as a communication partner has a plurality of communication states, by merely referring to the layout of the icons, the user owning the information communication terminal 1 is capable of recognizing a the communication state of each registered user as a communication state, in which a communication with the registered user is easy to carry out, or in other words, the user owning the information communication terminal 1 is capable of recognizing a registered user having a number of executable applications with ease.

In accordance with the above description, the information communication terminal 1 is configured to be capable of executing two applications each used for carrying out a communication in the WLAN infrastructure mode. Even if the information communication terminal 1 is configured to be capable of executing three or more applications each used for carrying out a communication in the WLAN infrastructure mode, however, it is needless to say that the layout of icons is so determined that levels of priority are assigned to icons, which each represent a user in an online state allowing the user to communicate by making use of as many applications as possible, in the same way.

In addition, in these areas allocated to icons, levels of priority are assigned to icons so that, the shorter the distance from an area to the right upper corner, the higher the levels of priority assigned to the icons located in the area as described above. However, the highest level of priority can be assigned to areas in the middle of the contact-icon display area 864 as shown in FIG. 45 and/or displays of each of the icons in an area having the highest level of priority can be enlarged as shown in FIG. 46.

In accordance with the above description, basically, with the standby screen 851 displayed, the adopted communication mode is either the WLAN infrastructure mode or the WLAN ad-hoc mode and the layout of icons each representing a user in the contact-icon display area 864 is determined in accordance with the states of communications with apparatus owned by registered users presently put in a communication mode, which can be either the WLAN infrastructure mode or the WLAN ad-hoc mode.

It is thus possible to provide a configuration in which, with the standby screen 851 displayed, the communication mode is switched from the WLAN infrastructure mode to the WLAN ad-hoc mode and vice versa at predetermined intervals, and the states of communications with apparatus owned by registered users are detected. Then, on the basis of results of the detection, the layout of icons each representing a user in the contact-icon display area 864 is determined.

Figure 51:
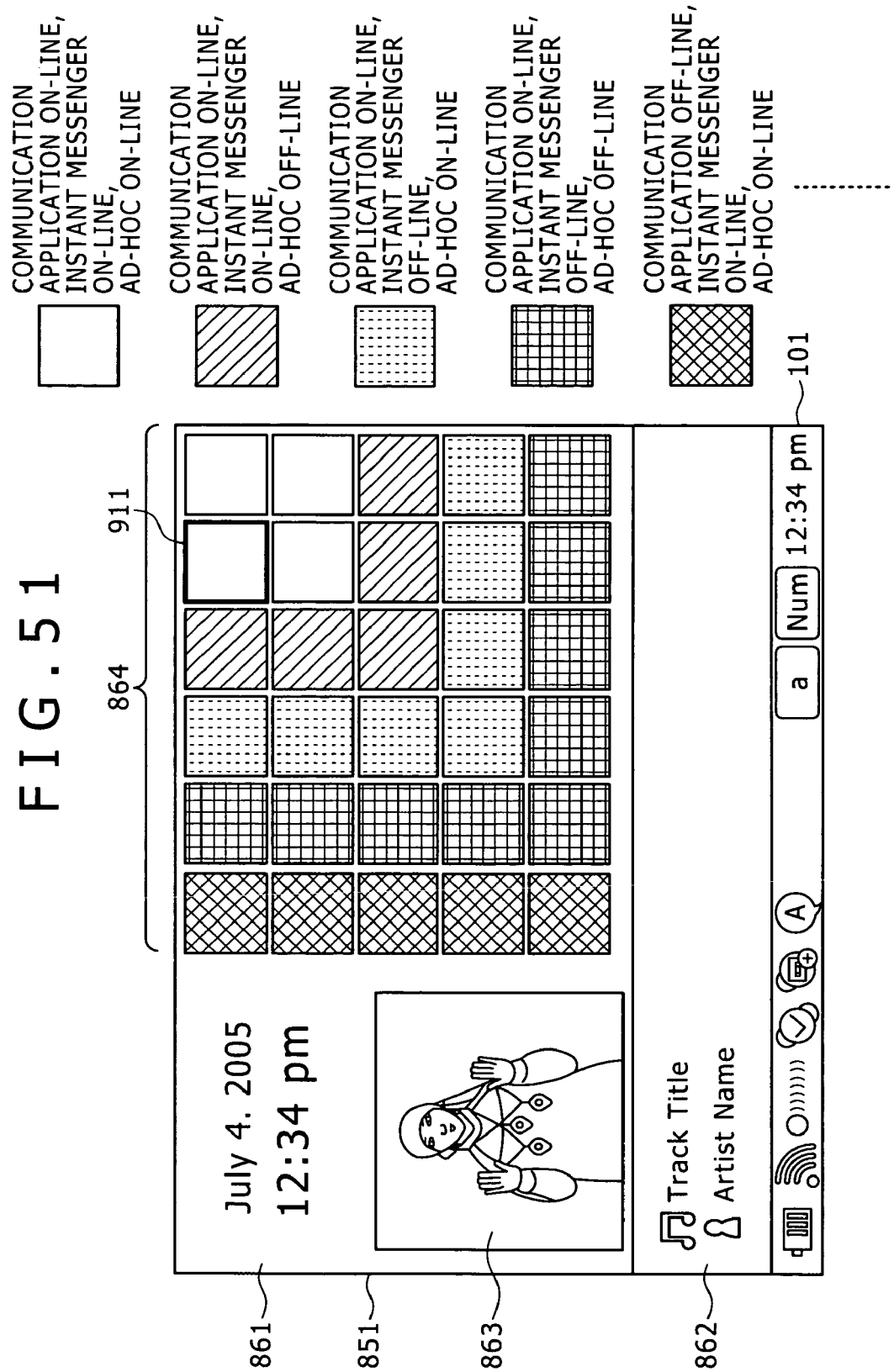

By referring to FIG. 51, the following description explains a typical layout of icons each representing a user in the contact-icon display area 864 for a case in which, with the standby screen 851 displayed, the communication mode is switched from the WLAN infrastructure mode to the WLAN ad-hoc mode and vice versa at predetermined intervals, the states of communications with apparatus owned by registered users each to serve as a communication partner are detected and, on the basis of results of the detection, the layout of icons each representing one of the registered users is determined.

The contact-icon display area 864 shown in FIG. 51 is divided into α areas, i.e., first, second, ---- and αth areas, where α is an integer at least equal to 1. The α areas are laid out in an order of decreasing levels of priority in directions from the upper right corner of the contact-icon display area 864 to the left and to the bottom of the contact-icon display area 864, and levels of priority are assigned to icons so that, the shorter the distance from an area to the right upper corner, the higher the levels of priority assigned to the icons located in the area. The area count α is properly determined in accordance with the number of possible communication states in the WLAN infrastructure mode and the WLAN ad-hoc mode.

In the case of the contact-icon display area 864 shown in the figure, let us assume for example that high levels of priority are assigned to a case in which the communication application of a user to serve as a communication partner is in an online state. With the communication application put in an online state, there are four possible cases, i.e.:

a first case in which the instant messenger is put in an online state and a user registered as a communication partner in the WLAN ad-hoc mode to serve as a communication partner is put an online state defined as a state of existence in the range of implementable communications;

a second case in which the instant messenger is put in an online state and a user registered as a communication partner in the WLAN ad-hoc mode to serve as a communication partner is put an offline state defined as a state of nonexistence in the range of implementable communications;

a third case in which the instant messenger is put in an offline state and a user registered as a communication partner in the WLAN ad-hoc mode to serve as a communication partner is put an online state; and a fourth case in which the instant messenger is put in an offline state and a user registered as a communication partner in the WLAN ad-hoc mode to serve as a communication partner is put an offline state.

Highest levels of priority are assigned to icons placed in the first area corresponding to the first case. Second priority levels second to the aforementioned highest levels of priority are assigned to icons placed in the second area corresponding to the second case. Third priority levels lower than the aforementioned second levels of priority are assigned to icons placed in the third area corresponding to the third case. Fourth priority levels lower than the aforementioned third levels of priority are assigned to icons placed in the fourth area corresponding to the fourth case.

The fifth area corresponds to a case in which the communication application is in an offline state, the instant messenger is put in an online state and a user registered as a communication partner in the WLAN ad-hoc mode is also put an online state. Fifth priority levels even lower than the aforementioned fourth levels of priority are assigned to icons placed in the fifth area.

With the communication application put in an offline state, by the same token, there are further conceivable combinations of the state of the instant messenger and the status of a user registered as a communication partner in the WLAN ad-hoc mode. For example, with the communication application put in an offline state, there is the αth case in which the instant messenger is put in an offline state and the user is not a user registered as a communication partner in the WLAN ad-hoc mode. Lowest priority levels are assigned to icons placed in the αth area corresponding to the αth case, which is not shown in the figure.

As described above, the layout of icons is determined in accordance with the combination of the state of the communication application, the state of the instant messenger and the status of the user.

It is to be noted that, if at least one of the communication application and the instant messenger, which have been installed in the apparatus owned by a user serving as the communication partner, is put in an online state whereas the user registered as a communication partner in the WLAN ad-hoc mode is also in an online state defined as a state of existence in the range of implementable communications, the apparatus owned by the communication partner is put in a state allowing the communication mode of the apparatus to be switched from the WLAN ad-hoc mode to the WLAN infrastructure mode and vice versa at predetermined intervals to determine the communication state of a registered user in both the communication modes.

The priority-level determination method shown in FIG. 51 as a method to determine a level of priority in accordance with the combination of the communication state of the communication application, the communication state of the instant messenger and the communication state of the user registered as a communication partner in the WLAN ad-hoc mode does not have to be implemented as explained in the description of the method. In the case of a user frequently making use of the instant messenger, for example, levels of priority may be so determined in accordance with the combination of the communication states that a high level of priority is assigned to an icon representing a user (to serve as a communication partner) with the instant messenger thereof put in an online state. In the case of a user frequently making use of the WLAN ad-hoc mode rather than the WLAN infrastructure mode, on the other hand, levels of priority may be so determined in accordance with the combination of the communication states that a high level of priority is assigned to an icon representing a user registered as a communication partner in the WLAN ad-hoc mode to serve as a communication partner with the communication state thereof put in an online state.

It is to be noted that the methods described above as a method to determine a level of priority for each icon and a method to display each icon in the contact-icon display area 864 may be properly set and/or changed. The result of a process to implement the set and/or modified methods is stored in a memory and, if necessary, read out from the memory in accordance with control executed by the display setting storage control unit 873 explained earlier by referring to FIG. 41.

Next, standby-screen display processing is explained by referring to flowcharts shown in FIGS. 52 to 55 as follows.

At the first step S1 of the flowchart shown in FIG. 52, on the basis of a signal received from the operation-input acquisition unit 871 as a signal representing an operation input entered by the user, the display-image generation unit 880 and the communication-state acquisition unit 872 produce a result of determination as to whether or not a command to display a standby screen has been received. If the determination result produced at the step S1 indicates that a command to display a standby screen has not been received, the process of the step S1 is repeated. As a matter of fact, the process of the step S1 is carried out repeatedly until the determination result produced at the step S1 indicates that a command to display a standby screen has been received.

As the determination result produced at the step S1 indicates that a command to display a standby screen has been received, the flow of the processing goes on to a step S2 at which the communication-state acquisition unit 872 recognizes the present communication state in order to produce a result of determination as to whether or not the WLAN has been put in an on state. The communication-state acquisition unit 872 then supplies the result of the determination to the icon-array determination unit 877.

If the determination result produced at the step S2 indicates that the WLAN has not been put in an on state, the flow of the processing goes on to a step S3 at which the icon-array determination unit 877 notifies the display-image generation unit 880 that the WLAN is in an off state. Then, the display-image generation unit 880 then controls the display module 142 to display a standby screen for a case in which the WLAN is in an off state. As a result, the display unit 21 displays a standby screen for a case in which the WLAN is in an off state.

Then, at the next step S4, the communication-state acquisition unit 872 recognizes the present communication state of the information communication terminal 1 in order to produce a result of determination as to whether or not the WLAN has been put in an on state. If the determination result produced at the step S4 indicates that the WLAN has been put in an on state, the flow of the processing goes on to a step S6.

If the determination result produced at the step S4 indicates that the WLAN has not been put in an on state, on the other hand, the flow of the processing goes on to a step S5 at which, on the basis of a signal received from the operation-input acquisition unit 871 as a signal representing an operation input entered by the user, the display-image generation unit 880 produces a result of determination as to whether or not a command to display a screen other than a standby screen has been received as evidenced by, for example, the fact that the home button 23 has been pressed to display the home screen 451 or the fact that the back button 24 has been pressed to display a screen displayed immediately before.

If the determination result produced at the step S5 indicates that a command to display a screen other than a standby screen has been received, the flow of the processing goes on to a step S43 to be described later. If the determination result produced at the step S5 indicates that a command to display a screen other than a standby screen has not been received, on the other hand, the flow of the processing goes back to the step S4 at which the processes of the step S4 and the subsequent steps are repeated.

If the determination result produced at the step S2 indicates that the WLAN has been put in an on state or if the determination result produced at the step S4 indicates that the WLAN has been put in an on state, on the other hand, the flow of the processing goes on to the aforementioned step S6 at which the icon-array determination unit 877 reads out display setting information stored in a memory in accordance with control executed by the display setting storage control unit 873. The icon-array determination unit 877 then produces a result of determination as to whether or not the display setting information has been set to switch an icon to be displayed in accordance with the WLAN ad-hoc mode or the WLAN infrastructure mode.

If the determination result produced at the step S6 indicates that the display setting information has not been set to switch an icon to be displayed in accordance with the WLAN ad-hoc mode or the WLAN infrastructure mode, the flow of the processing goes on to a step S7 at which WLAN-communicatable user display processing is carried out, and then, the standby-screen display processing is ended. The WLAN-communicatable user display processing will be described later by referring to flowcharts shown in FIGS. 56 and 57.

If the determination result produced at the step S6 indicates that the display setting information has been set to switch an icon to be displayed in accordance with the WLAN ad-hoc mode or the WLAN infrastructure mode, on the other hand, the flow of the processing goes on to a step S8 at which the communication-state acquisition unit 872 recognizes the present communication state of the information communication terminal 1 in order to produce a result of determination as to whether the communication mode is the WLAN ad-hoc mode or the WLAN infrastructure mode. Then, the communication-state acquisition unit 872 supplies the result of the determination to the registered-user information acquisition unit 874 and the icon-array determination unit 877.

If the determination result produced at the step S8 indicates that the communication mode is the WLAN infrastructure mode instead of the WLAN ad-hoc mode, the flow of the processing goes on to a step S27 to be described later.

If the determination result produced at the step S8 indicates that the communication mode is the WLAN ad-hoc mode instead of the WLAN infrastructure mode, on the other hand, the flow of the processing goes on to a step S9 at which the registered-user information acquisition unit 874 carries out a read operation to extract information on users each registered as a communication partner capable of carrying out a mutual communication in the WLAN ad-hoc mode from the large-capacity flash memory 154 through the audio processor 132.

Then, the flow of the processing goes on to a step S10 at which the icon-array determination unit 877 reads out display setting information stored in a memory in accordance with control executed by the display setting storage control unit 873 and produces a result of determination as to whether or not the display setting information indicates that icons each representing a user registered as a communication partner capable of carrying out a mutual communication in the WLAN infrastructure mode are also to be displayed.

If the determination result produced at the step S10 indicates that the display setting information indicates that icons each representing a user registered as a communication partner capable of carrying out a mutual communication in the WLAN infrastructure mode are also to be displayed, the flow of the processing goes on to a step S11 at which the icon-array determination unit 877 drives the registered-user information acquisition unit 874 to carry out a read operation to extract information on users each registered as a communication partner capable of carrying out a mutual communication in the WLAN infrastructure mode from the large-capacity flash memory 154 through the audio processor 132. Then, the icon-array determination unit 877 determines a layout of icons for example in accordance with the technique explained before by referring to FIG. 48. To be more specific, the icon-array determination unit 877 determines that all users each indicated by the information extracted at the step S9 to be a user registered as a communication partner capable of carrying out a mutual communication in the WLAN ad-hoc mode are each an offline user and places the icon representing each of the offline users in the layout. In addition, the icon-array determination unit 877 places icons each representing a user registered as a communication partner in the WLAN infrastructure mode in an area having priority levels lower than the priority levels assigned to the icons each representing a user registered as a communication partner capable of carrying out a mutual communication in the WLAN ad-hoc mode. Then, the icon-array determination unit 877 notifies the display-image generation unit 880 of information on the resulting layout of icons. The display-image generation unit 880 then controls the display module 142 to generate display image data of a standby screen 851 explained earlier by referring to FIG. 48 and controls the display module 142 to display the standby screen 851 on the display unit 21.

If the determination result produced at the step S10 indicates that the display setting information indicates that icons each representing a user registered as a communication partner capable of carrying out a mutual communication in the WLAN infrastructure mode are not to be displayed, on the other hand, the flow of the processing goes on to a step S12 at which the icon-array determination unit 877 determines a layout of icons for example in accordance with the technique explained before by referring to FIG. 47. To be more specific, the icon-array determination unit 877 determines that all users each indicated by the information extracted at the step S9 to be a user registered as a communication partner capable of carrying out a mutual communication in the WLAN ad-hoc mode are each an offline user and places icons each representing one of the offline users in the layout. In the case of the layout of icons shown in FIG. 47, the icon-array determination unit 877 places icons each representing one of the offline users in the second area of the layout. Then, the icon-array determination unit 877 notifies the display-image generation unit 880 of information on the resulting layout of icons. The display-image generation unit 880 then controls the display module 142 to generate display image data of a standby screen 851 explained earlier by referring to FIG. 47 and controls the display module 142 to display the standby screen 851 on the display unit 21.

After the process carried out the step S11 or S12 is completed, the flow of the processing goes on to a step S13 of the flowchart shown in FIG. 53. At the step S13, the broadcasted-information acquisition unit 875 produces a result of determination as to whether or not broadcasted information has been received from another information communication terminal 1. If the determination result produced at the step S13 indicates that broadcasted information has not been received from another information communication terminal 1, the flow of the processing goes on to a step S17 to be described later.

If the determination result produced at the step S13 indicates that broadcasted information has been received from another information communication terminal 1, on the other hand, the flow of the processing goes on to a step S14 at which the broadcasted-information acquisition unit 875 produces a result of determination as to whether or not the sender of the broadcasted information is a registered user.

If the determination result produced at the step S14 indicates that the sender of the broadcasted information is a registered user, the flow of the processing goes on to a step S15 at which the broadcasted-information acquisition unit 875 supplies the result of the determination to the icon-array determination unit 877. The icon-array determination unit 877 then updates the entire layout of icons by handling the icon representing a user serving as the sender of the broadcasted information as an online icon, and notifies the display-image generation unit 880 of information on the updated layout of icons. The display-image generation unit 880 then controls the display module 142 to generate display image data of a standby screen 851 showing the updated layout of icons and controls the display module 142 to display the standby screen 851 on the display unit 21. To put it concretely, the icon-array determination unit 877, if necessary, updates the entire layout of icons to produce a new layout of icons by placing the icon representing a user serving as the sender of the broadcasted information at an icon position included in the registered-user information acquisition unit 874 as a position having a priority level higher than the priority levels assigned to icons each representing an offline user on the assumption that, for example, the contact-icon display area 864 includes icon positions at which existing icons have been placed in accordance with a rule based on priority levels assigned to the existing icons. In the case of the screen shown in FIG. 47, for example, the icon-array determination unit 877 moves the icon displayed in the second area of the contact-icon display area 864 as an icon representing the registered user to the first area and, if necessary, updates the entire layout of icons.

If the determination result produced at the step S14 indicates that the sender of the broadcasted information is an unregistered user instead of a registered user, on the other hand, the flow of the processing goes on to a step S16 at which the broadcasted-information acquisition unit 875 supplies the result of the determination and the information to the icon-array determination unit 877. On the basis of the broadcasted information, the icon-array determination unit 877 updates the entire layout of icons by adding the icon representing the sender of the broadcasted information to the layout of icons to produce a new layout of icons. Then, the icon-array determination unit 877 notifies the display-image generation unit 880 of information on the new layout of icons. The display-image generation unit 880 then controls the display module 142 to generate display image data of a standby screen 851 showing the updated layout of icons and controls the display module 142 to display the standby screen 851 on the display unit 21. To put it concretely, the icon-array determination unit 877 updates the entire layout of icons to produce a new layout of icons by placing the icon representing the unregistered user serving as the sender of the broadcasted information at an icon position included in the contact-icon display area 864 as a position having a priority level lower than the priority levels assigned to icons each representing an offline user on the assumption that, for example, the contact-icon display area 864 includes icon positions at which existing icons have been placed in accordance with a rule based on priority levels assigned to the existing icons. In the case of the screen shown in FIG. 47, for example, the icon-array determination unit 877 places the icon representing the unregistered user in the third area of the contact-icon display area 864 and, if necessary, updates the entire layout of icons.

As described earlier, if the determination result produced at the step S13 indicates that broadcasted information has not been received from another information communication terminal 1, the flow of the processing goes on to the aforementioned step S17. By the way, the flow of the processing also goes on to the step S17 after the process carried out at the step S15 or S16 is completed. At the step S17, the operation-input acquisition unit 871 produces a result of determination as to whether or not an icon has been selected by confirmation among those displayed in the contact-icon display area 864. If the determination result produced at the step S17 indicates that an icon has not been selected by confirmation among those displayed in the contact-icon display area 864, the flow of the processing goes on to a step S24 to be described later.

If the determination result produced at the step S17 indicates that an icon has been selected among those displayed in the contact-icon display area 864, on the other hand, the flow of the processing goes on to a step S18 at which the operation-input acquisition unit 871 notifies the display-image generation unit 880 of information indicating which icon has been selected by confirmation among those displayed in the contact-icon display area 864. In order to determine an application for changing what is shown on typically the usable-application list screen 892 explained earlier by referring to FIG. 43, the display-image generation unit 880 provides the usable-application extraction unit 878 with the information indicating which icon has been selected by confirmation among those displayed in the contact-icon display area 864. The usable-application extraction unit 878 then extracts applications each usable for carrying out a communication with the registered user represented by the icon selected by confirmation and supplies the result of the extraction of the application to the display-image generation unit 880. In this case, the usable-application extraction unit 878 selects the usable applications to be extracted on the basis of:

a WLAN ad-hoc mode detected by the communication-state acquisition unit 872 as the radio-communication state of the information communication terminal 1;

information received by the registered-user information acquisition unit 874 as information on registered users; and broadcasted information received by the broadcasted-information acquisition unit 875 as information on unregistered users.

Then, at the next step S19, the display-image generation unit 880 generates image data of typically a usable-application list screen 892 explained earlier by referring to FIG. 43 on the basis of information received from the usable-application extraction unit 878 as the result of the extraction of the applications each usable for carrying out a communication with the registered user represented by the icon selected by confirmation.

Subsequently, at the next step S20, the display-image generation unit 880 controls the display module 142 to display the usable-application list screen 892 explained earlier by referring to FIG. 43 on the basis of the image data generated at the step S19. As a result, the usable-application list screen 892 explained earlier by referring to FIG. 43 is displayed on the display unit 21.

Then, at the next step S21, the operation-input acquisition unit 871 produces a result of determination as to whether or not an application has been selected by confirmation among those shown on the usable-application list screen 892 displayed at the step S20.

If the determination result produced at the step S21 indicates that an application has been selected by confirmation among those shown on the usable-application list screen 892, the flow of the processing goes on to a step S22 at which the application processor 131 invokes the application manager to activate the application selected by confirmation and execute the application in order to finish the processing.

If the determination result produced at the step S21 indicates that an application has not been selected by confirmation among those shown on the usable-application list screen 892, on the other hand, the flow of the processing goes on to a step S23 at which the operation-input acquisition unit 871 produces a result of determination as to whether or not a command to display a standby screen has been received. If the determination result produced at the step S23 indicates that a command to display a standby screen has not been received, the flow of the processing goes back to the step S21 to repeat the processes of the step S21 and the subsequent steps.

If the determination result produced at the step S17 indicates that an icon has not been selected by confirmation among those displayed in the contact-icon display area 864, the flow of the processing goes on to the aforementioned step S24 as described earlier or, if the determination result produced at the step S23 indicates that a command to display a standby screen has been received, on the other hand, the flow of the processing also goes on to the aforementioned step S24 at which the operation-input acquisition unit 871 produces a result of determination as to whether or not a command to switch the communication mode to the WLAN infrastructure mode has been received. If the determination result produced at the step S24 indicates that a command to switch the communication mode to the WLAN infrastructure mode has been received, the flow of the processing goes on to a step S27 to be described later.

If the determination result produced at the step S24 indicates that a command to switch the communication mode to the WLAN infrastructure mode has not been received, on the other hand, the flow of the processing goes on to a step S25 at which the operation-input acquisition unit 871 produces a result of determination as to whether or not a command to put the WLAN in an off state has been received. If the determination result produced at the step S25 indicates that a command to put the WLAN in an off state has been received, the flow of the processing goes back to the aforementioned step S3 to repeat the processes of the step S3 and the subsequent steps.

If the determination result produced at the step S25 indicates that a command to put the WLAN in an off state has not been received, on the other hand, the flow of the processing goes on to a step S26 at which, on the basis of a signal received from the operation-input acquisition unit 871 as a signal representing an operation input entered by the user, the display-image generation unit 880 produces a result of determination as to whether or not a command to display a screen other than a standby screen has been received as evidenced by, for example, the fact that the home button 23 has been pressed to display the home screen 451 or the fact that the back button 24 has been pressed to display a screen displayed immediately before.

If the determination result produced at the step S26 indicates that a command to display a screen other than a standby screen has been received, the flow of the processing goes on to the aforementioned step S43 to be described later. If the determination result produced at the step S26 indicates that a command to display a screen other than a standby screen has not been received, on the other hand, the flow of the processing goes back to the aforementioned step S17 at which the processes of the step S17 and the subsequent steps are repeated.

If the determination result produced at the step S8 indicates that the communication mode is the WLAN infrastructure mode instead of the WLAN ad-hoc mode, the flow of the processing goes on to the aforementioned step S27 of the flowchart shown in FIG. 54 as described before or, as explained earlier, if the determination result produced at the step S24 indicates that a command to switch the communication mode to the WLAN infrastructure mode has been received, the flow of the processing also goes on to the aforementioned step S27 at which the registered-user information acquisition unit 874 carries out a read operation to extract information on each user registered as a communication partner in an application making use of the WLAN infrastructure mode from the large-capacity flash memory 154 through the audio processor 132 and supplies the information to the icon-array determination unit 877.

Then, at the next step S28, the icon-array determination unit 877 reads out display setting information stored in a memory in accordance with control executed by the display setting storage control unit 873 and produces a result of determination as to whether or not the display setting information suggests that the user registered as a communication partner in an application making use of the WLAN infrastructure mode be examined in advance in order to determine whether the user is an online or offline user. If the determination result produced at the step S28 indicates that the display setting information does not suggest that the user registered as a communication partner in an application making use of the WLAN infrastructure mode be examined in advance in order to determine whether the user is an online or offline user, the flow of the processing also goes on to a step S32.

If the determination result produced at the step S28 indicates that the display setting information suggests that the user registered as a communication partner in an application making use of the WLAN infrastructure mode be examined in advance in order to determine whether the user is an online or offline user, on the other hand, the flow of the processing also goes on to a step S29 at which the online/offline determination unit 876 activates at least some functions of the application making use of the WLAN infrastructure mode.

Then, at the next step S30, the application processor 131 carrying out at least some functions of the application making use of the WLAN infrastructure mode makes accesses to the servers 12 providing their respective services, starts a continuous user-state monitoring process to produce a result of determination as to whether the communicatable user is an online or offline user and supplies the result of the determination to the icon-array determination unit 877.

Subsequently, the flow of the processing goes on to a step S31 to carry out icon array processing to be described later by referring to flowcharts shown in FIGS. 58 and 59. Then, the flow of the processing goes on to a step S33 of the flowchart shown in FIG. 55.

As described earlier, if the determination result produced at the step S28 indicates that the display setting information does not suggest that the user registered as a communication partner in an application making use of the WLAN infrastructure mode be examined in advance in order to determine whether the user is an online or offline user, the flow of the processing also goes on to the aforementioned step S32 at which the icon-array determination unit 877 determines an array of icons each representing a user registered in an application as a communication partner, the information on which has been extracted at the step S27. Then, the icon-array determination unit 877 supplies information on the determined array of icons to the display-image generation unit 880. The display-image generation unit 880 then controls the display module 142 to generate display image data of a standby screen 851 showing the determined layout of icons and controls the display module 142 to display the standby screen 851 on the display unit 21.

When the process carried out at the step S31 or S32 is completed, the flow of the processing goes on to the aforementioned-step S33 at which the operation-input acquisition unit 871 produces a result of determination as to whether or not an icon has been selected by confirmation among those displayed in the contact-icon display area 864. If the determination result produced at the step S33 indicates that an icon has not been selected by confirmation among those displayed in the contact-icon display area 864, the flow of the processing goes on to a step S40.

If the determination result produced at the step S33 indicates that an icon has been selected by confirmation among those displayed in the contact-icon display area 864, on the other hand, the flow of the processing goes on to a step S34 at which the operation-input acquisition unit 871 supplies information indicating which icon has been selected by confirmation among those displayed in the contact-icon display area 864 to the display-image generation unit 880. In order to determine an application for changing what is shown on typically the usable-application list screen 891 explained earlier by referring to FIG. 42, the display-image generation unit 880 provides the usable-application extraction unit 878 with the information indicating which icon has been selected by confirmation among those displayed in the contact-icon display area 896. The usable-application extraction unit 878 then extracts applications each usable for carrying out a communication with the registered user represented by the icon selected by confirmation and supplies the result of the extraction of the application to the display-image generation unit 880. In this case, the usable-application extraction unit 878 selects the usable applications to be extracted on the basis of a WLAN infrastructure mode acquired by the communication-state acquisition unit 872 as the current radio-communication state of the information communication terminal 1 and information received by the registered-user information acquisition unit 874 as information on registered users.

Then, at the next step S35, the display-image generation unit 880 generates image data of typically a usable-application list screen 891 explained earlier by referring to FIG. 42 on the basis of information received from the usable-application extraction unit 878 as the result of the extraction of the applications each usable for carrying out a communication with the registered user represented by the icon selected by confirmation.

Subsequently, at the next step S36, the display-image generation unit 880 controls the display module 142 to display the usable-application list screen 891 explained earlier by referring to FIG. 42 on the basis of the image data generated at the step S35. As a result, the usable-application list screen 891 explained earlier by referring to FIG. 42 is displayed on the display unit 21.

Then, at the next step S37, the operation-input acquisition unit 871 produces a result of determination as to whether or not any application has been selected among those shown on the usable-application list screen 891 displayed at the step S36.

If the determination result produced at the step S37 indicates that an application has been selected by confirmation among those shown on the usable-application list screen 891, the flow of the processing goes on to a step S38 at which the application processor 131 invokes the application manager to activate the application selected by confirmation and execute the application in order to finish the processing.

If the determination result produced at the step S37 indicates that any application has not been selected by confirmation among those shown on the usable-application list screen 891, on the other hand, the flow of the processing goes on to a step S39 at which the operation-input acquisition unit 871 produces a result of determination as to whether or not a command to display a standby screen has been received. If the determination result produced at the step S39 indicates that a command to display a standby screen has not been received, the flow of the processing goes back to the step S37 to repeat the processes of the step S37 and the subsequent steps.

If the determination result produced at the step S33 indicates that any icon has not been selected by confirmation among those displayed in the contact-icon display area 864, the flow of the processing goes on to the aforementioned step S40 as described earlier or, if the determination result produced at the step S39 indicates that a command to display a standby screen has been received, on the other hand, the flow of the processing also goes on to the aforementioned step S40 at which the operation-input acquisition unit 871 produces a result of determination as to whether or not a command to switch the communication mode to the WLAN ad-hoc mode has been received. If the determination result produced at the step S40 indicates that a command to switch the communication mode to the WLAN ad-hoc mode has been received, the flow of the processing goes back to the aforementioned step S9 to carry out the process of the step S9 and the subsequent steps.

If the determination result produced at the step S40 indicates that a command to switch the communication mode to the WLAN ad-hoc mode has not been received, on the other hand, the flow of the processing goes on to a step S41 at which the operation-input acquisition unit 871 produces a result of determination as to whether or not a command to put the WLAN in an off state has been received. If the determination result produced at the step S41 indicates that a command to put the WLAN in an off state has been received, the flow of the processing goes back to the aforementioned step S3 to repeat the processes of the step S3 and the subsequent steps.

If the determination result produced at the step S41 indicates that a command to put the WLAN in an off state has not been received, on the other hand, the flow of the processing goes on to a step S42 at which, on the basis of a signal received from the operation-input acquisition unit 871 as a signal representing an operation input entered by the user, the display-image generation unit 880 produces a result of determination as to whether or not a command to display a screen other than a standby screen has been received as evidenced by, for example, the fact that the home button 23 has been pressed to display the home screen 451 or the fact that the back button 24 has been pressed to display a screen displayed immediately before. If the determination result produced at the step S42 indicates that a command to display a screen other than a standby; screen has not been received, the flow of the processing goes back to the aforementioned step S28 at which the processes of the step S28 and the subsequent steps are repeated.

If the determination result produced at the step S5, S26 or S42 indicates that a command to display a screen other than a standby screen has been received, on the other hand, the flow of the processing goes on to the aforementioned step S43 at which the display-image generation unit 880 controls the display module 142 to change the display screen in accordance with an operation input received by the operation-input acquisition unit 87 as an operation input entered by the user. Then, the processing is ended.

As described above, the standby screen can be changed in accordance with setting established by the user and on the basis of whether the WLAN has been put in an on or off state. In addition, the array of icons displayed on the contact-icon display area 864 can be determined on the basis of whether the communication mode is the WLAN infrastructure mode or the WLAN ad-hoc mode if the WLAN has been put in an on state and on the basis of the communication states of users registered for the WLAN infrastructure mode and the WLAN ad-hoc mode. In addition, if an icon is selected by confirmation among those shown in the contact-icon display area 864, applications each usable for carrying out a communication with a user represented by the icon selected by confirmation can be extracted and the usable-application list screen 891 or 892 can be generated to be displayed.

By providing the configuration described above, the user owning the information communication terminal 1 is capable of determining a partner in a communication of information in accordance with a general intellectual order of searching for a friend to be contacted as a communication partner easy to contact and contacting the partner by thinking of a method for contacting the partner. In addition, the user owning the information communication terminal 1 is capable of easily selecting a method to exchange information with the apparatus owned by the partner in a communication of information.

Figure 56:
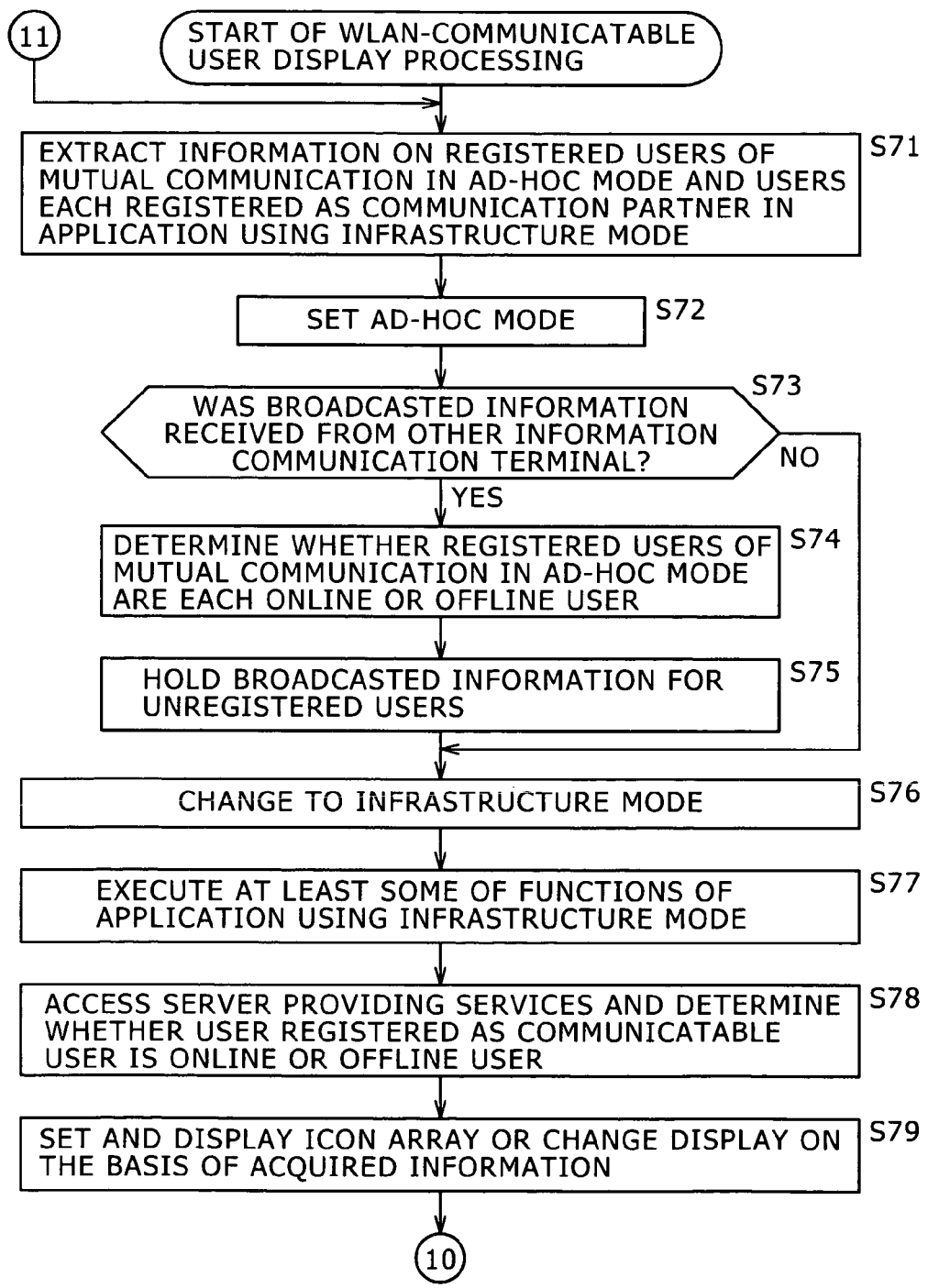
FIG. 56 shows a flowchart referred to in explanation of WLAN-communicatable user display processing.
Figure 57:
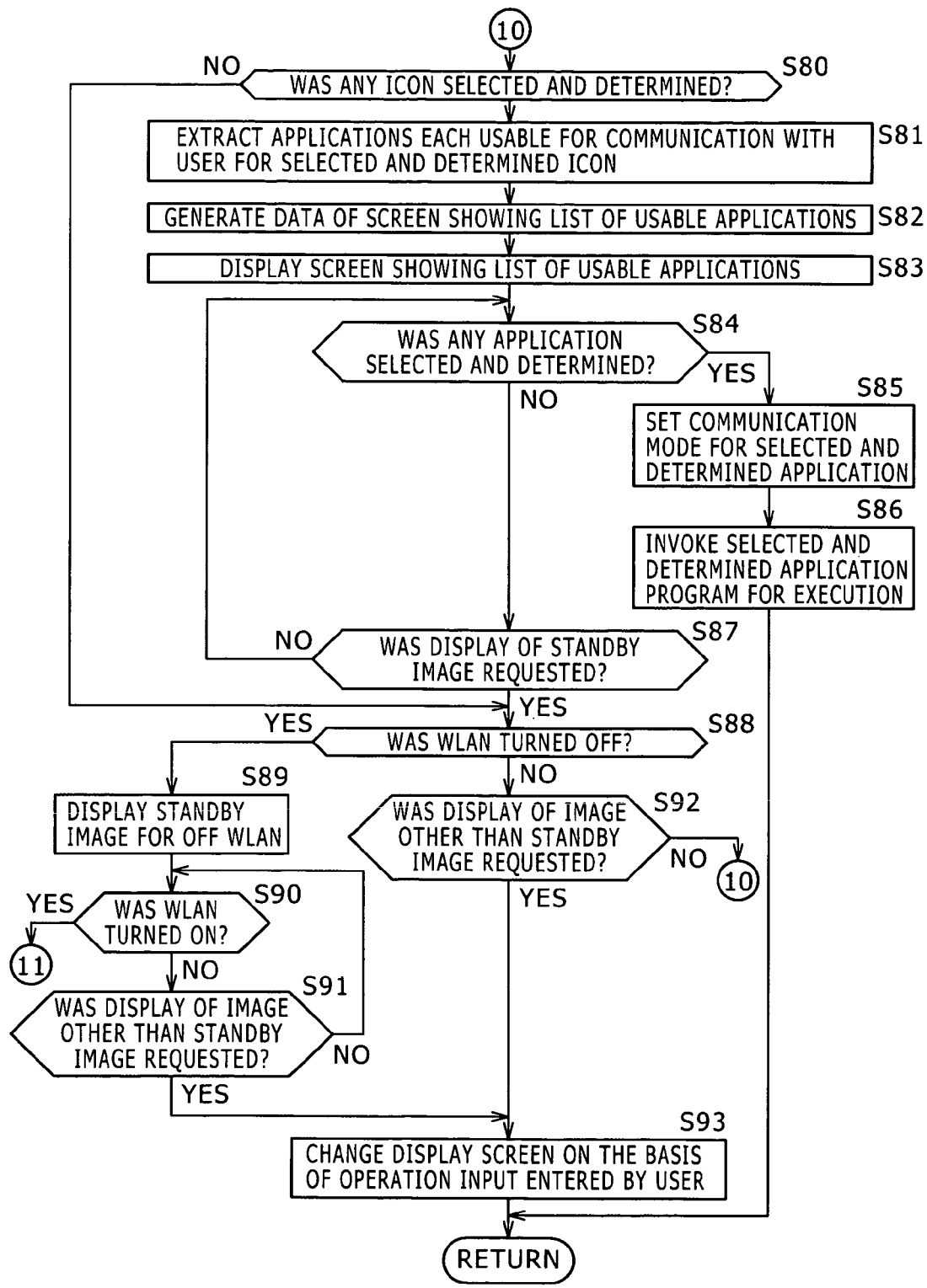
FIG. 57 shows a flowchart referred to in explanation of WLAN-communicatable user display processing.

By referring to the flowcharts shown in FIGS. 56 and 57, the following description explains the WLAN-communicatable user display processing carried out at the step S7 of the flowchart shown in FIG. 52.

The flowchart shown in FIG. 56 begins with a step S71 at which the registered-user information acquisition unit 874 carries out a read operation to extract information on users from the large-capacity flash memory 154 through the audio processor 132, and supplies the information to the icon-array determination unit 877. The users are mutually registered users each to serve as a partner in a communication carried out in the WLAN ad-hoc mode and users registered as a communication partner in an application making use of the WLAN infrastructure mode.

Then, at the next step S72, the online/offline determination unit 876 sets the WLAN ad-hoc mode as the communication mode automatically, that is, independently of an operation input entered by the user.

Subsequently, at the next step S72, the broadcasted-information acquisition unit 875 produces a result of determination as to whether or not information broadcasted from another information communication terminal 1 has been received. If the determination result produced at the step S73 indicates that information broadcasted from another information communication terminal 1 has not been received, the flow of the processing goes on to a step S76 to be described later.

If the determination result produced at the step S73 indicates that information broadcasted from another information communication terminal 1 has been received, on the other hand, the flow of the processing goes on to a step S74 at which the broadcasted-information acquisition unit 875 supplies the broadcasted information to the icon-array determination unit 877. On the basis of the information on registered users and the broadcasted information, the icon-array determination unit 877 produces a result of determination as to whether or not each user mutually registered for communications carried out in the WLAN ad-hoc mode is in an online or offline state.

Then, at the next step S75, on the basis of the information on registered users and the broadcasted information, the broadcasted-information acquisition unit 875 extracts information for each unregistered user from the broadcasted information.

If the determination result produced at the step S73 indicates that information broadcasted from another information communication terminal 1 has not been received, the flow of the processing goes on to the aforementioned step S76 as described above or, after the process carried out at the step S75 is completed, the flow of the processing also goes on to the step S76 at which the online/offline determination unit 876 sets the WLAN infrastructure mode as the communication mode automatically, that is, independently of an operation input entered by the user.

Then, at the next step S77, the online/offline determination unit 876 activates at least some functions of the application making use of the WLAN infrastructure mode.

Subsequently, at the next step S78, the application processor 131 carrying out at least some functions of the application making use of the WLAN infrastructure mode makes accesses to the servers 12 providing their respective services, examines each user registered as a communicatable user in order to produce a result of determination as to whether the user is in an online or offline state and supplies the result of the determination to the online/offline determination unit 876. The online/offline determination unit 876 then passes on the result of the determination as to whether the user is in an online or offline state to the icon-array determination unit 877.

Then, at the next step S79, the icon-array determination unit 877 reads out display setting information stored in a memory in accordance with control executed by the display setting storage control unit 873 and, on the basis of information acquired at the processes carried out at the step S73 to S78, the icon-array determination unit 877 sets a new array of icons or changes the existing array of icons in accordance with the states of users represented by the icons as users registered as communication partners in both the communication modes by adoption of typically the technique explained before by referring to FIG. 51, and supplies information on the resulting array of icons to the display-image generation unit 880. The display-image generation unit 880 then controls the display module 14 to generate display image data of a standby screen 851 showing the resulting array of icons and controls the display module 142 to display the standby screen 851 on the display unit 21.

Subsequently, at the next step S80 of the flowchart shown in FIG. 57, the operation-input acquisition unit 871 produces a result of determination as to whether or not an icon has been selected among those shown in the contact-icon display area 864. If the determination result produced at the step S80 indicates that an icon has not been selected among those shown in the contraction display area 864, the flow of the processing goes on to a step S88 to be described later.

If the determination result produced at the step S80 indicates that an icon has beer selected among those shown in the contact-icon display area 864, on the other hand, the flow of the processing goes on to a step S81 at which the operation-input acquisition unit 871 provides the display-image generation unit 880 with information on which icon has been selected by confirmation among those shown in the contact-icon display area 864. In order to let the usable-application extraction unit 878 extract usable applications to be shown on a usable-application list screen displaying a list of applications each usable in a communication with an apparatus owned by a user represented by the icon selected by confirmation in the WLAN infrastructure mode or the WLAN ad-hoc mode, the display-image generation unit 880 typically provides the usable-application extraction unit 878 with the information indicating which icon has been selected by confirmation among those displayed in the contact-icon display area 864. The usable-application list screen is basically the usable-application list screen 891 explained earlier by referring to FIG. 42 or the usable-application list screen 892 explained earlier by referring to FIG. 43. The usable-application extraction unit 878 extracts applications each usable for carrying out a communication with the registered user represented by the icon selected by confirmation and supplies the result of the extraction of the application to the display-image generation unit 880. In this case, the usable-application extraction unit 878 selects the usable applications to be extracted on the basis of information received by the registered-user information acquisition unit 874 as information on registered users and broadcasted information received by the broadcasted-information acquisition unit 875 as information on unregistered users.

Then, at the next step S82, the display-image generation unit 880 generates image data of the usable-application list screen on the basis of information received from the usable-application extraction unit 878 as the result of the extraction of the applications each usable for carrying out a communication with the registered user represented by the icon selected by confirmation.

Subsequently, at the next step S83, the display-image generation unit 880 controls the display module 142 to display the usable-application list screen on the basis of the image data generated at the step S82. As a result, the usable-application list screen is displayed on the display unit 21.

Then, at the next step S84, the operation-input acquisition unit 871 produces a result of determination as to whether or not an application has been selected among those shown on the usable-application list screen displayed at the step S83.

If the determination result produced at the step S84 indicates that an application has been selected by confirmation among those shown on the usable-application list screen, the flow of the processing goes on to a step S85 at which the application processor 131 switches the communication mode to the communication mode for the application selected by confirmation.

Subsequently, at the next step S86, the application processor 131 invokes the application manager to activate the application selected by confirmation and execute the application. Then, flow of the processing goes back to the step S7 of the flowchart shown in FIG. 52 in order finish the processing.

If the determination result produced at the step S84 indicates that any application has not been selected by confirmation among those shown on the usable-application list screen, on the other hand, the flow of the processing goes on to a step S87 at which the operation-input acquisition unit 871 produces a result of determination as to whether or not a command to display a standby screen has been received. If the determination result produced at the step S87 indicates that a command to display a standby screen has not been received, the flow of the processing goes back to the step S84 to repeat the processes of the step S84 and the subsequent steps.

If the determination result produced at the step S87 indicates that a command to display a standby screen has been received, on the other hand, the flow of the processing goes on to a step S88 at which the operation-input acquisition unit 871 produces a result of determination as to whether or not a command to put the WLAN in an off state has been received, and supplies the result of the determination to the icon-array determination unit 877.

If the determination result produced at the step S88 indicates that a command to put the WLAN in an off state has been received, the flow of the processing goes on to a step S89 at which the icon-array determination unit 877 receiving the result of the determination notifies the display-image generation unit 880 that a command to put the WLAN in an off state has been received. The display-image generation unit 880 then controls the display module 142 to display a standby screen for a case in which the WLAN is in an off state. As a result, a standby screen for a case in which the WLAN is in an off state is displayed on the display unit 21.

Then, at the next step S90, the communication-state acquisition unit 872 recognizes the present communication state of the information communication terminal 1 in order to produce a result of determination as to whether or not the WLAN has been put in an on state. If the determination result produced at the step S90 indicates that the WLAN has been put in an on state, the flow of the processing goes back to the step S71 to repeat the processes of the step S71 and the subsequent steps.

If the determination result produced at the step S90 indicates that the WLAN has not been put in an on state, on the other hand, the flow of the processing goes on to a step S91 at which, on the basis of a signal received from the operation-input acquisition unit 871 as a signal representing an operation input entered by the user, the display-image generation unit 880 produces a result of determination as to whether or not a command to display a screen other than a standby screen has been received as evidenced by, for example, the fact that the home button 23 has been pressed to display the home screen 451 or the fact that the back button 24 has been pressed to display a screen displayed immediately before.

If the determination result produced at the step S91 indicates that a command to display a screen other than a standby screen has been received, the flow of the processing goes on to a step S93. If the determination result produced at the step S91 indicates that a command to display a screen other than a standby screen has not been received, on the other hand, the flow of the processing goes back to the step S90 to repeat the processes of the step S90 and the subsequent steps.

If the determination result produced at the step S88 indicates that a command to put the WLAN in an off state has not been received, on the other hand, the flow of the processing goes on to a step S92 at which the icon-array determination unit 877 receiving the result of the determination notifies the display-image generation unit 880 that a command to put the WLAN in an off state has not been received. Then, on the basis of a signal received from the operation-input acquisition unit 871 as a signal representing an operation input entered by the user, the display-image generation unit 880 produces a result of determination as to whether or not a command to display a screen other than a standby screen has been received as evidenced by, for example, the fact that the home button 23 has been pressed to display the home screen 451 or the fact that the back button 24 has been pressed to display a screen displayed immediately before.

If the determination result produced at the step S92 indicates that a command to display a screen other than a standby screen has not been received, the flow of the processing goes back to the step S80 to repeat the processes of the step S80 and the subsequent steps.

If the determination result produced at the step S91 indicates that a command to display a screen other than a standby screen has been received, the flow of the processing goes on to the aforementioned step S93 as described above or, if the determination result produced at the step S92 indicates that a command to display a screen other than a standby screen has been received, on the other hand, the flow of the processing also goes on to the step S93 at which, on the basis of a signal received from the operation-input acquisition unit 871 as a signal representing an operation input entered by the user, the display-image generation unit 880 controls the display module 142 to change the display screen in accordance with the operation input. Finally, the flow of the processing also goes back to the step S7 of the flowchart shown in FIG. 52 to finish the processing.

By carrying out the processing described above, in the case of setting not to switch an icon to be displayed for each of the WLAN ad-hoc mode and the WLAN infrastructure mode, the layout of icons can be newly set or changed and then displayed on the basis of communication states of users each registered as a communication partner in both the communication modes. In addition, if an icon is selected by confirmation among those shown in the contact-icon display area 864, applications each usable for carrying out a communication with a user represented by the icon selected by confirmation are extracted and a screen for displaying a list of the usable applications is generated and displayed. Furthermore, if the user selects a usable application by confirmation as an application to be used for carrying out a communication with a communication partner, either the WLAN ad-hoc mode or the WLAN infrastructure mode is set as the communication mode for the selected usable application.

By providing the configuration described above, the user owning the information communication terminal 1 is capable of determining a partner in a communication of information in accordance with a general intellectual order of searching for a friend to be contacted as a communication partner easy to contact and contacting the partner by thinking of a method for contacting the partner. In addition, the user owning the information communication terminal 1 is capable of easily selecting a method to exchange information with the apparatus owned by the partner in a communication of information.

Figure 58:
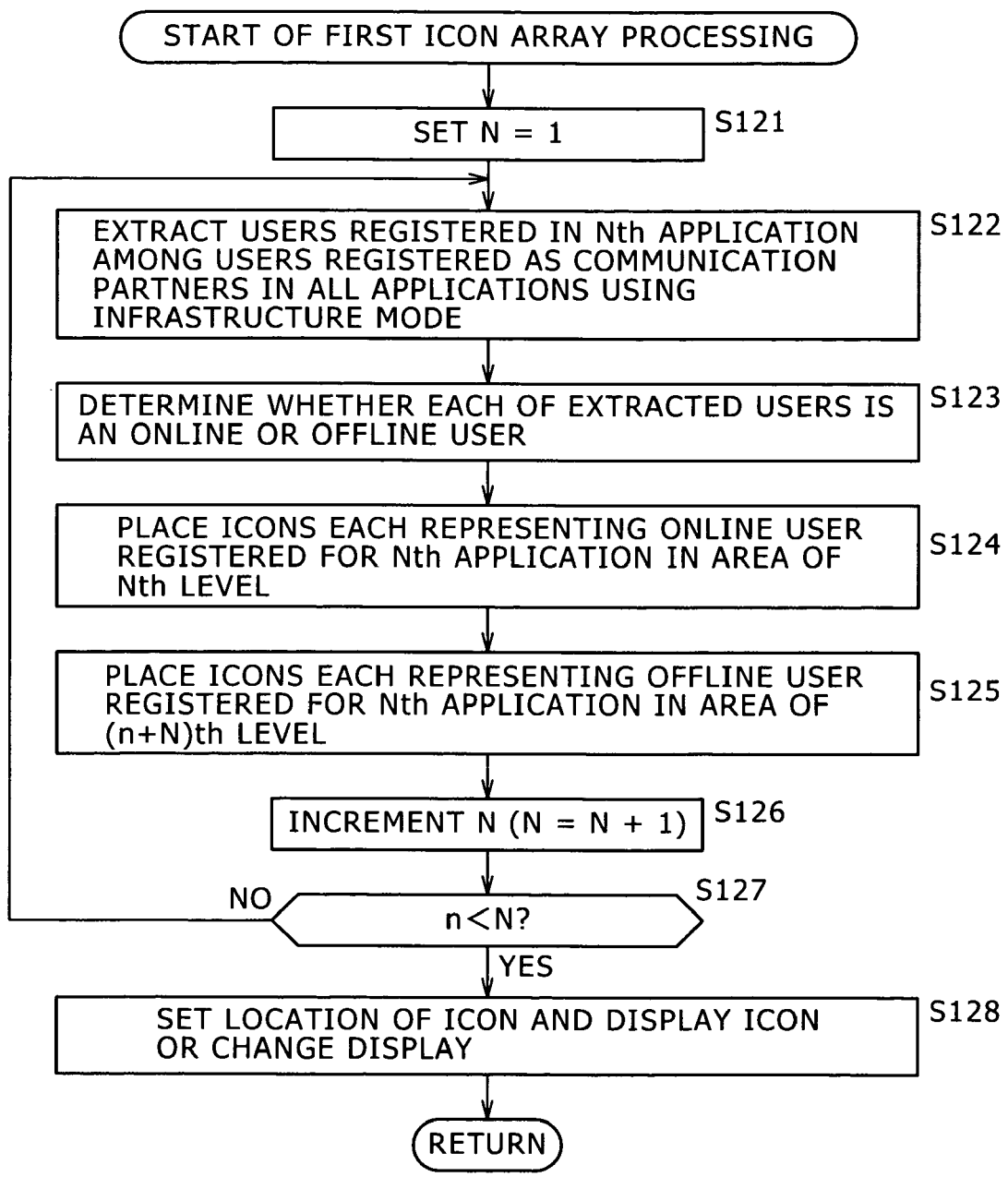
FIG. 58 shows a flowchart referred to in explanation of first icon array processing.

By referring to the flowchart shown in FIG. 58, the following description explains first typical processing carried out at the step S31 of the flowchart shown in FIG. 54.

The first typical processing is processing to determine an array of icons each representing a registered user on the basis of results of classifying the icons not only in accordance with applications for which users represented by the icons are registered, but also in accordance with whether or not the users as explained before are in an online or offline state by referring to, for example, FIG. 49. In the following description, it is assumed that the information communication terminal 1 includes n (where n is an integer at least equal to 1) applications each used for a communication carried out in the WLAN infrastructure mode.

The flowchart shown in FIG. 58 begins with a step S121 at which the icon-array determination unit 877 sets the value of a variable N stored in typically an internal register at 1 (N=1). The variable is used in a process to produce a result of determination as to whether processing has been done on users registered for all the applications each to be carried out to perform a communication in the WLAN infrastructure mode.

Then, at the next step S122, the icon-array determination unit 877 extracts users registered for the Nth application on the basis of information received from the registered-user information acquisition unit 874 as information on users each registered as a communication partner in all applications each to be carried out to perform a communication in the WLAN infrastructure mode.

Subsequently, at the next step S123, the icon-array determination unit 877 produces a result of determination as to whether each of the registered users extracted at the step S122 is in an online or offline state on the basis of information received from the online/offline determination unit 876 as a result of continuous communication-state monitoring.

Then, at the next step S124, on the basis of the determination result produced at the step S123, the icon-array determination unit 877 places icons each representing a user registered for the Nth application as a user in existing in an online state in an area having the Nth level of priority.

Subsequently, at the next step S125, on the basis of the determination result produced at the step S123, the icon-array determination unit 877 places icons each representing a user registered for the Nth application as a user in existing in an offline state in an area having the (n+N)th level of priority.

Then, at the next step S126, the icon-array determination unit 877 increments the variable N (N=N+1).

Subsequently, at the next step S127, the icon-array determination unit 877 compares the application count n with the variable N in order to produce a result of determination as to whether or not the application count n is smaller than the variable N (n<N?).

If the determination result produced at the step S127 indicates that the application count n is not smaller than the variable N, that is, if the relation n<N does not hold true, the flow of the processing goes back to the step S122 to repeat the processes of the step S122 and the subsequent steps.

If the determination result produced at the step S127 indicates that the application count n is smaller than the variable N, that is, if the relation n<N holds true, on the other hand, the flow of the processing goes on to a step S128 at which the icon-array determination unit 877 reads out display setting information stored in a memory in accordance with control executed by the display setting storage control unit 873, sets a new array of icons or changes the existing array of icons and supplies information on the resulting array of icons to the display-image generation unit 880. The display-image generation unit 880 then controls the display module 142 to generate display image data of a standby screen 851 showing the resulting array of icons as explained earlier by referring to typically FIG. 49 and controls the display module 142 to display the standby screen 851 on the display unit 21. The process of the step S128 is carried out because the processes of the steps S122 to S125 have been completed for all the applications.

By carrying out the processing described above, it is possible to determine an array of icons each representing a registered user on the basis of results of classifying the icons not only in accordance with applications for which users represented by the icons are registered, but also in accordance with the communication states of the users. Thus, even if a plurality of applications can be executed in the same communication mode, it is possible to give an easily understood display showing registered users in an online state for each of the applications.

Figure 59:
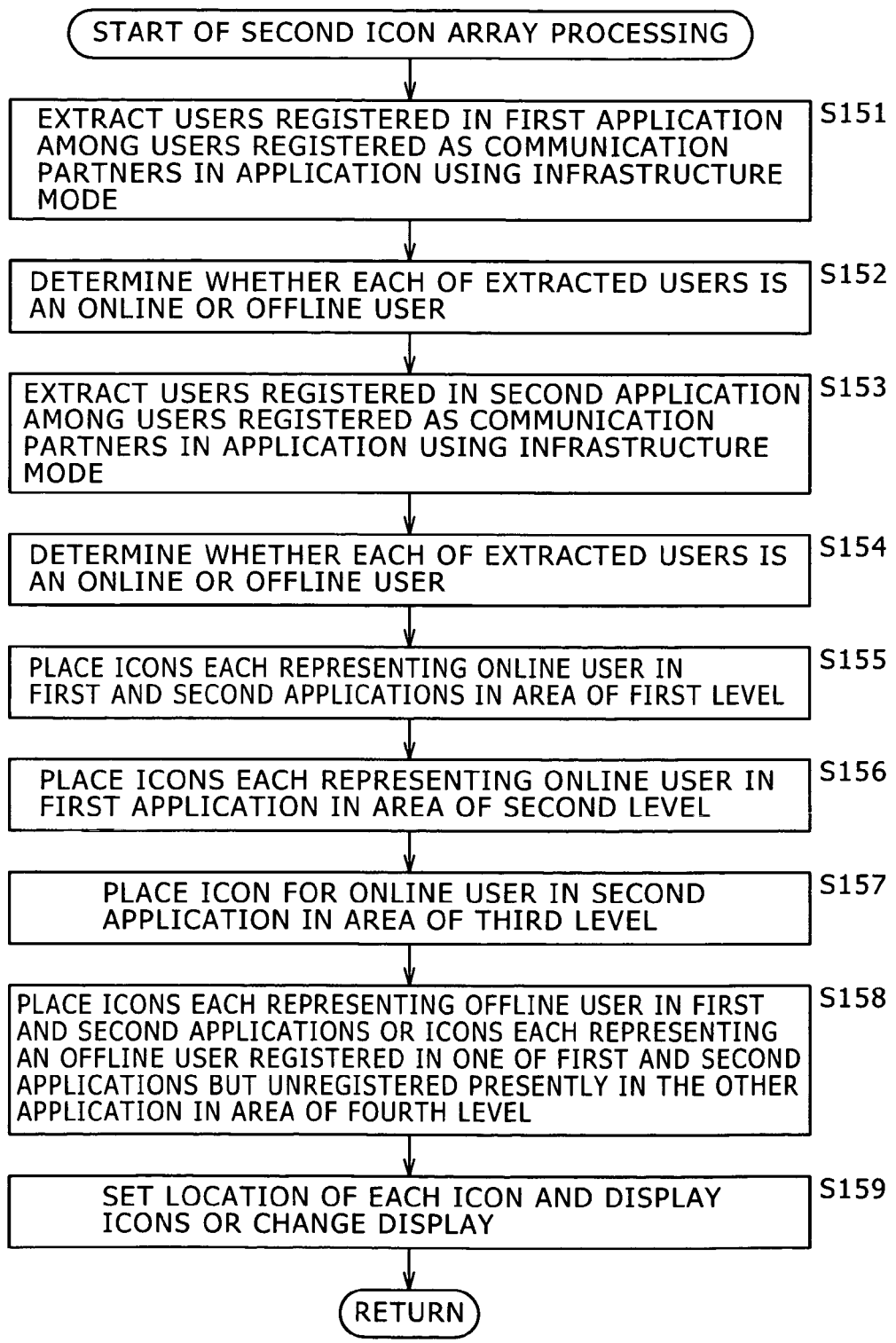
FIG. 59 shows a flowchart referred to in explanation of second icon array processing.

By referring to the flowchart shown in FIG. 59, the following description explains second typical processing carried out at the step S31 of the flowchart shown in FIG. 54.

The second typical processing is processing to determine an icon array in which icons representing users in an online state allowing the users to carry out communications by execution of as many applications as possible are placed in an area having high levels of priority as is the case with the icon array explained before by referring to FIG. 50. In the following description, it is assumed that there are two types of applications for carrying out communications in the WLAN infrastructure mode. However, the technique explained in the following description as a technique for determining an array of icons can also be applied in the same way to cases in which there are three or more types of application.

The flowchart shown in FIG. 59 begins with a step S151 at which the icon-array determination unit 877 extracts users registered in the first application. The extracted users are selected in accordance with information received from the registered-user information acquisition unit 874 as information on those each registered as a communication partner for applications to be executed in the WLAN infrastructure mode.

Then, at the next step S152, the icon-array determination unit 877 produces a result of determination as to whether each of the registered users extracted at the step S151 is in an online or offline state on the basis of information received from the online/offline determination unit 876 as a result of continuous communication-state monitoring.

Subsequently, at the next step S153 the icon-array determination unit 877 extracts users each registered for the second application. The extracted users are each selected in accordance with information received from the registered-user information acquisition unit 874 as information on those each registered as a communication partner for applications to be executed in the WLAN infrastructure mode.

Then, at the next step S154, the icon-array determination unit 877 produces a result of determination as to whether each of the registered users extracted at the step S153 is in an online or offline state on the basis of information received from the online/offline determination unit 876 as a result of continuous communication-state monitoring.

Subsequently, at the next step S155, the icon-array determination unit 877 places icons each representing an online user registered for both the first and second applications in an area having the first level of priority on the basis of results of the processes carried out at the steps S152 and S154.

Then, at the next step S156, the icon-array determination unit 877 places icons each representing an online user registered for the first application only in area having the second level of priority on the basis of results of the processes carried out at the steps S152 and S154.

Subsequently, at the next step S157, the icon-array determination unit 877 places icons each representing an online user registered for the second application only in an area having the third level of priority on the basis of results of the processes carried out at the steps S152 and S154.

Then, at the next step S158, the icon-array determination unit 877 places icons each representing an offline user registered for both the first and second applications or icons each representing an offline user, which has been registered for one of first and second applications but unregistered presently for the other application, in an area having the fourth level of priority on the basis of results of the processes carried out at the steps S152 and S154.

Subsequently, at the last step S159, the icon-array determination unit 877 reads out display setting information stored in a memory in accordance with control executed by the display setting storage control unit 873, sets a new array of icons or changes the existing array of icons and supplies information on the resulting array of icons to the display-image generation unit 880. The display-image generation unit 880 then controls the display module 142 to generate display image data of a standby screen 851 showing the resulting array of icons as explained earlier by referring to typically FIG. 49 and controls the display module 142 to display the standby screen 851 on the display unit 21.

By carrying out the processing described above, it is possible to determine an icon array in which icons representing users in an online state allowing the users to carry out communications by execution of as many applications as possible are placed in an area having high levels of priority even if a plurality of applications can be executed in the same communication mode.

As described above, by applying the present invention to a process to contact another user serving as a desired communication partner by carrying out a communication with the other user, the user owning the information communication terminal 1 is capable of specifying the communication partner by adoption of a more natural method and determining an application used in the communication with an apparatus owned by the other user specified as the communication partner, that is, an application used in the process of contacting the communication partner.

That is to say, in a communication including a case of making use of no communication apparatus, in general, in order to contact a partner, it is necessary to think of a method of contacting the partner. That is to say, by displaying a list of applications each usable for exchanging information with a desired partner selected by confirmation by making use of a standby screen, the user owning the information communication terminal 1 is capable of contacting the desired partner by adoption of a more natural method.

As explained earlier, the series of processes described previously can be carried out by hardware and/or execution of software. If the series of processes described above is carried out by execution of software, programs composing the software can be installed into a computer embedded in dedicated hardware, a general-purpose personal computer or the like from typically a recording medium. In this case, the computer or the personal computer serves as the information communication terminal 1 described above. A general-purpose personal computer is defined as a personal computer, which can be made capable of carrying out a variety of functions by installing a variety of programs into the personal computer.

The aforementioned recording medium for recording programs to be installed into a computer or a general-purpose personal computer as programs to be executed by the computer or the general-purpose personal computer respectively is typically a removable recording medium 172 provided to the user separately from the main unit of the recording/reproduction apparatus as shown in FIG. 11. Examples of the removable recording medium 172 also referred to as a package medium include a magnetic disk such as a flexible disk, an optical disk such as a CD-ROM (Compact Disk-Read Only Memory) or a DVD (Digital Versatile Disk), a magneto-optical disk such as an MD (Mini Disk, a trademark) as well as a semiconductor memory.

It is also worth noting that, in this specification, steps of the flowchart described above can be carried out not only in a pre-prescribed order along the time axis, but also concurrently or individually.

It is also to be noted that the technical term 'system' used in this specification implies the configuration of a confluence including a plurality of apparatus.

It is to be noted that embodiments of the present invention are not limited to the embodiments described above. In addition, it is possible to make a variety of changes in a range not deviating from essentials of the present invention.

What is claimed is:

1. An information processing apparatus capable of exchanging information with another apparatus, comprising:
   a communication unit configured to carry out a communication with said other apparatus;
   a communication-state information acquisition unit configured to acquire information on a state of a communication with said other apparatus carried out by said communication unit;
   an information/array determination unit configured to determine image information for a user owning said other apparatus on the basis of said information acquired by said communication-state information acquisition unit and determine an array including said image information;
   an image generation unit configured to generate a display image including said image information on the basis of said array;
   a display control unit configured to control a display unit so that said display unit displays said display image generated by said image generation unit; wherein said information processing apparatus has a plurality of communication modes in which said communication unit carries out communications; said communication unit implements each of said communication modes for a predetermined period; and said communication-state information acquisition unit acquires said information in each of said communication modes.

2. The information processing apparatus according to claim 1 wherein:
said information processing apparatus has a plurality of communication modes in which said communication unit carries out communications with said other apparatus; and
said information/array determination unit changes said image information to be displayed in accordance with a communication mode selected among said communication modes.

3. The information processing apparatus according to claim 1, further comprising:
an operation-input acquisition unit configured to acquire an operation input selecting and determining a piece of image information among pieces of image information included in said display image displayed by said display unit; and
an application extraction unit configured to extract applications each capable of transmitting information to said other apparatus owned by a user associated with said image information selected and determined on the basis of an operation input acquired by said operation-input acquisition unit, wherein
said image generation unit further generates an application-list screen showing a list of said applications extracted by said application extraction unit, and
said display control unit further controls said display unit so that said display unit further displays said application-list screen generated by said image generation unit.

4. The information processing apparatus according to claim 1, further comprising
a storage unit configured to store information on users registered for each of predetermined communication modes, wherein:
said communication-state information acquisition unit further has
a registered-user information acquisition unit configured to acquire registered-user information which is information on states of said users registered for each of predetermined modes from said storage unit; and
said information/array determination unit determines said array of image information on the basis of said registered-user information.

5. The information processing apparatus according to claim 1, wherein:
said communication-state information acquisition unit further has
a transmitted-information acquisition unit configured to acquire transmitted information which is information transmitted by said other apparatus in a communication mode for carrying out a direct radio communication between apparatus; and
said information/array determination unit determines said array of image information on the basis of said transmitted information.

6. The information processing apparatus according to claim 1 wherein:
said communication-state information acquisition unit further has an online-state determination unit configured to produce a result of determination as to whether or not another apparatus owned by a registered user capable of communicating through a predetermined access point in a communication mode for carrying out communications through access points including said predetermined access point is in an online state for a predetermined application; and
said information/array determination unit determines said array of image information on the basis of said determination result produced by said online-state determination unit.

7. The information processing apparatus according to claim 6 wherein:
said online-state determination unit produces a result of determination as to whether or not said other apparatus is in an online state for a plurality of said predetermined applications; and
said information/array determination unit determines said array of image information on the basis of the number of said predetermined applications for which said other apparatus is in an online state.

8. An information processing method adopted in an information processing apparatus capable of exchanging information with another apparatus, comprising the steps of:
acquiring communication-state information for acquiring information on a state of a communication with said other apparatus;
determining image information for a user own said other apparatus on the basis of the information acquired at said communication-state information acquisition step and determining an array including image information;
generating a display image including said image information on the basis of said array;
controlling the display of said display image generated at said image generation step; wherein said information processing method has a plurality of communication modes in which carry out communications; said communicating step implementing each of said communication modes for a predetermined period; and said communication-state information acquisition step acquires said information in each of said communication modes.

9. A non-transient recording medium used for recording a computer-readable program to be executed by a computer carrying out processing, comprising the steps of:
acquiring communication-state information for acquiring information on a state of a communication said other apparatus;
determining image information for a user own said other apparatus on the basis of the information acquired at said communication-state information acquisition step and determining an array including image information;
generating a display image including said image information on the basis of said array;
controlling the display of said display image generated at said image generation step; wherein said processing has a plurality of communication modes in which carry out communications; said communicating step implementing each of said communication modes for a predetermined period; and said communication-state information acquisition step acquires said information in each of said communication modes.

10. An information processing apparatus capable of exchanging information with another apparatus, comprising:
communication means configured to carry out a communication with said other apparatus;

communication-state information acquisition means configured to acquire information on a state of a communication with said other apparatus carried out by said communication means;

information/array determination means configured to determine image information for a user owning said other apparatus on the basis of said information acquired by said communication-state information acquisition means and determine an array including said image information;

image generation means configured to generate a display image including said image information on the basis of said array;

display control means configured to control a display means so that said display means displays said display image generated by said image generation means; wherein said information processing apparatus has a plurality of communication modes in which said communication unit carries out communications; said communication unit implements each of said communication modes for a predetermined period; and said communication-state information acquisition unit acquires said information in each of said communication modes.

11. The information processing method according to claim 8 wherein:

said information processing method has a plurality of communication modes in which carry out communications with said other apparatus; and said information determining step changes said image information to be displayed in accordance with a communication mode selected among said communication modes.

12. The information processing method according to claim 8, further comprising:

acquiring an operation input selecting and determining a piece of image information from among pieces of image information included in said display image; and extracting applications each capable of transmitting information to said other apparatus owned by a user associated with said image information selected and determined on the basis of an operation input acquired in said operation input acquiring step, wherein said image generating step further generating an application-list screen showing a list of said applications extracted by said application extracting step, and said display control step further controlling the display of said application-list screen generated in said image generation step.

13. The information processing method according to claim 8, further comprising storing information on users registered for each of predetermined communication modes, wherein:

said communication-state information acquiring step further acquires registered-user information which is information on states of said users registered for each of predetermined modes from said storing step; and said information/array determination determining step determining said array of image information on the basis of said registered-user information.

14. The information processing method according to claim 8, wherein:

said communication-state information acquiring step further acquires transmitted information which is information transmitted by said other apparatus in a communication mode for carrying out a direct radio communication; and said information/array determining step determining said array of image information on the basis of said transmitted information.

15. The information processing method according to claim 8 wherein:

said communication-state information acquiring step further produces a result of determining as to whether or not another apparatus owned by a registered user capable of communicating through a predetermined access point in a communication mode for carrying out communications through access points including said predetermined access point is in an online state for a predetermined application; and said information/array determining step determines said array of image information on the basis of said determination result produced in said online-state determining step.

16. The information processing method according to claim 8 wherein:

said online-state determining step producing a result of determining as to whether or not said other apparatus is in an online state for a plurality of said predetermined applications; and said information/array determining step determining said array of image information on the basis of the number of said predetermined applications for which said other apparatus is in an online state.

* * * * *